(12) United States Patent
Knox, Jr. et al.

(10) Patent No.: US 7,167,348 B2
(45) Date of Patent: Jan. 23, 2007

(54) MINIATURIZED MOTOR OVERLOAD PROTECTOR

(75) Inventors: William H. Knox, Jr., Wauchula, FL (US); William E. Calligan, Jr., Palm Harbor, FL (US)

(73) Assignee: AMT Capital, Ltd., Dallas, TX (US)

( * ) Notice: Subject to any disclaimer, the term of this patent is extended or adjusted under 35 U.S.C. 154(b) by 313 days.

(21) Appl. No.: 10/494,714

(22) PCT Filed: Dec. 6, 2002

(86) PCT No.: PCT/US02/39219

§ 371 (c)(1),
(2), (4) Date: May 6, 2004

(87) PCT Pub. No.: WO03/058788

PCT Pub. Date: Jul. 17, 2003

(65) Prior Publication Data

US 2004/0252421 A1 Dec. 16, 2004

(51) Int. Cl.
*H02H 7/06* (2006.01)
(52) U.S. Cl. .......................................... 361/23; 361/20
(58) Field of Classification Search ................. 361/20, 361/21, 23, 30, 31, 33; 318/727
See application file for complete search history.

(56) References Cited

U.S. PATENT DOCUMENTS

| | | | | |
|---|---|---|---|---|
| 4,184,250 A | * | 1/1980 | Meijer | ..................... 30/346.51 |
| 4,291,355 A | | 9/1981 | Dinger | |
| 4,319,298 A | * | 3/1982 | Davis et al. | ................... 361/24 |
| 4,321,643 A | * | 3/1982 | Vernier | ........................ 361/48 |
| 5,483,212 A | * | 1/1996 | Lankuttis et al. | ........... 335/132 |
| 5,510,949 A | * | 4/1996 | Innes | ........................ 361/93.4 |
| 5,644,510 A | | 7/1997 | Weir | |
| 5,706,153 A | * | 1/1998 | Innes et al. | .................... 361/31 |
| 6,351,960 B1 | * | 3/2002 | Shin | ............................. 62/229 |
| 6,605,918 B1 | * | 8/2003 | Mayhew et al. | ............. 318/727 |
| 2003/0009302 A1 | * | 1/2003 | Leslie | ........................ 702/65 |

* cited by examiner

*Primary Examiner*—Brian Sircus
*Assistant Examiner*—Danny Nguyen
(74) *Attorney, Agent, or Firm*—Dennis G. LaPointe

(57) ABSTRACT

A Digital Programmable Motor Overload Protector includes a base module and a detachable, removable user interface module interfaced through a serial communications link. The base module provides motor overload analysis through a programmable Digital Signal Processor (DSP) which digitizes real time motor operating conditions, comparing stored user trip and alarm levels against these conditions, communicating the results to the detachable user interface and a multi-drop communications link using the industry standard MODBUS RTU protocol to a facility's automation system. Motor operating conditions, user settings, override conditions, pass events, and resettable parameters are available through the password protected removable user interface module or the multi-drop communications interface.

20 Claims, 61 Drawing Sheets

Fig, 13

LOADER SOFTWARE

LOADER SOFTWARE

TIMER SERVICES TASK

MOTOR INHIBITED FUNCTIONS

PHASE REVERSAL TRIP

MOTOR RUNNING ONLY ALARM FUNCTIONS

Alarms, Values Tested and Settings ◄——— 345

| Alarm | Value | Pickup Setting |
|---|---|---|
| Overload Warning | [MaxMLP] – Highest Individual Phase Load | [MSF] – Service factor Setting |
| Overload Alarm | [MaxMLP] – Highest Individual Phase Load | [OLAP] - Overload Alarm |
| Jam Alarm | [MaxMLP] – Highest Individual Phase Load | [JMAP] - Jam Alarm |

UNBALANCE AND THERMAL CAPACITY ALARMS

Alarms, Values Tested and Settings

| Alarm | Value | Pickup Setting |
|---|---|---|
| Unbalance alarm | [MUB] – Percent Unbalance | [UBAP] - Unbalance Alarm |
| Thermal Capacity Alarm | [MTCU] – Percent Thermal Capacity Used | [TCAP] – Thermal Capacity Alarm |

USER INTERFACE MAPPING (Cont.)

| MTCU<br>### | OARL<br>LOCK | TUB<br>### | 8<br>event | RSET<br>ELOG | MTR<br>90 | ULAR<br>OFF |
|---|---|---|---|---|---|---|
| MLAT<br>##.# | HRDW<br>FAIL | TMAT<br>#### | 9<br>event | RSET<br>TCU | MAT<br>10.0 | OARE<br>OFF |
| TOLT<br>#### | COMM<br>FAIL | NO<br>TRIP | 10<br>event | CONT<br>## | PHLD<br>OFF | OARL<br>OFF |
| TOLR<br>#### | DIAG<br>FAIL | | 11<br>event | | JMTP<br>300 | RSTD<br>OFF |
| TTSI<br>#### | LOCK<br>OUT | | 12<br>event | | JMTD<br>2.5 | TSIS<br>75 |
| TS/H<br>#### | NO<br>ALRM | | NO<br>EVNT | | GFTP<br>OFF | STI<br>600 |
| TRSD<br>#### | | | | | GFTD<br>0.1 | TDOP<br>50 |
| TUAR<br>###M | | | | | GFIT<br>0 | SCT<br>30 |
| | | | | | LS/H<br>OFF | |

Fig. 47B

MINIATURIZED MOTOR OVERLOAD PROTECTOR

BACKGROUND OF THE INVENTION

The invention relates to the field of motor protection through the measurement and analysis of motor currents, and the possible deviations from normal, which can be detected and protected against. Actual motor current measurements coupled with temporal conditions allow for nearly precise prediction of motor heating and the deleterious effects thereof. High accuracy motor current measurement and real time analysis of motor operating conditions allow for the use of the protected motor at the limits of it's efficiency thereby providing a higher cost benefit ratio for the use of that motor. With the advent of greater automation utilization and the drive to maximize work output from motors in actual operation, high and medium voltage motors have been serviced by the production of highly accurate motor protection devices. The need to provide an increased level of accuracy and automation interfacing to low voltage (690 Volt and below) motors is essential to maximize motor throughput without impacting their longevity in both standard industrial operations and those of a mission critical applications.

SUMMARY OF THE INVENTION

The present invention relates to a digital programmable motor overload protector, which provides low noise, low distortion, and high accuracy data acquisition for low voltage motors on par with the systems designed for medium and high voltage motor protection.

According to the aspects of the invention, the noise reduction methods are comprised of four integral parts. The use of instrumentation amplifiers as the main gain stage, coupled with a filter system unique to industrial applications, and a miniaturized switchmode power supply, which eliminates power supply noise from the sources to these circuits, creates a low noise, low distortion front end for the embedded analog to digital converter. The accuracy of the measurement is enhanced by decreasing the signal to noise ratio of the analog to digital conversion process by applying the signal through an absolute value circuit thereby changing the bipolar signal to monotonic effectively doubling the resolution of the embedded analog to digital converter. The phase information of the signal is restored to the digitized image of the signal by a zero crossing detector and embedded capture circuits in the Digital Signal Processor.

According to further aspects of the invention, the reset switch used is of an optical nature such that the impact of the harsh physical industrial environment is restricted to the mechanical supports of the housing and cannot cause a deterioration of the system electronics or provide false indications due to dirt and moisture.

According to further aspects of the invention, the housing is constructed without the use of hardware providing a labor saving snap together frame work that not only creates a solid protective housing but also serves to control placement of the circuit boards inside such that positive connections between boards is ensured, and areas requiring electrical isolation are maintained.

According to further aspects of the invention, the Keypad (removable user interface module) is detachable from the base module and removable through the use of an umbilical cable assembly. The connections between the Keypad and the base module are afforded through a unique configuration of the housing design and the use of Smart Card (tm) connectors.

According to further aspects of the invention, the internal Static Random Access Memory (SRAM) of the DSP circuit card assembly maintains all variables, calculated motor values, and past recorded events. A unique alternate power sourcing arrangement, provided by a double layer storage capacitor, maintains all SRAM values should facility power be removed from the digital programmable motor overload protector for a period of up to three hours. As a result, protection of the motor is based upon last known operational and calculated thermal values. This arrangement removes a potential protection limitation caused by medium duration power losses by preventing a still hot motor from restarting and causing potential damage. After three hours the motor is considered to be thermally safe.

To recaptulate, the present invention is a miniaturized programmable motor overload protector comprising, in combination: means for sensing electrical power applied to a motor; means for filtering noise from inputted signals; signal processing means; programming means for inputting, monitoring, diagnosing, and recording operating information; memory means for storing information; display means; means for interrupting said electrical power applied to a motor; power supply means for providing regulated output voltages; reset actuator means for resetting the miniaturized programmable motor overload protector after a trip has occurred; and means for maintaining operation during electrical power disruptions.

The invention further comprises modular components means for modularly interlocking each component housing comprising the motor overload protector.

The motor to which the protector is applied to is anticipated to be a nominally 690 volt and below low voltage motor. The electrical power sensed includes the sensing and measuring of three phase electrical currents as well as ground fault current.

The means for filtering noise from inputted signals is preferably a Generalized Immittance Converter (GIC) filter and the signal processing means is preferably a digital signal processor (DSP) circuit.

Fail safe means independent of the digital signal processor (DSP) circuit are included, the fail safe means being for interrupting the electrical power applied to the motor in the event of internal failure of the miniaturized programmable motor overload protector.

The programming means includes a removable keypad for inputting data and the display means is a removable keypad with display. The DSP circuit has password protection against unauthorized use.

The power supply means is an offline Switch Mode Power Supply (SMPS) circuit.

The reset actuator means interrupts or enables an optical path when operated. The reset actuator means is a button that when depressed does not come in contact with an underlying circuit board in the signal processing means.

A time delay in which operations are maintained during electrical power disruptions is greater than 0.099 seconds, and can be as long as about 1 second. This is related to the ride-through feature of the invention.

A footprint of the combined modular components comprises mechanical dimensions of no greater than about 2.2 inches by 5.2 inches and wherein a total height of said miniaturized programmable motor overload protector is no greater than about 4.8 inches.of said miniaturized programmable motor overload protector. Each component housing includes spaced-apart locking tabs for snapping into and interlocking with mating corresponding apertures in the mating component housing.

The modular components comprise a base housing portion; a power supply circuit portion integrated in the base housing portion; a Control Power (CP) input terminal portion integrated with the power supply circuit portion in the base housing portion; a Current Transformer (CT) circuit portion integrated in a CT housing portion modularly coupled with the power supply circuit portion; an input/output circuit portion and a communication circuit portion, which are modularly coupled inside a Signal Processor housing portion; a Signal Processor circuit portion integrated in the Signal Processor housing portion modularly coupled with the CT housing portion; and a removable user interface circuit assembly including a cover and base to house the user interface circuit assembly, the cover and base being modularly coupled to form the housing, and the base being modularly coupled with the Signal Processor housing portion.

The Signal Processor circuit portion is preferably a Digital Signal Processor circuit portion and the Signal Processor housing portion is a Digital Signal Processor (DSP) housing portion.

The modular base housing portion further comprises one of direct fastening and din rail mounting means.

The power supply circuit portion is an offline Switch Mode Power Supply (SMPS) circuit.

Included is a remote user interface circuit assembly having an interface end to be modularly coupled with the DSP housing when the removable user interface assembly is removed, a remote user portion and a user interface circuit umbilical cable of predetermined length connecting said remote user portion and said interface end coupled with the DSP housing. Further included is means for aligning and fitting to an electrical interface portion of one of the remote user interface assembly and the removable user interface assembly.

As noted above, the CT circuit portion includes current transformers as sensors for each of three phases of motor currents and one ground fault current.

The signal processing means includes phase orientation restoration means for restoring phase orientation relative to each other phase to allow for the determination of motor phase loss, phase unbalance and phase reversal, wherein an embedded capture circuit is used to restore phase polarity and temporal orientation to the other measured phases to a digital image of the measured signal to allow for the detection of motor phase loss, phase unbalance and phase reversal.

The signal processing means also includes an absolute value processing means of a bipolar input signal for allowing for double resolution of the bipolar input signal, wherein an embedded monotonic analog to digital converter in conjunction with each absolute value circuit allow for said double resolution of the bipolar input signal.

In addition, phase detect circuit means for capturing real time polarity, positive or negative, of an incoming signal corrected by the absolute value circuit and for providing said real time polarity in a digital form to a DSP to reconstitute the digitized image of the measured signals is included. Again, the embedded monotonic analog to digital converter is integral to a DSP circuit portion.

The DSP circuit portion further comprises a Serial Peripheral Interface (SPI) for supporting local circuit communications; a Universal Asynchronous Receiver Transmitter (UART) for supporting external communications; and means for controlling an amplification setting of Instrumentation Amplifiers and a position of contacts on a Trip Relay. The means for controlling the amplification setting of the Instrumentation Amplifiers and the position of contacts on the Trip Relay includes discrete data lines of the DSP circuit portion. The Instrumentation Amplifiers convert signal currents from outputs of current transformers in theCurrent Transformer (CT) circuit portion into voltages for amplification, the CT circuit portion including four current transformers as sensors for each of the three phases of motor currents and one ground fault current.

The signal processing means includes means for restoring phase relationship information. The programming means includes means for inputting operating data, for monitoring and metering operating conditions, for capturing trip information at time of trip and diagnosing causes of events, and for setting operating limits and alarm conditions. The memory means for storing information includes means for storing operating and diagnostic information.

In another embodiment description of the present invention, the miniaturized modular programmable motor overload protector for low voltage and three phase AC induction motors comprises a combination of coupled modular components including: a base housing portion having means for modularly coupling and mounting said base housing portion to a supporting substate; a Switch Mode Power Supply (SMPS) circuit portion integrated in the base portion housing; a Control Power (CP) input terminal portion integrated with the SMPS circuit portion; a Current Transformer (CT) circuit portion integrated in a CT housing portion in electrical interface with the SMPS circuit portion and the CT housing portion being modularly coupled with base housing portion; a phase current feed input terminal portion integrated with the CT circuit portion; a Signal Processor (SP) portion integrated in a SP housing portion, which is modularly coupled with the CT housing portion; and a removable user interface circuit assembly including a cover and base to house the user interface circuit assembly, the cover and base being modularly coupled to form the housing, and the base being modularly coupled with the SP housing, wherein a footprint of the combination of coupled modular components comprising said miniaturized programmable motor overload protector has mechanical dimensions of no greater than about 2.2 inches by 5.2 inches and wherein a total height of said miniaturized programmable motor overload protector is no greater than about 4.8 inches.

The components are modularly coupled with spaced-apart locking tabs in each component snapping into and interlocking with mating corresponding apertures in the mating component. The base housing portion is coupled to its supporting substrate with one of direct fastening and din rail mounting means.

Also includes is a remote user interface circuit assembly having an interface end to be modularly coupled with the SP housing when the removable user interface assembly is removed, a remote user portion and a user interface circuit umbilical cable of predetermined length connecting said remote user portion and said interface end coupled with the SP housing.

The invention further comprises means for aligning and fitting to an electrical interface portion of one of the remote user interface assembly and the removable user interface assembly. The CT circuit portion includes current transformers as sensors for each of the three phases of motor currents and one ground fault current, and the Signal Processor circuit portion is a Digital Signal Processor (DSP) circuit portion.

BRIEF DESCRIPTION OF THE DRAWINGS

The present invention and the numerous elements and advantages apparent to those skilled in the art, is more easily understood by reference to the following detailed descriptions of the invention when taken in conjunction with the following drawings, in which.

DESCRIPTION OF EXEMPLARY EMBODIMENTS AND BEST MODE

Figure 1:
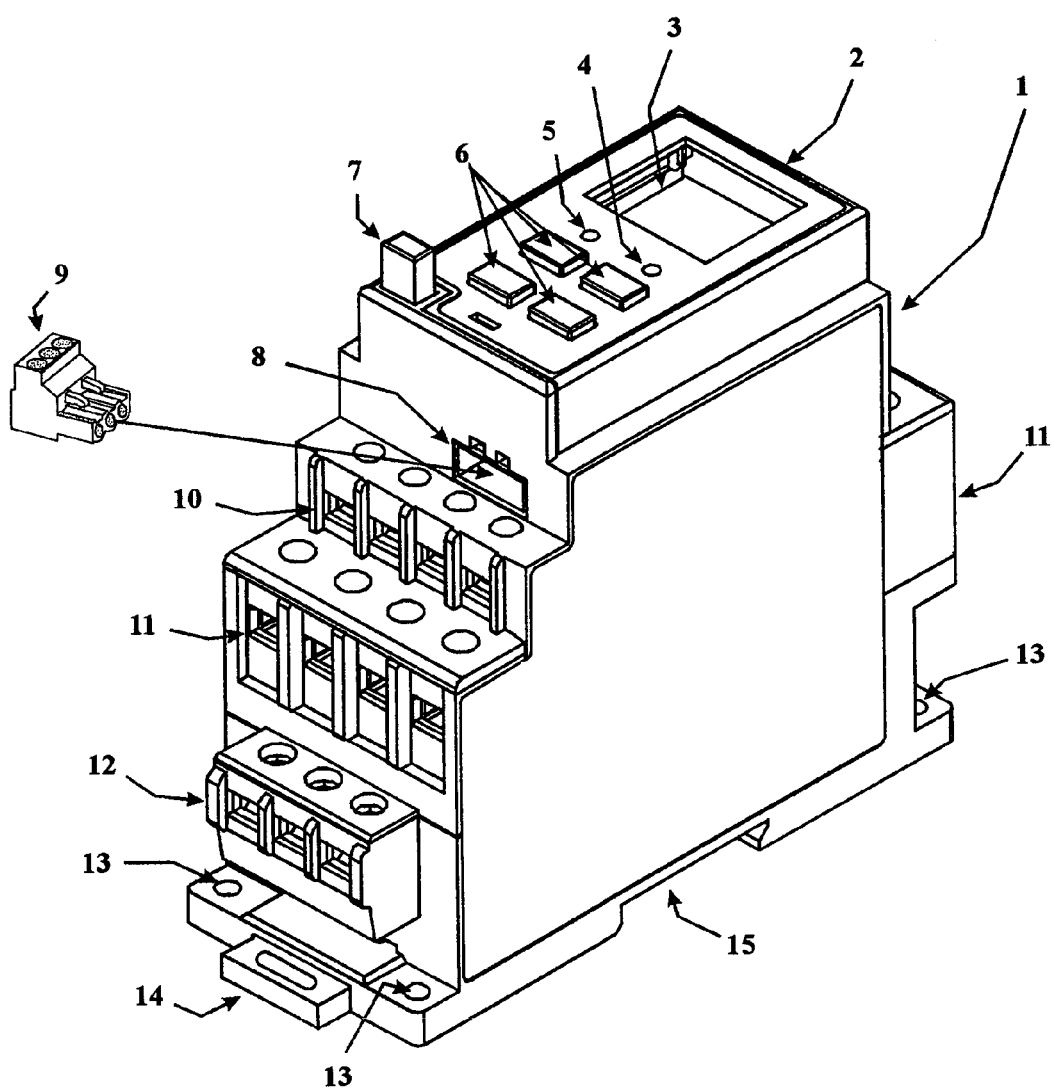
FIG. 1 is a mechanical diagram of the entire digital programmable motor overload protector as assembled for typical utilization in accordance with the present invention.

FIG. 1 depicts the perspective view of a digital programmable motor overload protector (1) in accordance with the present invention. The overload protector is shown with the removable user interface (2) installed. The base of the unit depicts the RS-485 communications receptacle (8) for the multi-drop RS-485 communications terminal. The red user reset actuator (7) is prominently adjacent, but independent, of the removable user interface. Silicon conductive keys make up the user interface keypad (6). Dual color light emitting diodes provide readily visible motor/relay status with the "OPERATE/FAIL" indicator (5) and the "TRIP/ALARM" indicator (4). The liquid crystal display (3) displays a user selectable menu of motor operational values and configuration settings.

The housing integrated trip contact terminal block (10) allows finger safe access to the trip contacts for wiring purposes. Similar enclosure integrated finger safe external current transformer terminal blocks (11) exist for the wiring of external current transformer leads. Control power input terminal block (12) avails finger safe wiring access for coupling to a facility power source.

Mechanical mounting of the protector (referred herein also as a relay) is provided in two fashions; by direction bolt in mounting bracket holes (13) or via a din rail mount slot (15) and din rail retention clip (14) which positively locks the relay to the din rail and also allows a ready method for release.

Figure 2:
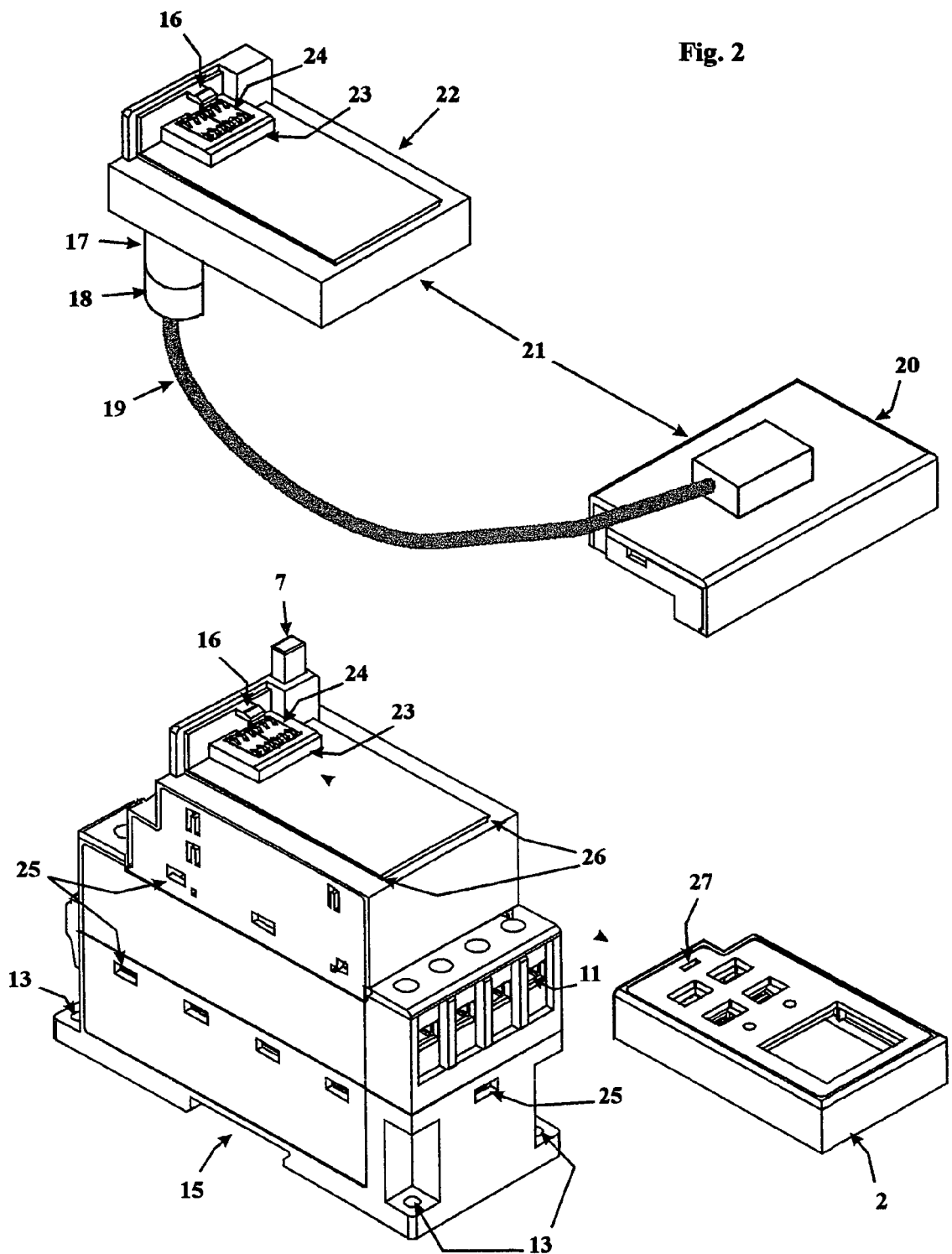
FIG. 2 is a mechanical diagram of the digital programmable motor overload protector shown with the detached user interface and the umbilical option required to interface the base module and user interface over a distance in accordance with the present invention.

FIG. 2 is a perspective view of the overload relay with the removable user interface (2) detached and the optional remote user interface umbilical (21) required for remote mounting in accordance with the present invention. The male user interface (I/F) latching mechanism (16), and the user interface (I/F) latch receptacle (27), provide direct retention of the removable user interface when installed upon the relay housings' user interface (I/F) alignment rail (26) or the rail on the remote mount user interface pedestal (22). Proper alignment and fit to the electrical interface of either the remote user interface pedestal or the relay housing is accomplished by the Smart Card connector alignment block (23).

The optional remote user interface umbilical (21) is comprised of a remote user interface (I/F) pedestal (22) which mounts to a facility enclosure door, or panel by a industry standard ⅞ inch panel knockout and the pass through fitting (17) on the back of the pedestal. The umbilical connector (18) allows the umbilical cable assembly (19) to be detached to ease the installation process. The umbilical base attachment (20) is then inserted onto the relay user I/F alignment rail (26) and firmly, and electrically fastened by the Smart Card connector alignment block (23) and user I/F latching mechanism (16) to the overload relay housing.

Figure 3:
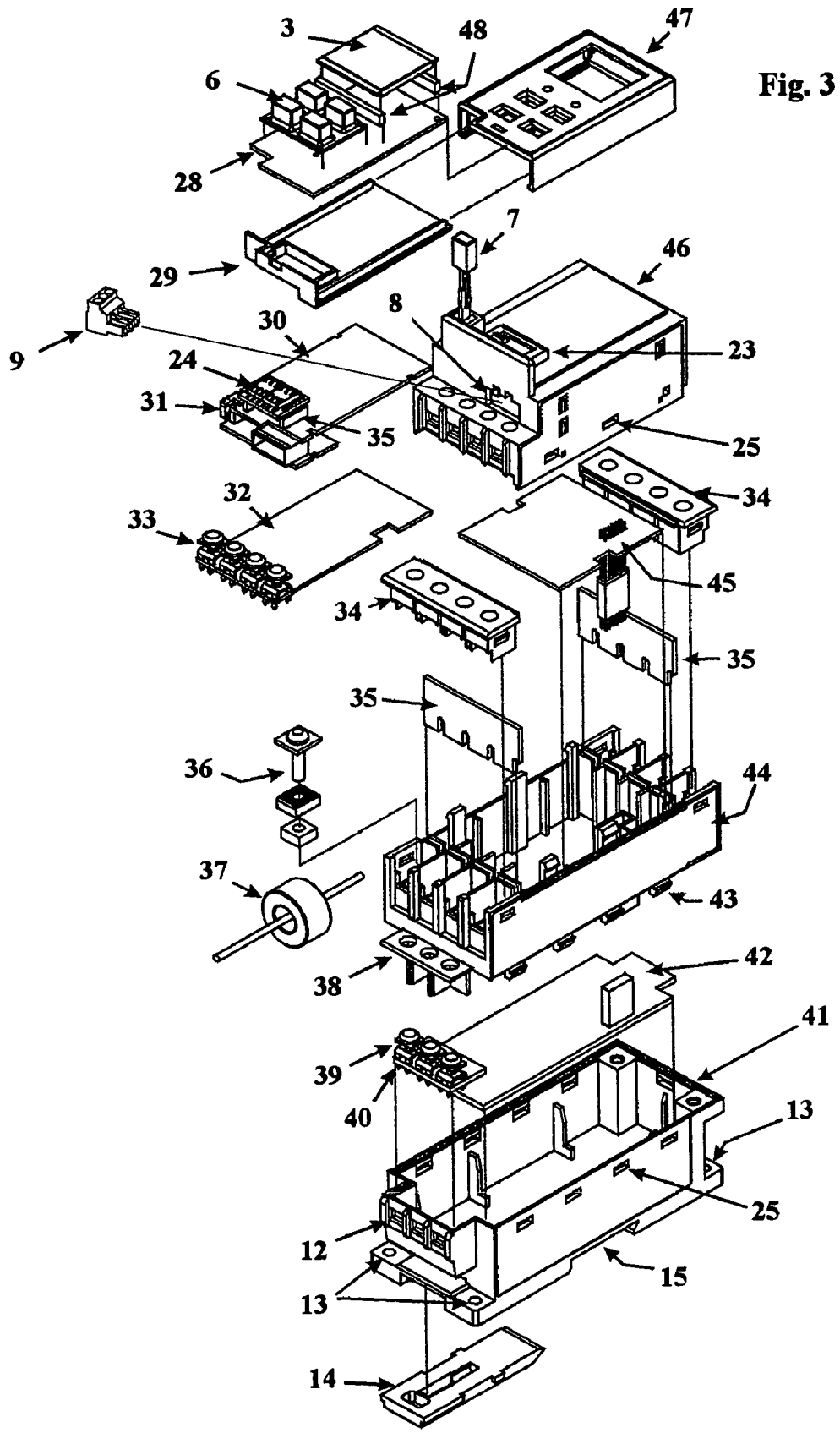
FIG. 3 is a mechanical diagram of the digital programmable motor overload protector shown with all its constituent parts exposed as it is assembled, including circuit card assemblies and hardware in accordance with the present invention.

FIG. 3 shows a perspective view (exploded) of the overload relay in accordance with the present invention. The overload relay housing base (41), besides providing mounting options through mounting bracket holes (13) and the din rail mounting slot (15), also provides for mounting of the switchmode power supply (SMPS) circuit card (42). The control power terminal board (40) mates to the switchmode power supply (SMPS) circuit card (42) and accurately aligns the control power terminals (39) within the control power input terminal block (12) and the integrated control power terminal cover (38) which is part of the internal current transformer (CT) housing (44).

The internal current transformer (CT) housing (44) provides an electrically isolated potting cup for the relay's internal current transformers (37) and wiring. In turn these items attach to the external current transformer terminal blocks (11) (as shown in FIG. 1) that are comprised of the external/internal CT terminals (36), the CT terminal finger safe snap in covers (34), the CT wiring safety barrier (35), and the molded slots within the internal current transformer (CT) housing (44).

The current transformer CT circuit card assembly (45) mounted in the internal current transformer (CT) housing (44), allows connectivity between the secondaries of the current transformers (37), and the I/O circuit card assembly (32) which is protected by the DSP housing (46). The trip contact terminals (33) which are mounted on the I/O circuit card assembly (32) are aligned by the DSP housing (46) such that the required electrical isolation required is created by the trip contact terminal block (10).

The DSP circuit card assembly (30) is the first card installed and locked into place by the DSP housing (46). Attached to this board is the Smart Card connector daughter board (31) which allows the Smart Card connectors (24) to protrude through the Smart Card connector alignment block (23); providing eventual connectivity to the removable user interface (2) (as shown in FIG. 1) or remote user interface (I/F) pedestal (22) as the application demands. On the bottom of the DSP circuit card assembly (30) another daughter board interfaces to the RS-485 communications receptacle (8), which will accept the RS-485 communications removable terminal (9). This configuration allows individual relay replacement or service without interruption to the multi-drop network to which the relays can be connected.

The removable user interface (2) (as shown in FIG. 1) is comprised of the user I/F circuit card assembly (28) and the two halves of the snap together housing; the user I/F housing base (29) and the user I/F housing cover (47). The entire removable user interface (2) (as shown in FIG. 1) can then be attached to the base module.

The "base module", which is the digital programmable motor overload relay (1) (as shown in FIG. 1) without the removable user interface (2) (as shown in FIG. 1) installed, is created, once all the circuit card assemblies are installed in their respective housings, by pushing the DSP housing (46) onto the internal current transformer (CT) housing (44) thereby connecting the current transformer CT circuit card assembly (45) to the I/O circuit card assembly (32), and pushing the housing base (41) onto the internal current transformer (CT) housing (44) thereby connecting the switchmode power supply (SMPS) circuit card (42) to the current transformer CT circuit card assembly (45). This arrangement creates a stacked circuit card arrangement inside the snap together housing which is locked in place by the snap in housing locks (43) and the integrated housing unit latch receptacles (25).

Figure 4:
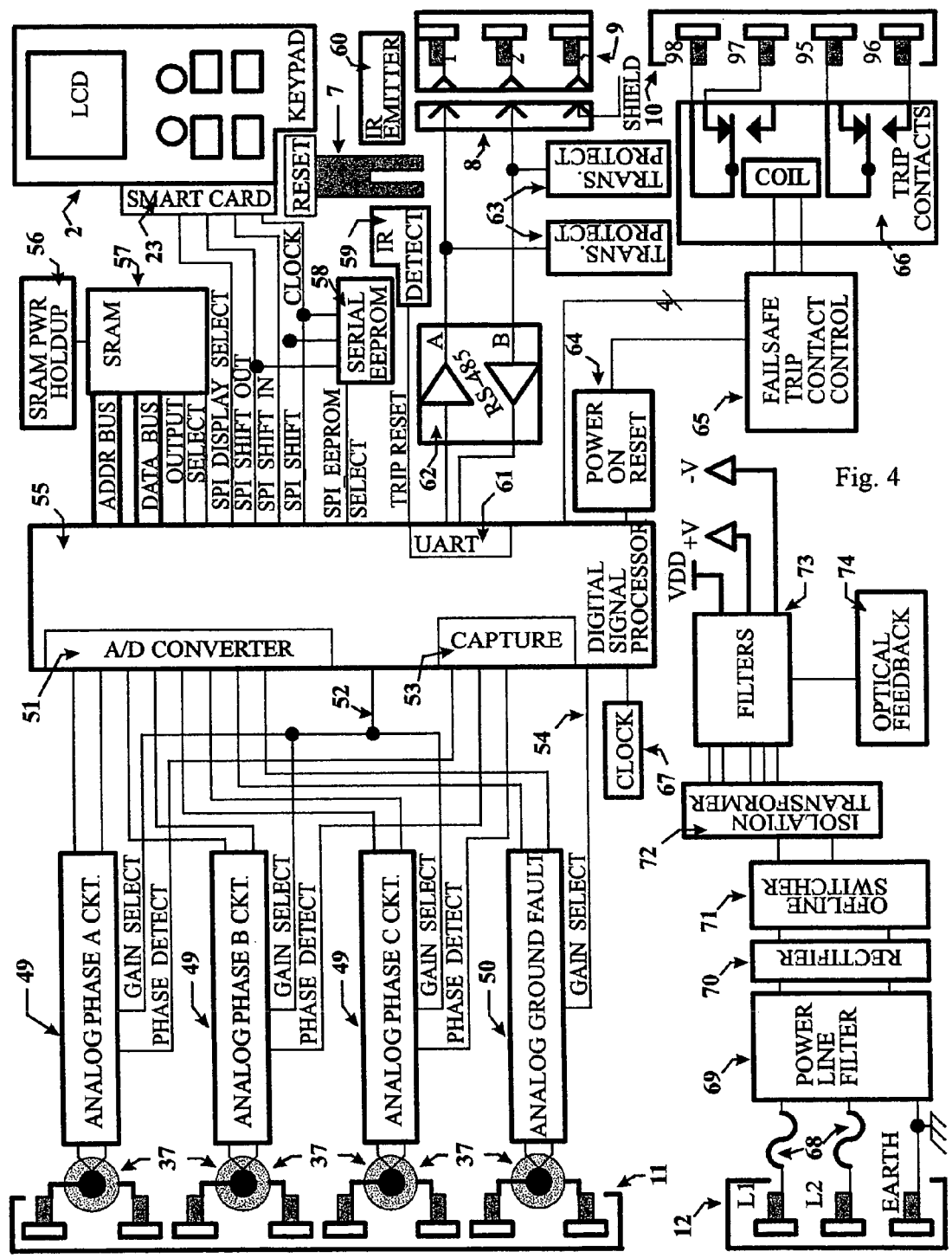
FIG. 4 is a systems level block diagram of the digital programmable motor overload protector in accordance with the present invention.

FIG. 4 depicts a high level block diagram of a digital programmable motor overload relay in accordance with the present invention. Central to the electronics design of the digital programmable motor overload relay is the Digital Signal Processor (55) which has a 16 bit data and program word length and operates internally at 29,491,200 Hz by multiplying the clock oscillator (67) through and embedded phase locked loop. This clocking arrangement allows the Digital Signal Processor (55) to have an instruction cycle of 34 nanoseconds and drive the embedded UART (Universal Asynchronous Receiver/Transmitter) (61) at industry standard baud rates from 2400 to 38.8K baud. Embedded-segmented flash memory, in the Digital Signal Processor (55), provides secure program storage with the ability to be field upgraded over the RS-485 communications driver receiver (62). An independent power on reset supervisor (64) ensures the Digital Signal Processor (55) can only be operated when conditions ensure its reliability. Additionally the power on reset supervisor (64) has a watchdog timer to ensure software processes are always controlled and predictable.

Temporary storage of variables, partially calculated results, and dynamic elements of the overload and protection analysis processes are provided by embedded dual port memories in the Digital Signal Processor (55), and the static random access memory (57) external to the Digital Signal Processor (55). In order to provide consistent motor protection, through facility power lapses as great as three hours, the static random access memory (57) and its contents are maintained when power is removed from the digital programmable motor overload relay. The SRAM power hold-up circuit (56) gives the digital programmable motor overload relay the ability to "remember" the state of the motor when power has failed and avert a motor restart while it is possibly still too hot to do so without potential damage to the motor.

Further embedded attributes of the Digital Signal Processor (55) include a ten (10) channel, ten (10) bit analog to digital converter (51) with integrated sample and hold, such that two gains from each phase current input and the ground fault current can be measured after they are processed by the analog phase circuit (49) and the ground fault analog circuit (50) respectively. Digital transition capture circuits (53), synchronized by an embedded timer, allow for the reconstruction of phase sequence information from the analog phase circuits (49). Discrete embedded digital input/output lines are used to switch the gains in the analog phase circuits (49) with the analog phase gain select control (52) while the analog ground fault gain select control (54) provides independent gain variability over the ground fault analog circuit (50). Input to the analog phase circuits (49) and the ground fault analog circuit (50) are sensed by the relay's internal torodial current transformers (37) which connect to the users external current transformer by way of the external current transformer terminal blocks (11).

An additional embedded serial communications port of the Digital Signal Processor (55) facilitates communications and control over a serial electrically erasable memory (EEPROM)(58). This memory provides non-volatile storage of default relay settings, user originated operational settings, and calibration values that must be maintained; changeable as needed, and readily available to the Digital Signal Processor (55) upon the application of power to the relay. Further, the serial communications port, which conforms to the industry standard Serial Peripheral Interface as defined by Motorola Semi. Inc., provides all communications to the removable user interface (2) (as shown in FIG. 1). The communications and control lines to the removable user interface (2) (as shown in FIG. 1) are carried by the Smart Card connectors in the Smart Card connector alignment block (23).

Resettable elements of the functional software, relative to the protection function under relay control, are accessible to a user by way of the user reset button (7). This user reset button (7), in anticipation of the rigors of a typical industrial environment, has been designed to allow the relay housing to absorb all shock, intentional and unintentional. The translation of mechanical motion to the users intended reset action is accomplished by optical means, by way of a slot in the user reset button (7), an infrared emitter (60) and an infrared detector (59). The advantages of this method include relatively indefinite switch cycle life and immunity to dirt, humidity, and vibration expected of continuous use in a harsh industrial environment. The reset signal is coupled to and detected by the Digital Signal Processor (55) through one of many embedded discrete digital input output lines of the processor.

Communications to external user automation systems is coupled through the RS-485 communications removable terminal (9) and is buffered, both to and from the Digital Signal Processor (55), in half duplex mode by the RS-485 communications driver/receiver (62). Since multi-drop communications lines are highly susceptible to shock damage communications line transient protection (63) is provided to restrict outside sources from impressing these circuits with a voltage greater than +/−12 Volts while creating a shunt path capable of tolerating up to 6000 VDC.

The main element translating protection schemes into direct protection action is the trip contact relay (66), which interfaces to the users motor contactor circuits through the trip contact terminal block (10); both normally open (industry standard 95/96 contact numbering) and normally closed (industry standard 98/97 contact numbering) relay contacts are provided. Due to the extreme importance of the relay's conduct, in maintaining motor protection, a failsafe trip contact control circuit (65) has been added. This circuit can detect when the Digital Signal Processor (55), has for whatever reason, failed to secure steadfast control over the relays operation and will force the relay circuit to reset signaling the users motor contactor circuits to drop the motor out since protection is no longer guaranteed.

Facility control power is applied to the digital programmable motor overload relay through the control power input terminal block (12). The power supply will work satisfactorily over industry standard universal power input. The L1 or "hot" lead and the L2 or neutral line have line fuses (68). These will open if the switchmode power supply draws excessive current, which can only happen in the event of an internal failure. A power line noise filter (69) restricts the high frequency noise of the Digital Signal Processor (55) and its associated digital circuitry from appearing on the facility power line; potentially causing disruptions in other circuits attached to the same power line. Once past the noise filter the line power is applied to the line rectifier and hold-up capacitors (70) which transform the input power to direct current (DC) and then charge a large capacitor bank that allows power line outages of up 100 milliseconds to be tolerated by the relay or "ride through", with normal, uninterrupted operation thereby avoiding nuisance tripping of the motor. The offline switchmode power converter (71), capable of withstanding and controlling the high voltages capable of being present on a standard facility control power line, switches the line voltage across the high isolation power switching transformer (72). The secondary side of the high isolation power switching transformer (72), applies the output to regulated power filters (73) to produce the voltage sources required to operate the internal electronics of the digital programmable motor overload relay. Output from the regulated power filters (73) section is used to develop a feedback control voltage representative of input line variations and relay load swings which, when coupled back to the offline switchmode power converter (71) through the isolated optical feedback control circuit (74), will modulate the switching characteristics of the offline switchmode power converter (71) such that the sources from the regulated power filters (73) will regulate, maintaining their appropriate outputs in a timely and stable fashion. The high frequency switching, 100 kHz, of the offline switchmode power converter (71) creates noise within any circuit connected to the regulated outputs. The design of a 100 kHz switchmode power supply, when used with the analog phase circuit (49) and the ground fault analog circuit (50), provides low noise signal processing by forcing the created noise beyond the range of the analog circuits thereby reducing overall system noise.

Figure 5:
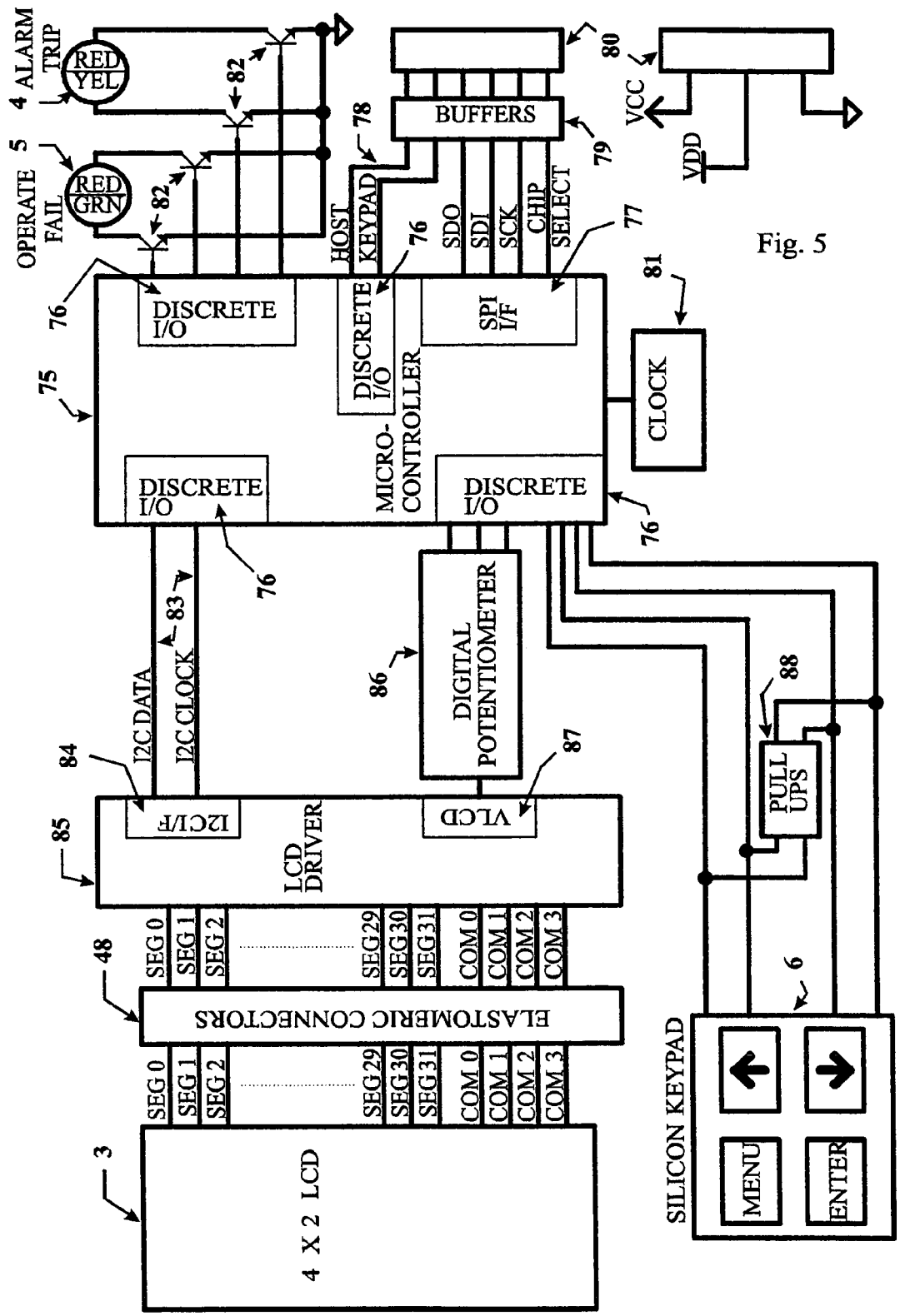
FIG. 5 is a systems level block diagram of the detachable user interface in accordance with the present invention.

FIG. 5 shows a high level block diagram of a removable user interface (2) (as shown in FIG. 1), an integral part of a digital programmable motor overload relay, in accordance with the present invention. The removable user interface provides a means for a user to enter protection settings, pertinent motor data, and to view actual operational parameters of a running motor.

The user interface micro-controller (75) and its embedded software process communications from the base module over an embedded serial peripheral interface (77). The clock oscillator (81), running at 20 MHz, provides the time base which the user interface micro-controller (75) needs to operate. Communications packets direct the user interface micro-controller (75) to display user requested data on each line of the 4 character×2 lines liquid crystal display (3), to illuminate the relay and motor status light emitting diodes as required, and pass back to the base module user keypad button depressions.

Both power and communications to the user interface micro-controller (75) arrive over the user interface Smart Card connector pads (80) with the communications and control lines buffered by the communications line buffers (79). These buffers serve to translate the logic levels from the base module to the required level at the user interface micro-controller (75).

Besides the communications that occur over the embedded serial peripheral interface (77), the base module to micro-controller ready lines (78) are used to signal to each processor the readiness of its counterpart. These signals interact with the user interface micro-controller (75) by embedded discrete digital control lines (76) on the micro-controller. Similar embedded discrete digital control lines (76) create a software driven industry standard I$^2$C (pronounced "I squared C") communications port (83) to service the two wire I$^2$C communications interface (84) embedded in the liquid crystal segment drive controller (85).

Messages from the base module, that are to appear on the 4 character×2 lines liquid crystal display (3), arrive at the user interface micro-controller (75) as ASCII strings defined for each of the two lines of the display. The user interface micro-controller (75) translates these strings into a series of "on" and "off" segments for specific memory locations inside the liquid crystal segment drive controller (85). The segment drive controller is directed to make the necessary memory location updates over its I$^2$C communications interface (84). The liquid crystal segment drive controller (85) creates the bipolar drive signals to turn "on" or "off" the segments as indicated by the individual memory cells within and places these signals at the elastomeric connectors (48) which interface the printed circuit board copper traces to the respective segment on the glass interface of the 4 character×2 lines, liquid crystal display (3). Modulating the LCD contrast voltage control input (87) of the liquid crystal segment drive controller (85) by means of a digitally controlled potentiometer (86) allows the contrast on the 4 character×2 lines, liquid crystal display (3) to be dynamically changed for the best viewing as determined by the user.

At a glance, status of the motor and the digital programmable motor overload relay are available from the front on the removable user interface (2) (as shown in FIG. 1). The dual indicator, operate/fail (5), indicates the status of the entire overload relay system. When the green side is illuminated steadily, the system is running fine, when flashing, a start up or user initiated diagnostic is running. A red indicator advises that a failure of the system has occurred and user intervention is required. The dual indicator, alarm/trip (4), when lit amber, is indicating that an alarm condition in the motor (per the user alarm settings) has occurred. The red indicator reveals that, due to motor conditions and user trip setting levels, a trip or removal of power to the motor has been directed by the digital programmable motor overload relay. The individual indicators are controlled by the user interface micro-controller (75) through embedded discrete digital control lines (76) which cause the required indicator to light by activation of its respective LED driver circuit (82).

User interaction with the digital programmable motor overload relay over the removable user interface (2) (as shown in FIG. 1) is accomplished via the silicon user interface keypad (6). User key depressions force to a logic "zero" voltage level, the lines that the keypad switch pull up circuits (88) maintain at a logic "one" voltage level. The user interface micro-controller (75) continually samples these through the embedded discrete digital control lines (76) and provides a software debounce that eliminates false keystrokes. The intended keystrokes are then inserted into a communications packet sent to the base module where the operational relay software can interpret and react to the user's request.

FIGS. 6A through 6G depict a series of block and schematic diagrams that detail the operation of the analog phase circuits of a digital programmable motor overload relay, in accordance with the present invention. The analog phase circuits (49) are required to process and condition the raw analog input from the internal current transformers (37) (shown in FIG. 4) into a form that minimizes noise while maximizing the use of the analog to digital converter (51) (shown in FIG. 4) into which the final signal will be fed.

Figure 6A:
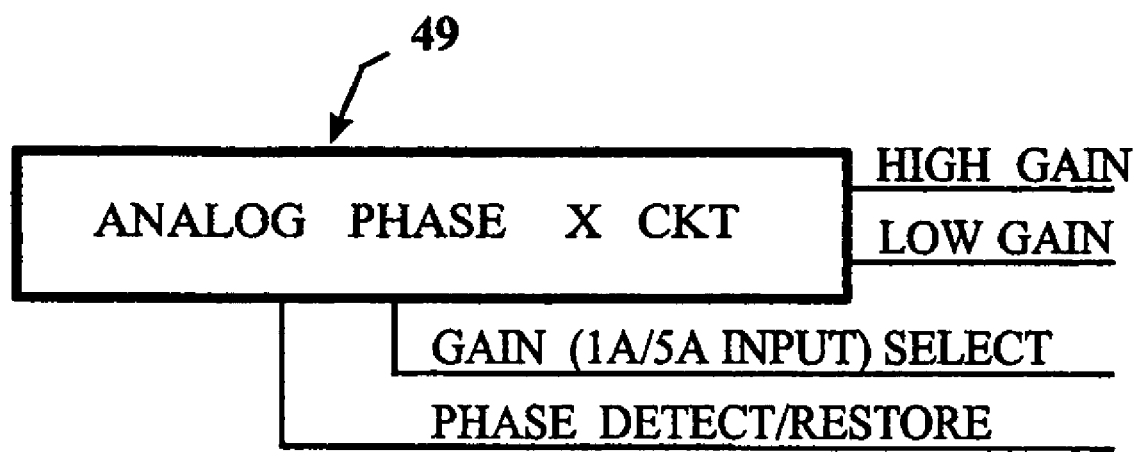
FIGS. 6A and B are intermediate level block diagrams of the analog front end for the phase current inputs to the data acquisition system in accordance with the present invention.

FIG. 6A is the intermediate level block diagram of the analog phase circuits (49) which show, that for a single input, two separate gains of the same signal are presented to the analog to digital converter. This arrangement allows greater resolution of low level signals while keeping the overall dynamic range of the input intact. A single input control line allows the switching of gains required for the possible inputs of industry standard external current transformers that may be used with the relay.

Figure 6B:
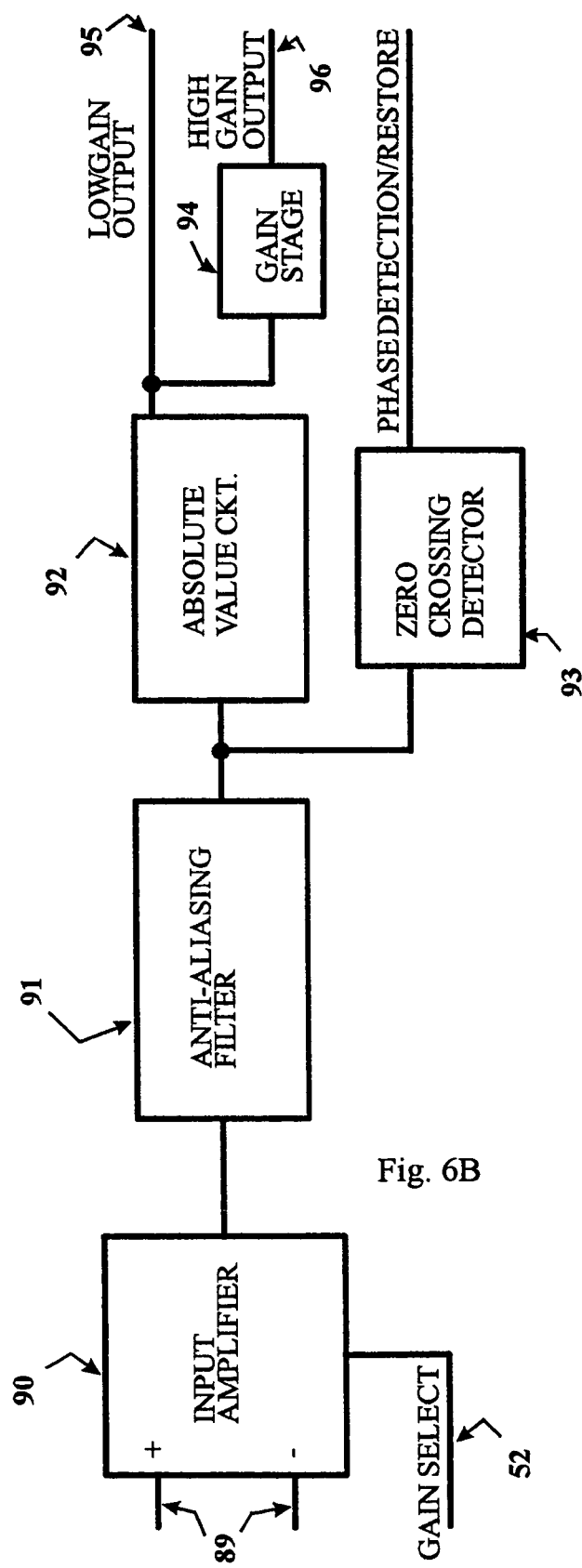
FIGS. 6C thru G are schematic diagrams of the five circuits that make up the analog front end of the data acquisition system in accordance with the present invention.

FIG. 6B shows, in increasing detail, the organization of the analog phase circuits (49). The input amplifier (90) is the stage that responses to gain directed changes under the control of the digital signal processor DSP. The anti-aliasing filter (91) eliminates signal frequencies outside of the target signal frequency range since the over sampling performed at the analog to digital converter would interpret these out of bound signals as part of the motor current signal. Due to the low input range of the monotonic analog to digital converter (3.3V max.) and the bipolar dynamic range of the input signal, processing the signal through an absolute value circuit (92) effectively doubles the resolution of the analog to digital converter. The zero crossing detector (93) restores the phase relationship information lost in the absolute value circuit (92). The final gain stage (94) amplifies the typical steadystate operating range of the expected input from the external current transformers to the maximum input possible for the analog to digital converter thereby assuring the greatest resolution and accuracy is applied in the normal operating range of the motor to be protected. The gain established by the input amplifier (90) provides the low gain output to the A/D converter (95), while the high gain output to the A/D converter (96) is sourced from the output of the final gain stage (94).

Figure 6C:
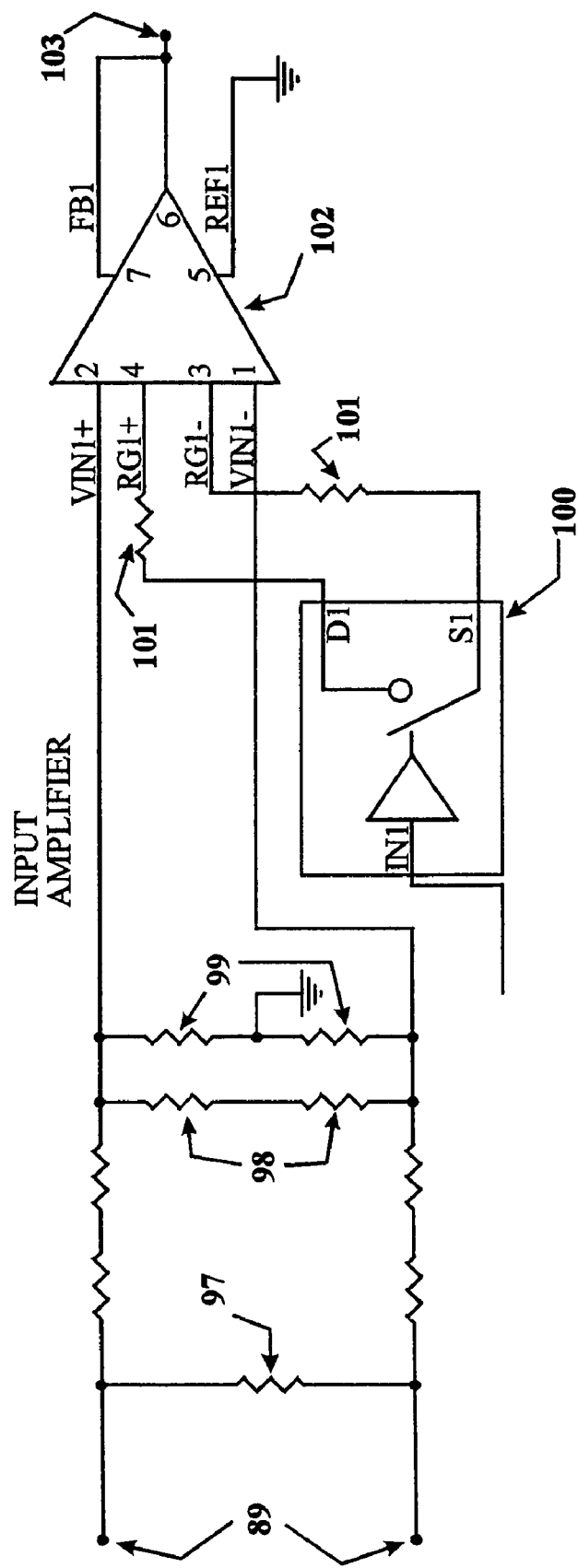

FIG. 6C is the schematic diagram of the input amplifier (90) (as shown in FIG. 6B). The input to the circuit (49) (as shown in FIG. 4) is obtained from current signals passing through the internal current transformers (37) (as shown in FIG. 4). Signals obtained from the secondaries of the internal current transformers (37) are applied across the input burden resistor (97). The value of this resistor is chosen to be the smallest possible value that will not load down or "burden" the output of the current transformers. The balanced input voltage divider (98) develops that portion of the input signal required by the natural gain of the instrumentation amplifier (102) and the dynamic range of the analog to digital converter (51) (as shown in FIG. 4). The bleed resistors (99) are used to provide a return path for the input bias currents of the instrumentation amplifier (102) which can force the amplifier to saturate. The low resistance analog switch (100) couples the gain setting resistors (101) into the instrumentation amplifier (102) gain section thereby changing the gain from the amplifiers natural level to one required by the selection of the external current transformers output. The gain normalized analog phase output (103) is then coupled to the next stage of the analog phase circuits (49) (as shown in FIG. 4).

Figure 6D:
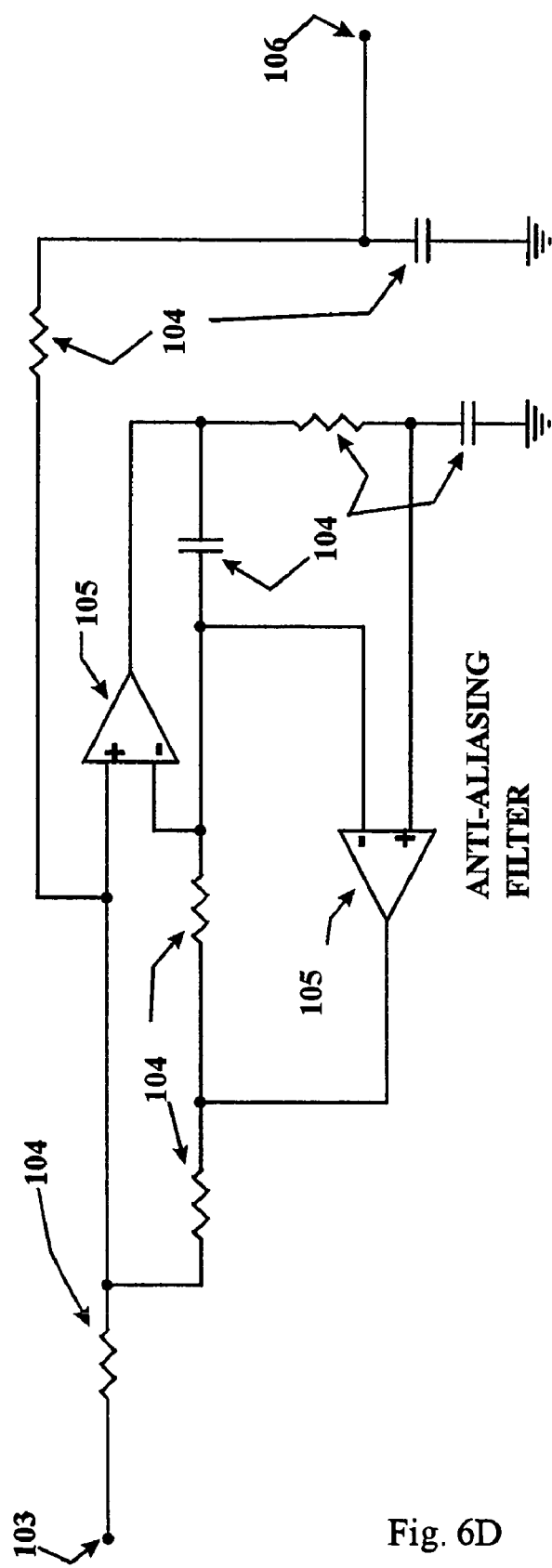

FIG. 6D is the schematic diagram of the anti-aliasing filter (91) (as shown in FIG. 6B). The input to this circuit is the output from the input amplifier (90) (as shown in FIG. 6B) stage and as such carries all the possible current signals available across the internal current transformers (37) (as shown in FIG. 4). The anti-aliasing filter is used to prevent undesired signal frequencies that do not contribute to the accurate measurement of the target signals, from folding back around the sample frequency and appearing as part of the target signal as a by-product of the digitization process. The anti-aliasing filter is a third order Generalized Immittance Converter (GIC). This style of filter though common to quality audio applications is unique to industrial uses. The GIC filter amplifiers (105), with the passive components of the GIC filter (104), effectively create a frequency dependent negative resistor which passes the target signal frequencies at unity gain while substantially attenuating signals above those frequencies. The frequency limited phase output (106) has a very high impedance and therefore needs to be followed by a circuit that will not load down the output.

Figure 6E:
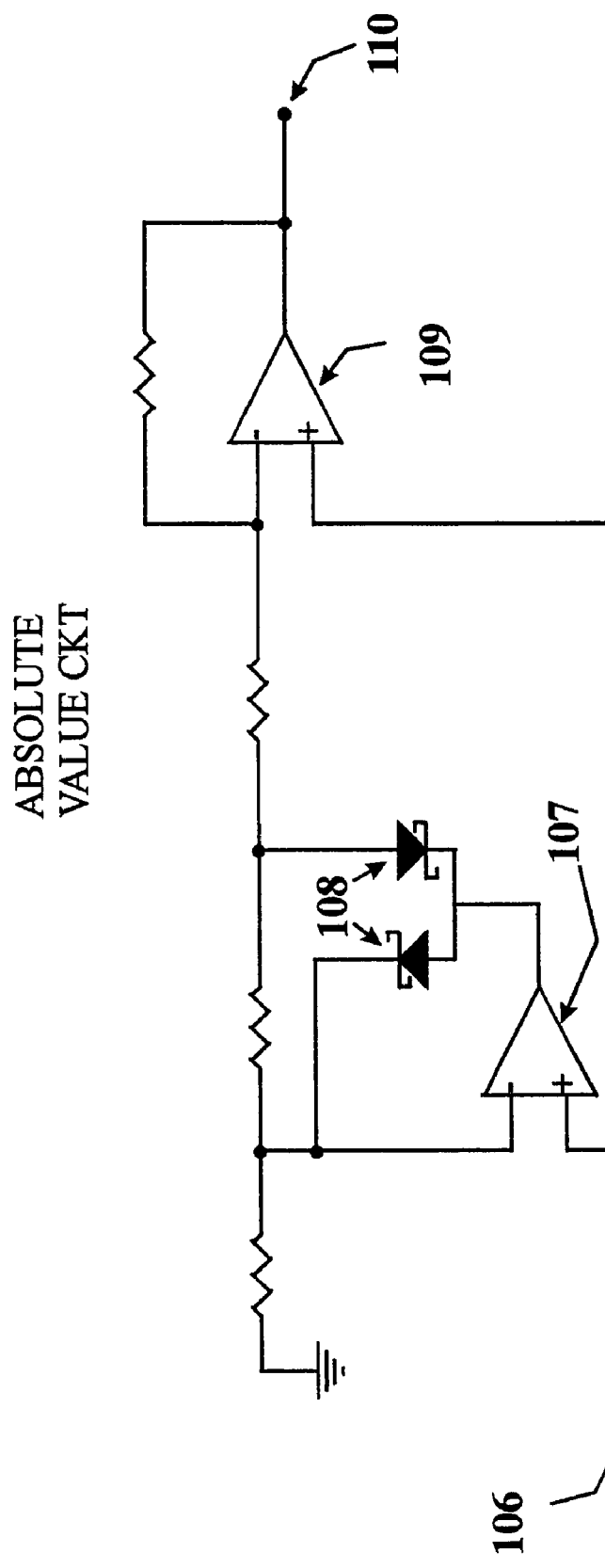

FIG. 6E is the schematic diagram of the absolute value circuit (92) (as shown in FIG. 6B). The frequency limited phase output (106) from the anti-aliasing filter (91) (as shown in FIG. 6B) feeds this circuit and was therefore designed to be self buffering (high input impedance) as can be observed by the input signal coupled to the positive input of the precision rectifier amplifier (107) and the unity gain buffer (109). The combination of the precision rectifier amplifier (107) and the matched schottky rectifiers (108) creates a nearly lossless gain switching arrangement between the negative and positive input signal swings. The result is a precision rectified phase output signal (110).

Figure 6F:
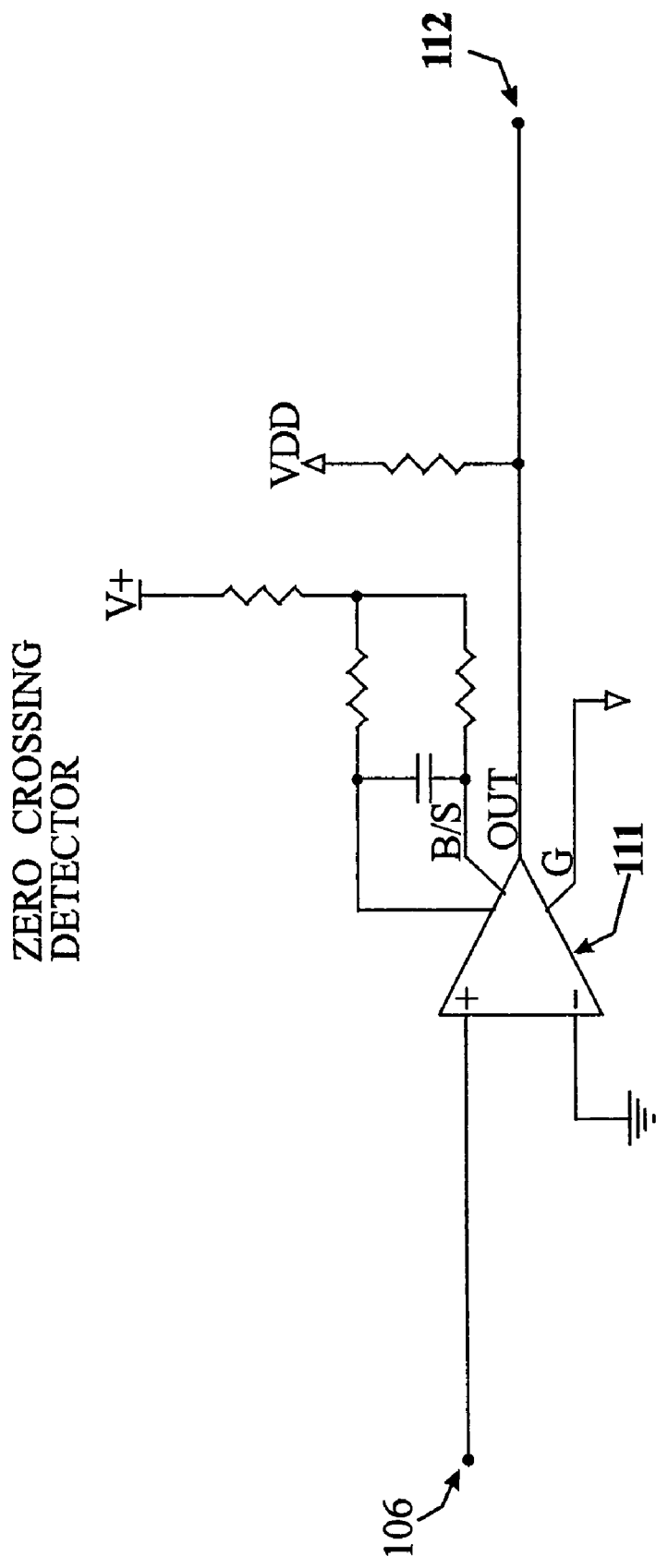

FIG. 6F is the schematic diagram of the zero crossing detector (93) (as shown in FIG. 6B). The input to this circuit is from the frequency limited phase output (106) from the anti-aliasing filter (91) (as shown in FIG. 6B). The circuit presents a high impedance input with the use of an open collector comparator circuit (111) connected to the non-inverting input. The comparator provides low input offset sense of levels greater than signal ground which causes its output to switch to VDD creating a digital level normalized phase detection output (112) which is ready for direct input to the capture inputs (53) (as shown on FIG. 4) of the digital signal processor. The recovery of the phase relationships of each phase input allows for a complete digital reconstruction of the phase input signal.

Figure 6G:
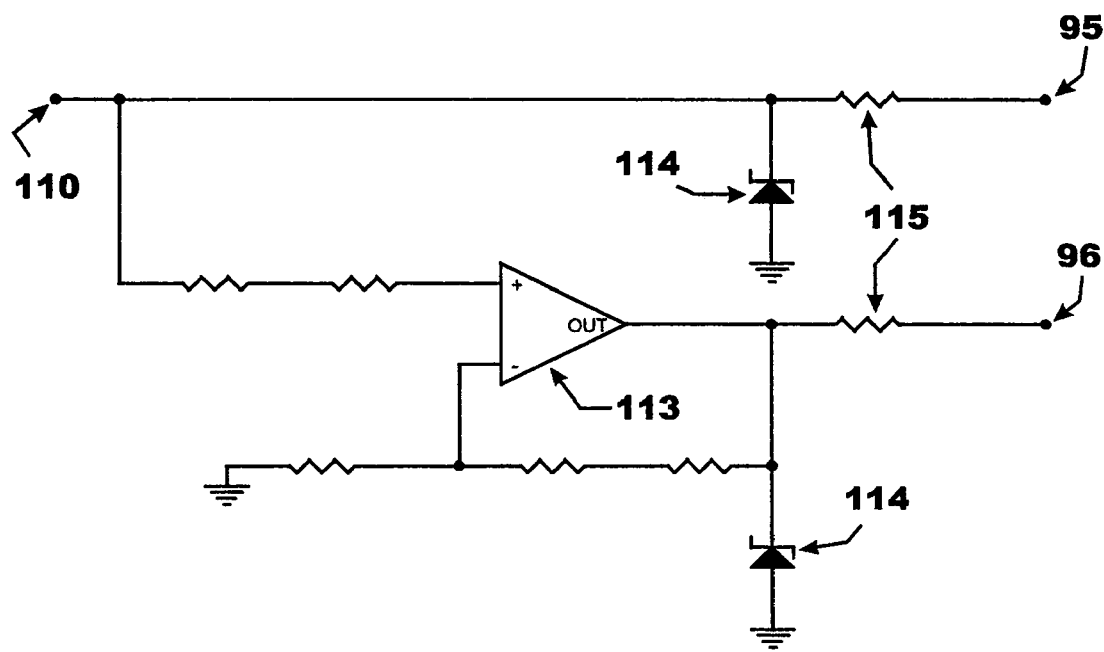

FIG. 6G is the schematic diagram of the final gain stage (94) (as shown in FIG. 6B). The input to this circuit is the precision rectified phase output signal (110) (as shown in FIG. 6E). Since unity gain has been preserved through all the stages leading up to this point the signal level at the low gain output to the A/D converter (95) (as shown in FIG. 6B) is that determined at the input amplifier (90) (as shown in FIG. 6B). The zener diode level clamps (114) function to protect the sensitive input circuits of the embedded analog to digital converter in the digital signal processor. The impedance matching resistors for the analog to digital converter (115) ensure proper transfer of the signal to be digitized. The high gain phase analog amplifier, in a non-inverting configuration, provides the additional accuracy required for the protection function at the typical operational range of the motor.

Figure 7A:
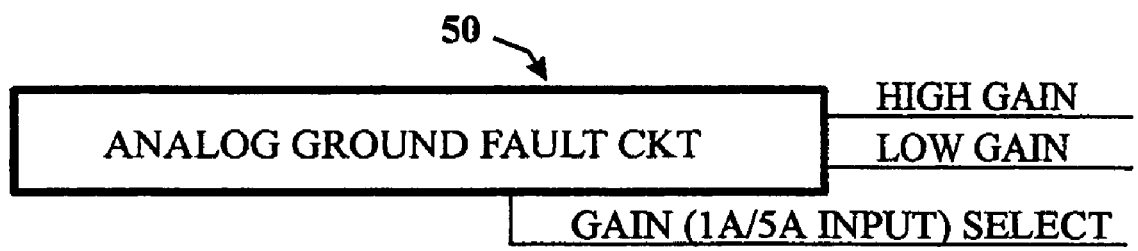
FIGS. 7A and B are intermediate level block diagrams of the analog front end for the ground fault input to the data acquisition system in accordance with the present invention.
Figure 7B:
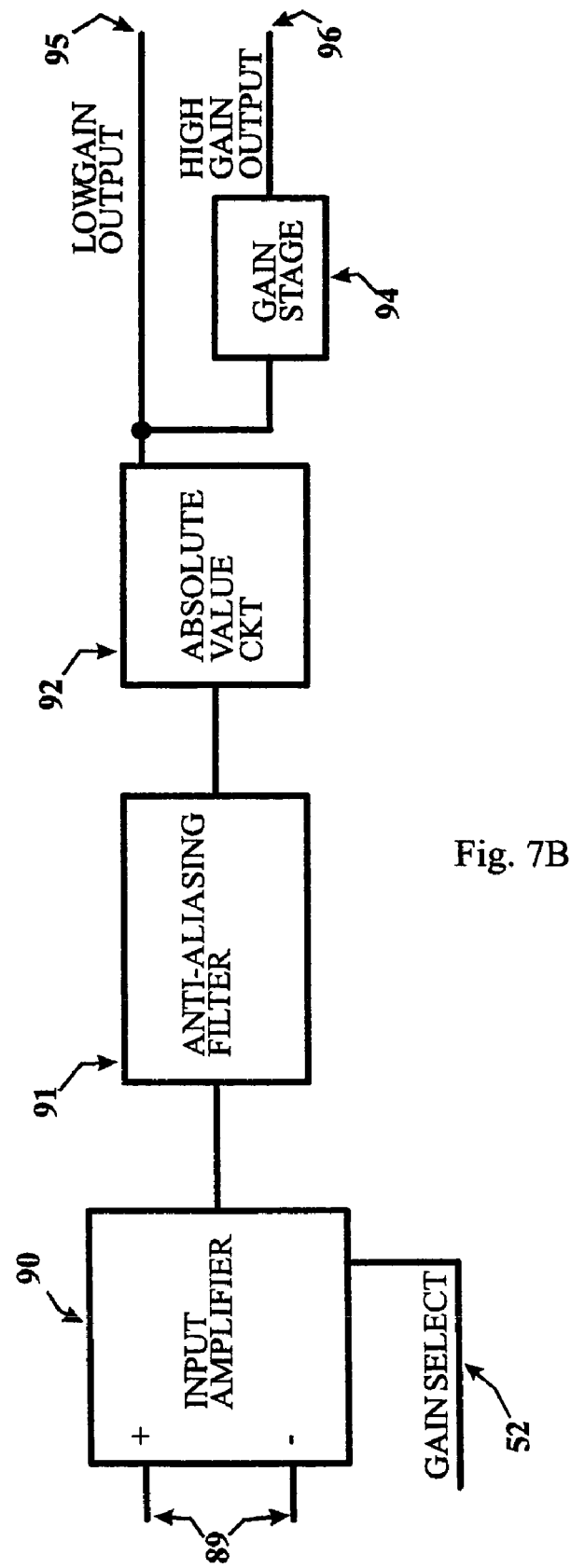

FIG. 7A and 7B are block diagrams detailing the structure of the analog ground fault circuit (50) (as shown in FIG. 4). Though substantially similar to the analog phase circuits (49) (as shown in FIG. 4) the zero crossing detector (93) (as shown in FIG. 6B) is not required and therefore missing from the analog ground fault circuit (50) (as shown in FIG. 4). All other descriptions related to the analog phase circuits (49) (as shown in FIG. 4) apply to the ground fault analog circuits.

Figure 8:
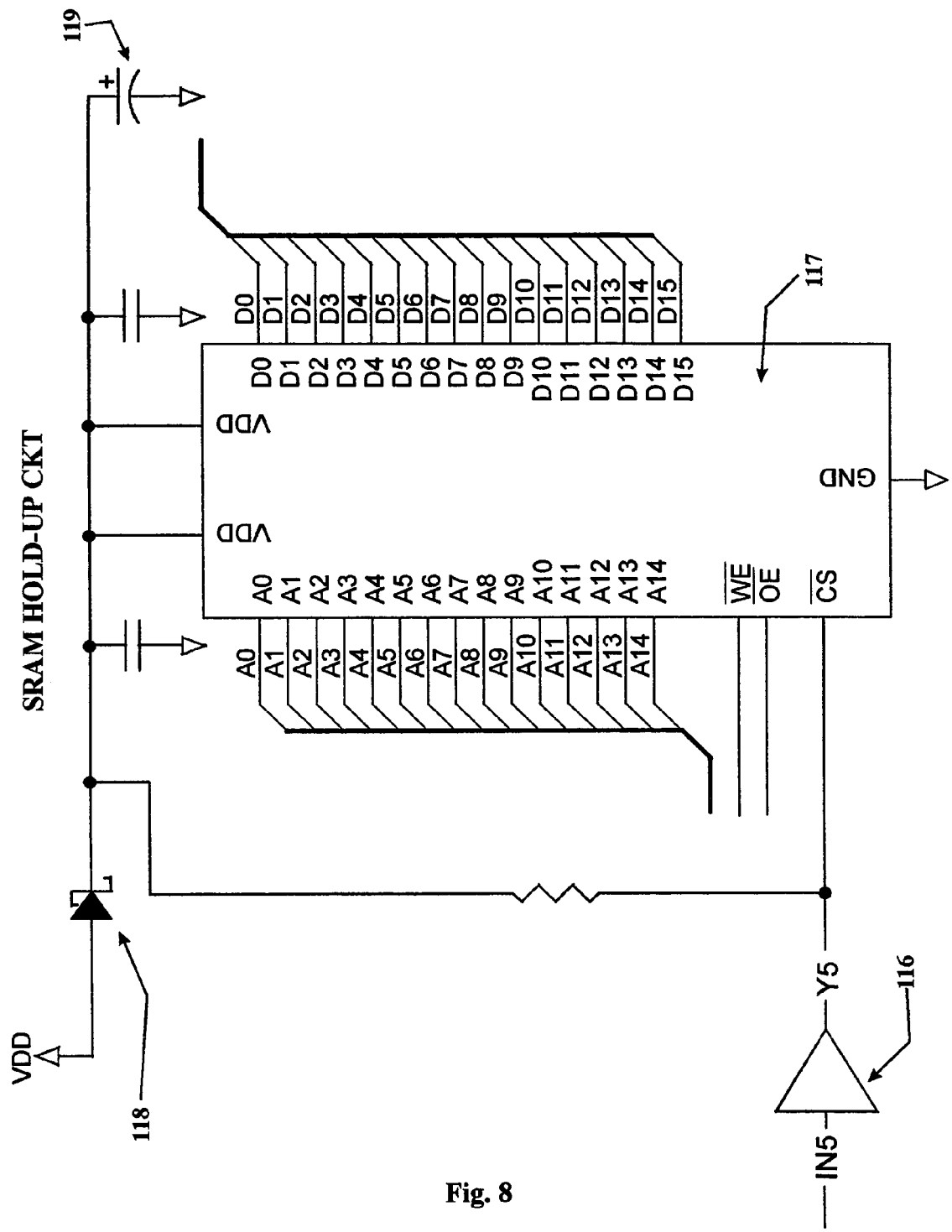
FIG. 8 is a schematic diagram of the SRAM hold up circuit in accordance with the present invention.

FIG. 8 is a schematic diagram that details the operation of the SRAM Hold Up Circuit of a digital programmable motor overload relay, in accordance with the present invention. The static random access memory (117) maintains temporary storage of variables, partially calculated results, and dynamic elements of the overload and protection analysis processes. In the event of loss of facility power the motor can potentially be re-started, while hot, if power is returned before the motor has had sufficient time to cool. By maintaining the memory, for the period of time beyond which the motor is assured to have returned to room temperature, the operational software will detect the occurrence of the power failure and prevent the re-start of the motor and time the cool down period from the last known operating temperature of the motor. Manual intervention can reset this inhibited start state.

To facilitate holding the SRAM data, for a period of over three hours, a schottky power source switch diode (118) isolates the VDD source from the SRAM when power to the relay is removed. As a result the electric double layer storage capacitor will provide power to the SRAM. The open collector SRAM chip select buffer (116), upon losing power, exerts a large impedance at the chip select line of the SRAM pulling the chip select line voltage level to the level sourced by the storage capacitor. Under these conditions the SRAM is placed in a low power, dormant mode, further increasing the time over which its contents can be maintained by the discharge of the electric double layer storage capacitor.

Figure 9:
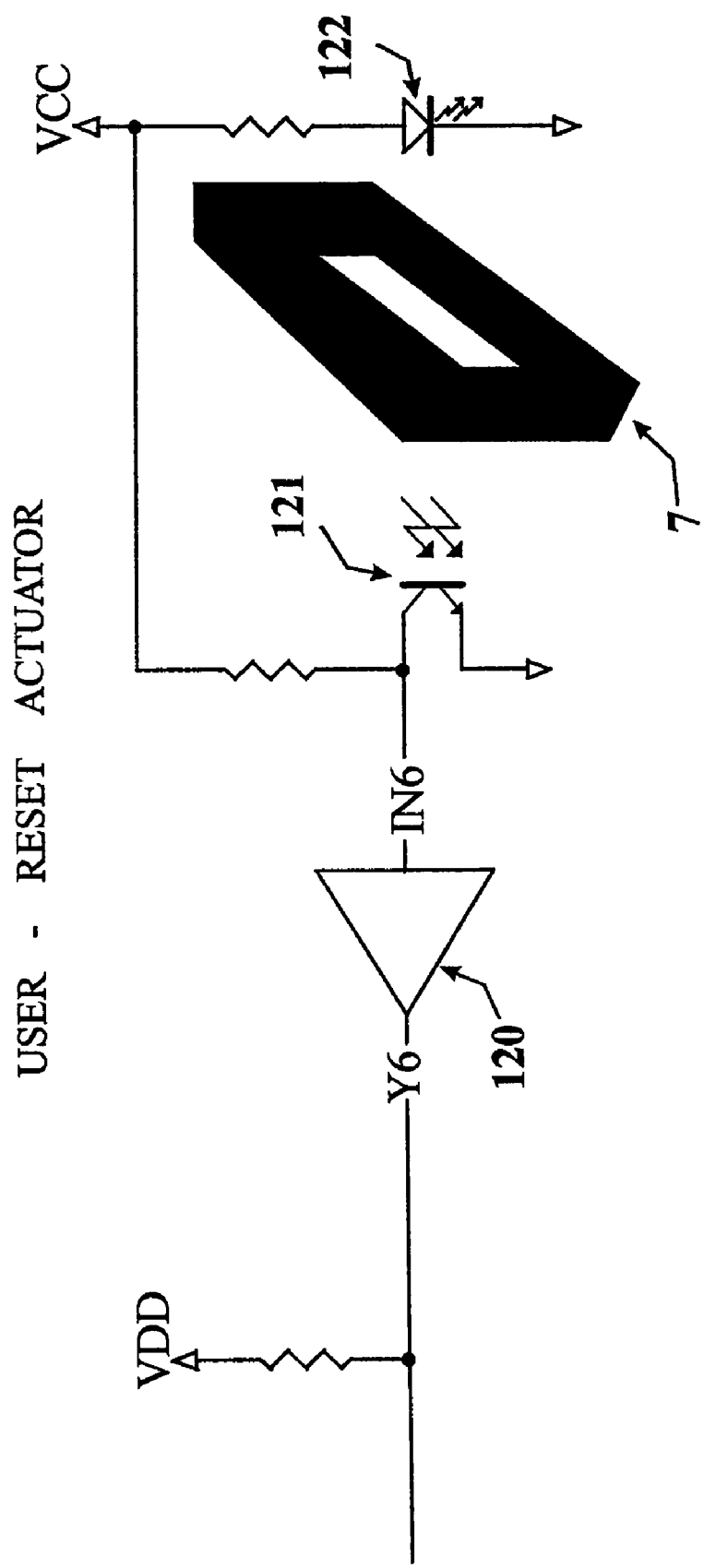
FIG. 9 is a schematic/mechanical diagram of the user—reset actuator circuit in accordance with the present invention.

FIG. 9 is a schematic diagram that details the operation of the user-reset actuator of a digital programmable motor overload relay, in accordance with the present invention. Depressing the user reset button (7) allows the infrared energy from the infrared emitter (122) to fall on the lens of the infrared detector transistor (121) causing the transistor to saturate. This condition forces the input to the digital level buffer (120) to be driven to the digital ground level. As a result a logic "low" is applied to, an interpreted by, the digital signal processor as a request to process a user reset which is a software controlled reset over a limited set of operational parameters at the discretion of the local user.

Figure 10:
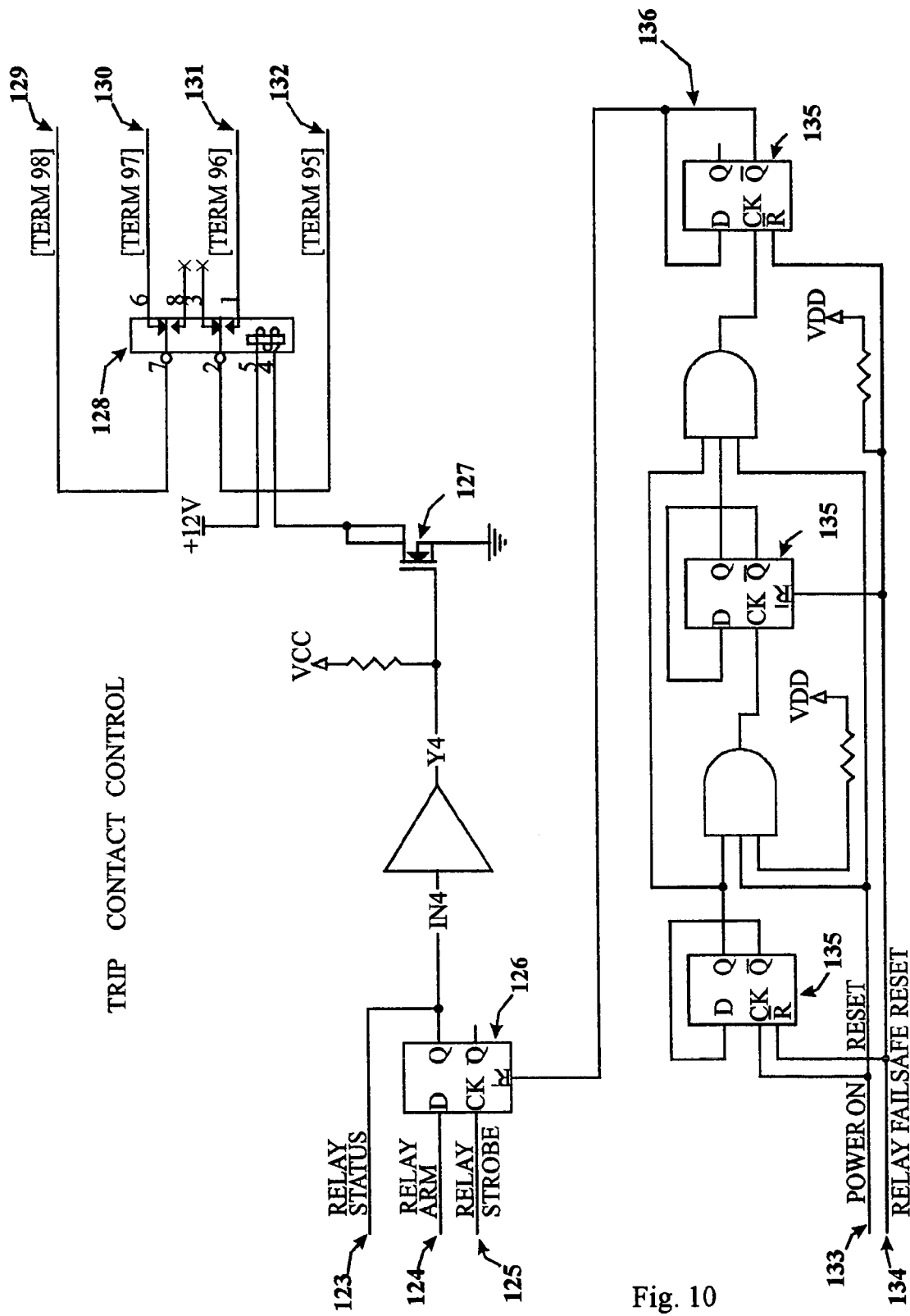
FIG. 10 is a schematic diagram of the trip contact control circuit in accordance with the present invention.

FIG. 10 is a schematic diagram that details the operation of the Failsafe Trip Contact Control Circuit of a digital programmable motor overload relay, in accordance with the present invention. In the event of a hardware or software error a condition can exist such that the digital signal processor cannot clear the error and regain control of the protection process. If the trip contacts are already energized, allowing the motor to operate when the protection process has ceased to function, the motor and the mission it serves are at risk. To remove this possibility a back up or "failsafe" circuit provides a redundant trip control that does not depend upon a functioning digital signal processor.

Under normal conditions the trip contacts are controlled by discrete output lines from the digital signal processor. The relay arm control line (124) driven to a logic "one", and held at that level, when the relay strobe control line (125) is "toggled" (transitioned from a logic "zero" to a logic "one" and back again) will cause the relay control latch (126) to set. With the relay control latch (126) set the relay coil drive transistor (127) will saturate activating the trip contact relay (128). The active state of the trip contact relay (128) causes trip contact 98 (129) and trip contact 97 (130), which are normally closed, to open, at the same time the trip contact 96 (131) and trip contact 95 (132), which are normally opened will be closed.

If the digital signal processor is unable to function it will fail to "pet the watchdog" circuit in the power on reset supervisor (64) (as shown on FIG. 4). After a maximum of 200 msec the watchdog circuit will cause a power on reset which will automatically activate the power on reset control line (133). Each time the power on reset control line (133) is triggered the power on reset counter (135) will advance. After three power on reset events the relay latch forced reset line (136) will be driven to a logic "one" causing the relay control latch (126) to reset and thereby returning the trip contact relay (128) to its inactive state. Only removing and re-applying control power to the relay will remove this condition and allow the trip contact relay (128) to be activated again.

In a normal power on sequence, in a fully functional overload relay, once the digital signal processor has successfully completed its start up diagnostics the failsafe circuit reset control line (134) will be "toggled" to establish the failsafe circuit in its fully active state.

The relay status control line (123) allows the digital signal processor to sample the relay control latch (126) to ensure the trip contact relay (128) is always in a known state.

Figure 11A:
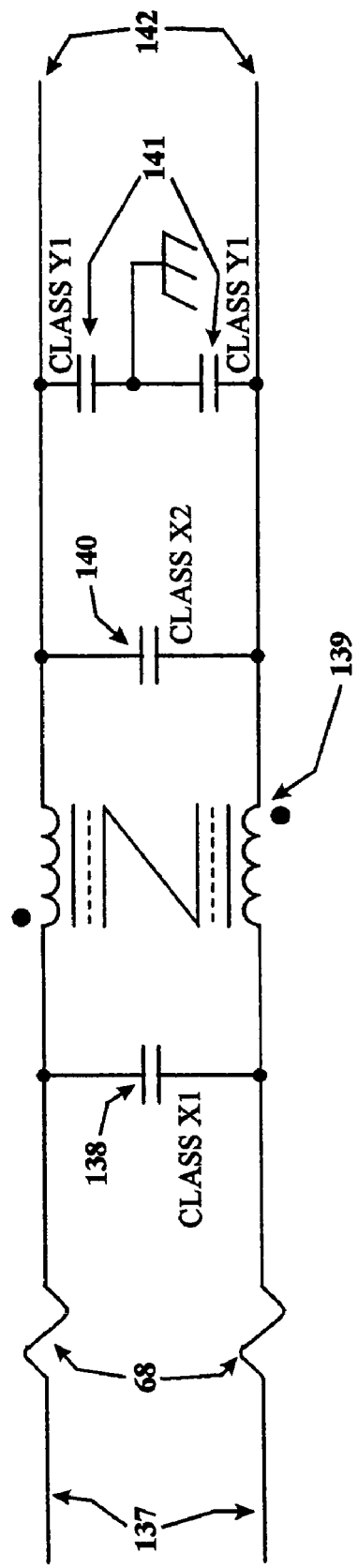
FIG. 11A is a schematic diagram of the power line filter circuit in accordance with the present invention.

FIG. 11A is the schematic diagram that details the operation of the Power Line Filter Circuit of a digital programmable motor overload relay, in accordance with the present invention. The power line filter serves to eliminate radio frequency noise, generated by circuits within the overload relay, from conducting out onto the control power input lines (137), also known as the power mains. Protection from internal relay failures that cause excessive current consumption is the function of the line fuses (68) which are applied to both the "hot" and "return" lines. The main element of the filter is the common mode/differential inductor (139) or "choke". The X1 class across the line filter capacitor (138) and the X2 class across the line filter capacitor in conjunction with the common mode/differential inductor (139) attenuate differential-mode noise. The Y1 class line filter capacitors (141) remove common-mode noise. The filtered control power input (142) supplies the offline switchmode power supply circuits.

Figure 11B:
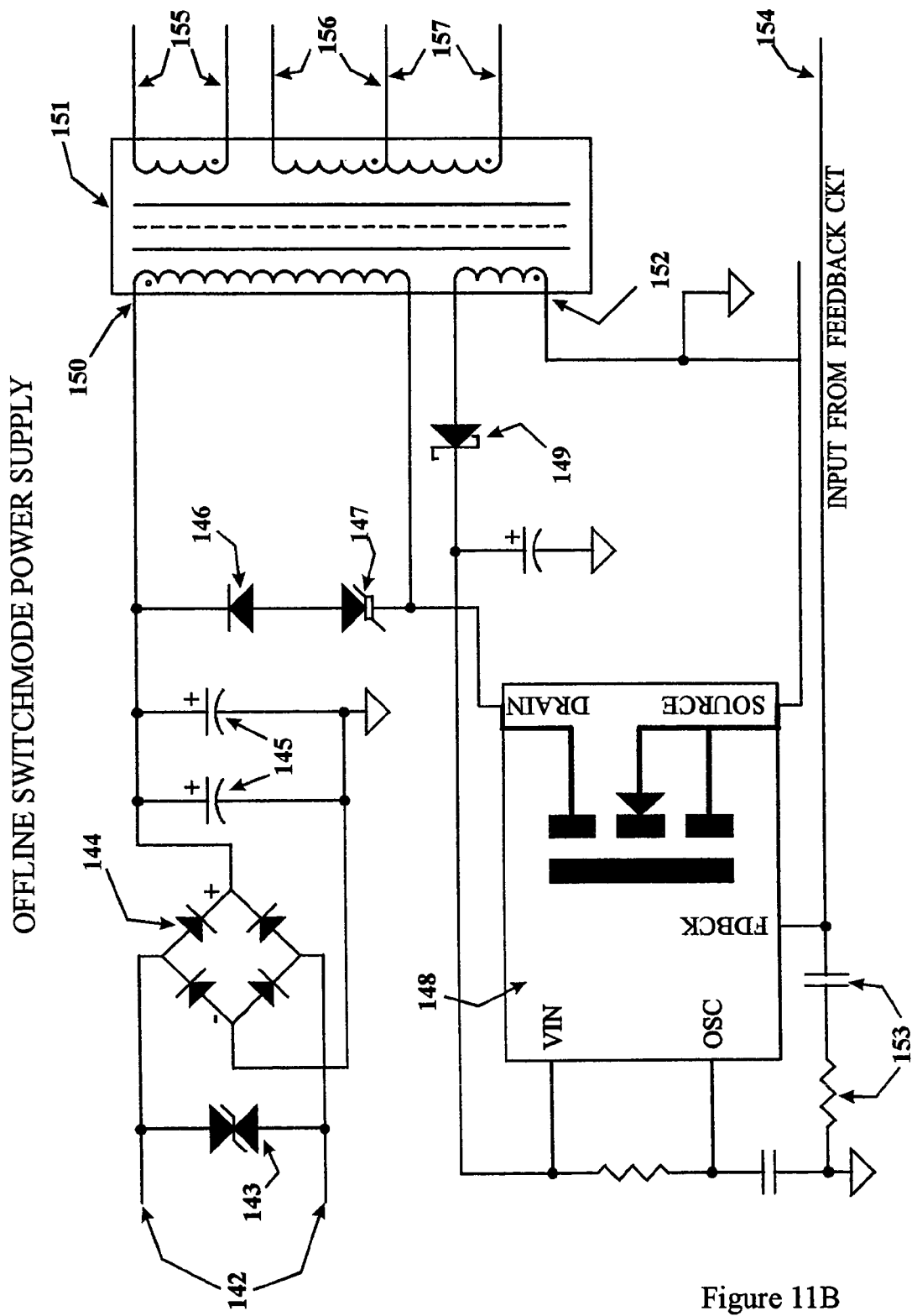
FIG. 11B is a schematic diagram of the offline switch-mode power supply circuit in accordance with the present invention.

FIG. 11B is the schematic diagram that details the operation of the Offline Switchmode Power Supply Circuit of a digital programmable motor overload relay, in accordance with the present invention. The Offline Switchmode Power Supply Circuit converts power, supplied to it from the filtered control power input (142), to regulated power sources that meet the needs of the internal electronics of the overload relay. The line potential limiting tranzorb (143) protects the input circuits of the offline supply from potentials exceeding 400 volts peak to peak. Rectification of direct line potentials is accomplished by the bridge rectifier (144), charging the bulk power hold up capacitors (145) which guarantee a minimum 100 msec power outage operational "ride through" for the overload relay.

The integrated switching regulator (148), switching at 100 kHz to eliminate power supply noise in the spectrum of the target motor signals, causes current to alternately flow or be blocked through the switching transformer's primary winding (150). This causes current to flow in the auxiliary control power secondary, which when rectified by the switching circuit source power rectifier (149) creates a regulated power source for the integrated switching regulator (148). Current is also caused to flow in the VCC secondary winding (155), the analog V+ secondary winding (156), and the analog V− secondary winding (157). Whenever the integrated switching regulator (148) blocks current from flowing in the switching transformer primary winding (150) the magnetic field within the high isolation switching transformer (151) collapses sending a fast rising current spike back into the power hold up capacitors (145) and bridge rectifier (144). The high speed back emf blocking diode (146) shunts the fast rising current spike into the high voltage tranzorb (147) protecting the input circuits. A control voltage fed by the SMPS feedback control line (154) and filtered by the feedback compensation network (153), causes the integrated switching regulator (148) to regulate the currents in the secondaries of the high isolation switching transformer (151) by modulating the duty cycle of the 100 kHz switching waveform. This closed loop feedback control circuit enables the offline switchmode power supply to provide safe controlled power sources to the overload relay for varying source loads and power line deviations.

Figure 11C:
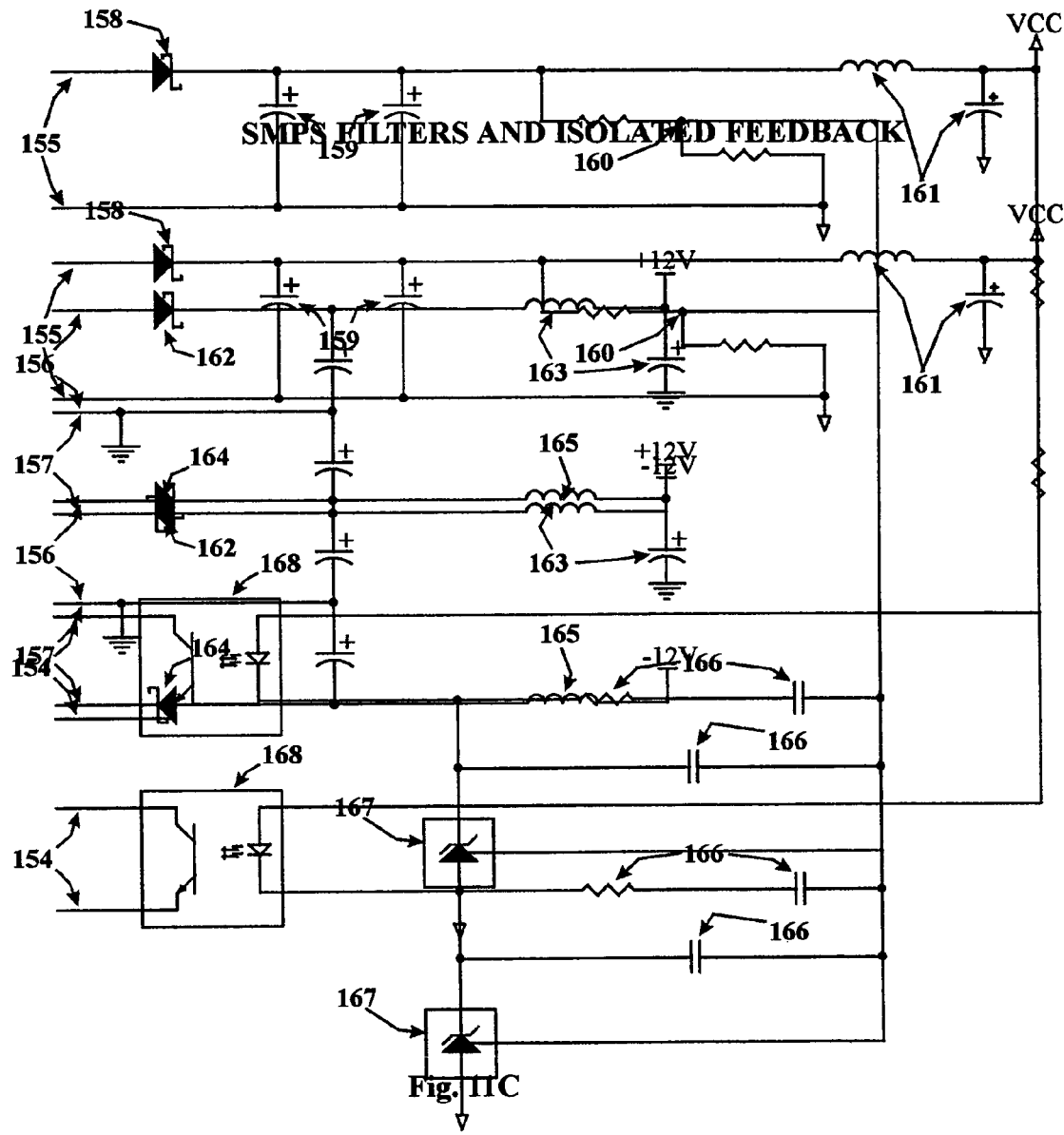
FIG. 11C is a schematic diagram of the SMPS filters and isolated feedback circuit in accordance with the present invention.

FIG. 11C is the schematic diagram that details the operation of the switchmode power supply filters and isolated feedback circuit of a digital programmable motor overload relay, in accordance with the present invention.

Current flowing from the VCC secondary winding (155) (from FIG. 11B) is rectified by the VCC rectifier (158) developing a voltage across the VCC filter capacitors (159) which smooth out switching noise and provide load hold up. A feedback sample output (160) sets the reference level of the programmable voltage shunt (167). Output current from the VCC source, after it is filtered by the VCC line filter (161), sources current through the optical coupler (168) at a rate that is controlled by the programmable voltage shunt (167) modulated by the reference level set by the feedback sample output (160).

Similar to the operation of the VCC filter circuits, the analog V+ secondary winding (156) and analog V− secondary windings (157) provide input to their respective filter networks. The analog V+ rectifier (162) and the analog V− rectifier (164) transform bipolar inputs into pulsed positive and negative direct currents respectively. These pulsed waveforms are then filtered by the analog V+ (163) and analog V− (165) filters. Though these outputs are not sampled into the feedback sample output (160) they contribute to the feedback signal through the high isolation switching transformer (151) and the close coupling of the secondaries. As a result the secondary side feedback filter (166) compensation network is designed to account for each filters effect upon stability and response of the switchmode power supply.

In a typical regulation scenario a VCC voltage rise appears at the VCC line filter (161) due to decreased loading of the VCC source, the feedback sample output (160) also rises above the internal reference of the programmable voltage shunt (167) causing the shunt to increase its zener voltage level. The effect of increasing this zener level is that less voltage is applied across the optical coupler (168), which lowers the voltage at the SMPS feedback control line (154) (from FIG. 11B). Lower voltage at the SMPS feedback control line (154) forces the integrated switching regulator (148) to reduce its switching frequency duty cycle thereby lowering the current available to the VCC secondary winding (155) (from FIG. 11B). This cycle by cycle interaction repeats until the feedback sample output (160) drops to the level of the reference inside the programmable voltage shunt (167). The result is that the VCC voltage level at the VCC line filter (161) remains at the stable desired level over a set range of load variations.

Figure 12:
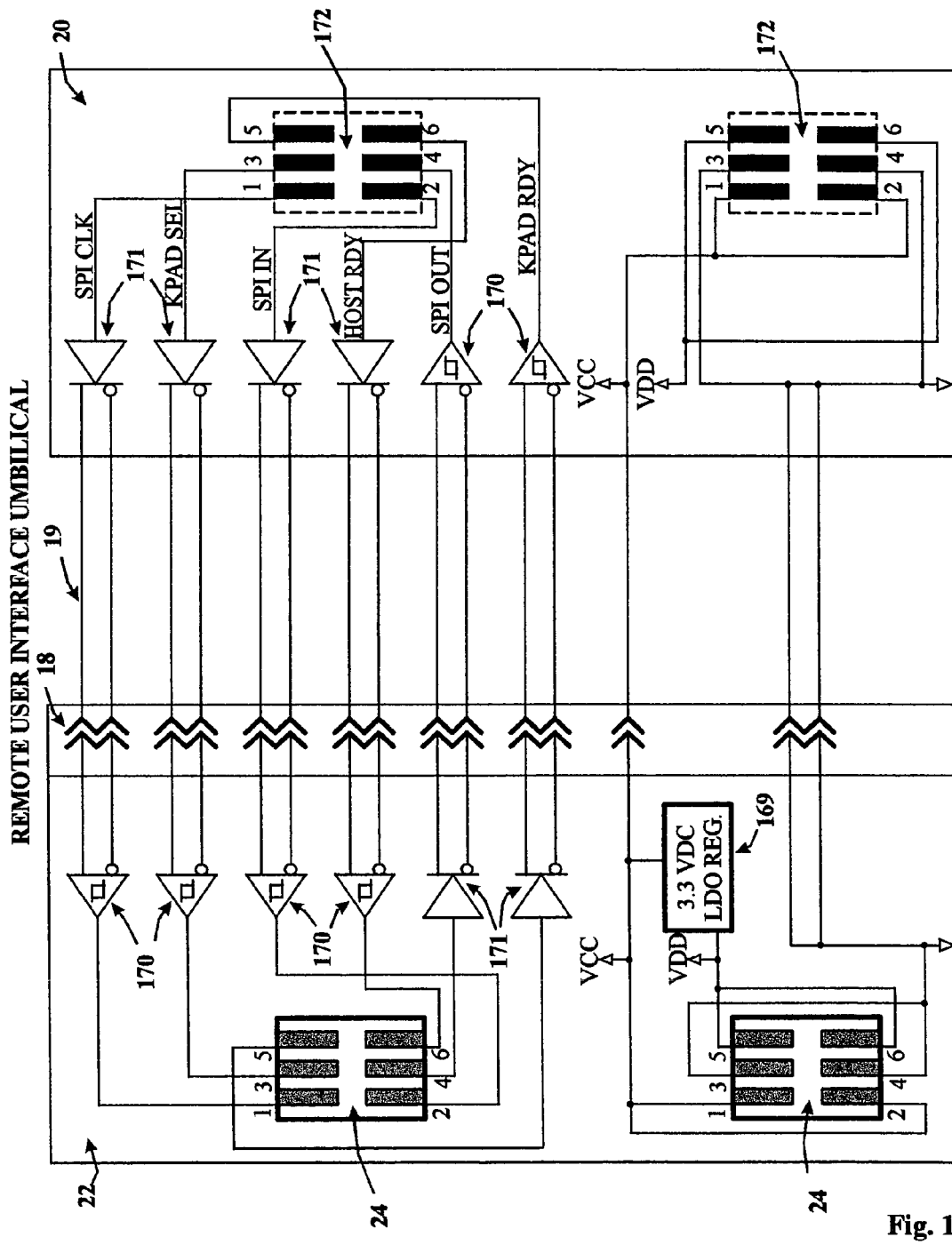
FIG. 12 is a schematic diagram of the remote user interface umbilical circuit in accordance with the present invention.

FIG. 12 is the schematic diagram that details the operation of the remote user interface umbilical of a digital programmable motor overload relay, in accordance with the present invention. The remote mount user I/F pedestal (22) creates a base into which the removable user interface (2) (shown in FIG. 2) may be inserted when the location of the removable user interface (2) (shown in FIG. 2) needs to be different than the base module.

The remote mount user I/F pedestal (22), with Smart Card connectors (24), is identical both in physical attributes and electrical functionality to those located on the Smart Card connector alignment block (23) (shown in FIG. 2). The remote mount user I/F pedestal (22) once affixed to a remote panel is electrically connected to the umbilical base attachment (20) by the umbilical cable assembly (19) through the umbilical connector (18) which will be placed on the backside of the remote panel. The umbilical base attachment (20) once placed onto the base module where the removable user interface (2) (shown in FIG. 2) was will allow the removable user interface (2) (shown in FIG. 2) to be fully functional in every capacity it had when affixed directly to the overload relay.

The signals, generated by the digital signal processor located in the base module, are electrically carried over the umbilical cable assembly (19) by differential line receivers (170) and differential line drivers (171). All power to the removable user interface (2) (shown in FIG. 2) is applied over the umbilical cable assembly (19) by individual lines from the pcb lans on the umbilical base attachment (20) to the Smart Card connectors (24) on the remote mount user I/F pedestal (22). The low drop out voltage regulator (169) creates the 3.3 volts (VDD), used on the removable user interface (2) (shown in FIG. 2), locally from the VCC source line. Circuits in the removable user interface (2) (shown in FIG. 2) are more tolerant to losses over the VCC line than any that could occur on the VDD line.

Figure 13:
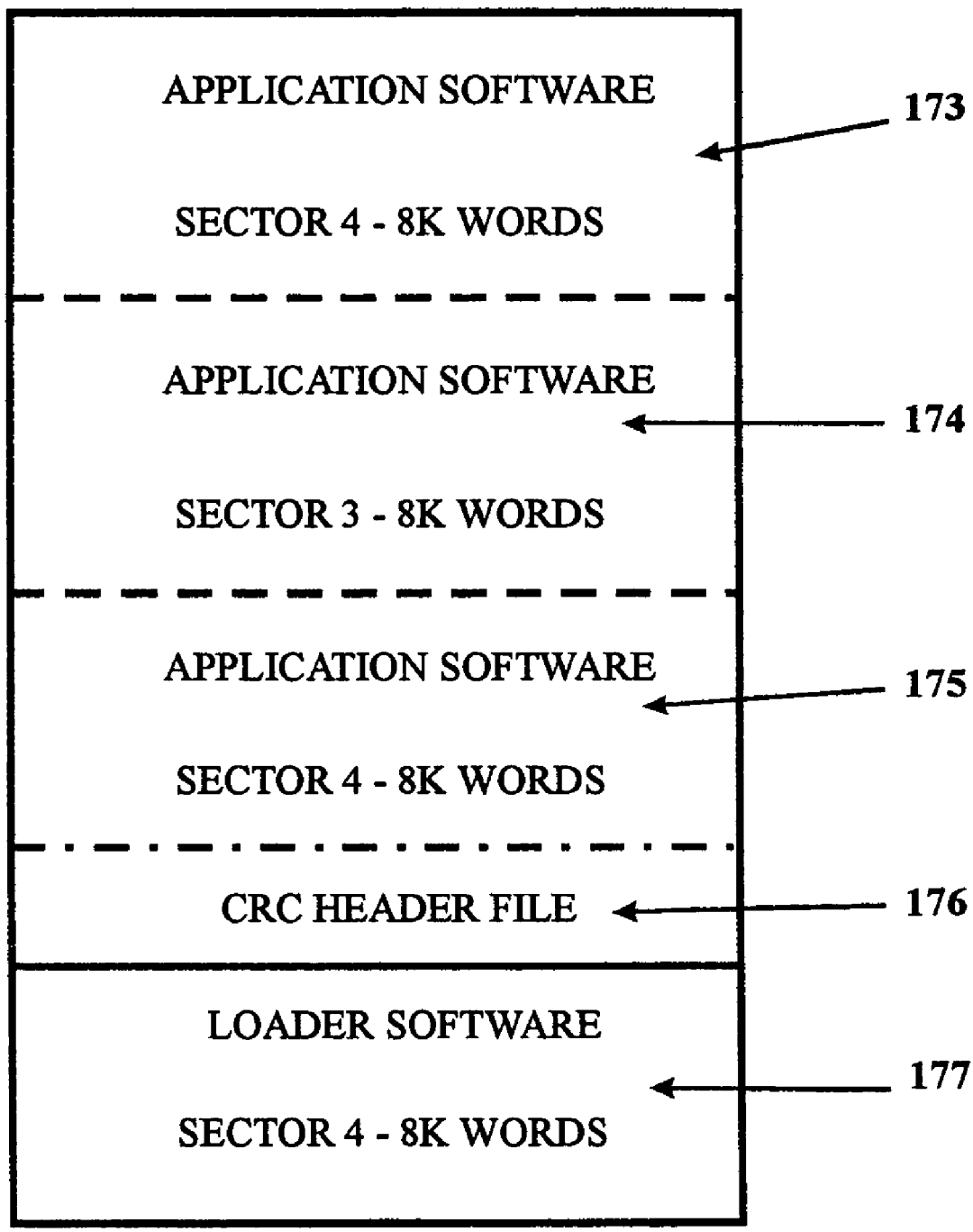
FIG. 13 is a block diagram of the Flash Memory organization inside the Digital Signal processor of the overload protector in accordance with the present invention.

FIG. 13 is a diagram that illustrates the organization of the program memory of a digital programmable motor overload relay, in accordance with the present invention. There are 32K, 16 bit words, of FLASH memory, embedded in the digital signal processor of the overload relay. The FLASH memory is arranged into four sectors, of 8K words each (177) (175) (174) (173), that can be individually erased and re-programmed. This memory is further separated, by software definition and function, into two unique areas; sector one which (177) holds the loader software, and sectors two through four containing the application software for the overload relay. A header file at the beginning of sector two (176) holds a 16 bit CRC (Cyclic Redundancy Code) created from the binary image of the application software, in sectors two through four, and a specific polynomial. This CRC value allows the application software to be tested for accuracy and authenticity.

Figure 14:
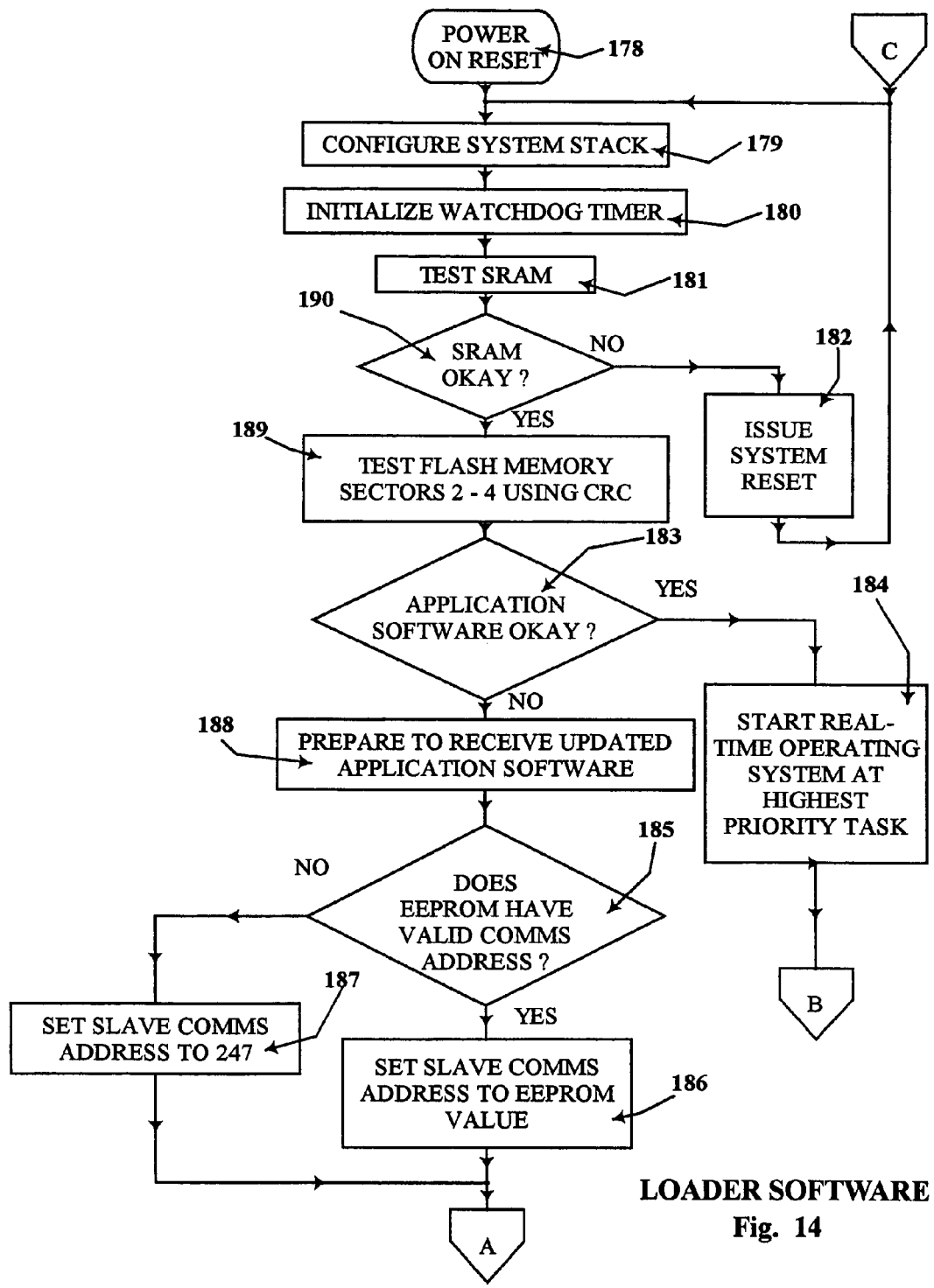
FIGS. 14 and 15 are software flowcharts detailing the startup or loader operations of the overload protector in accordance with the present invention.
Figure 15:
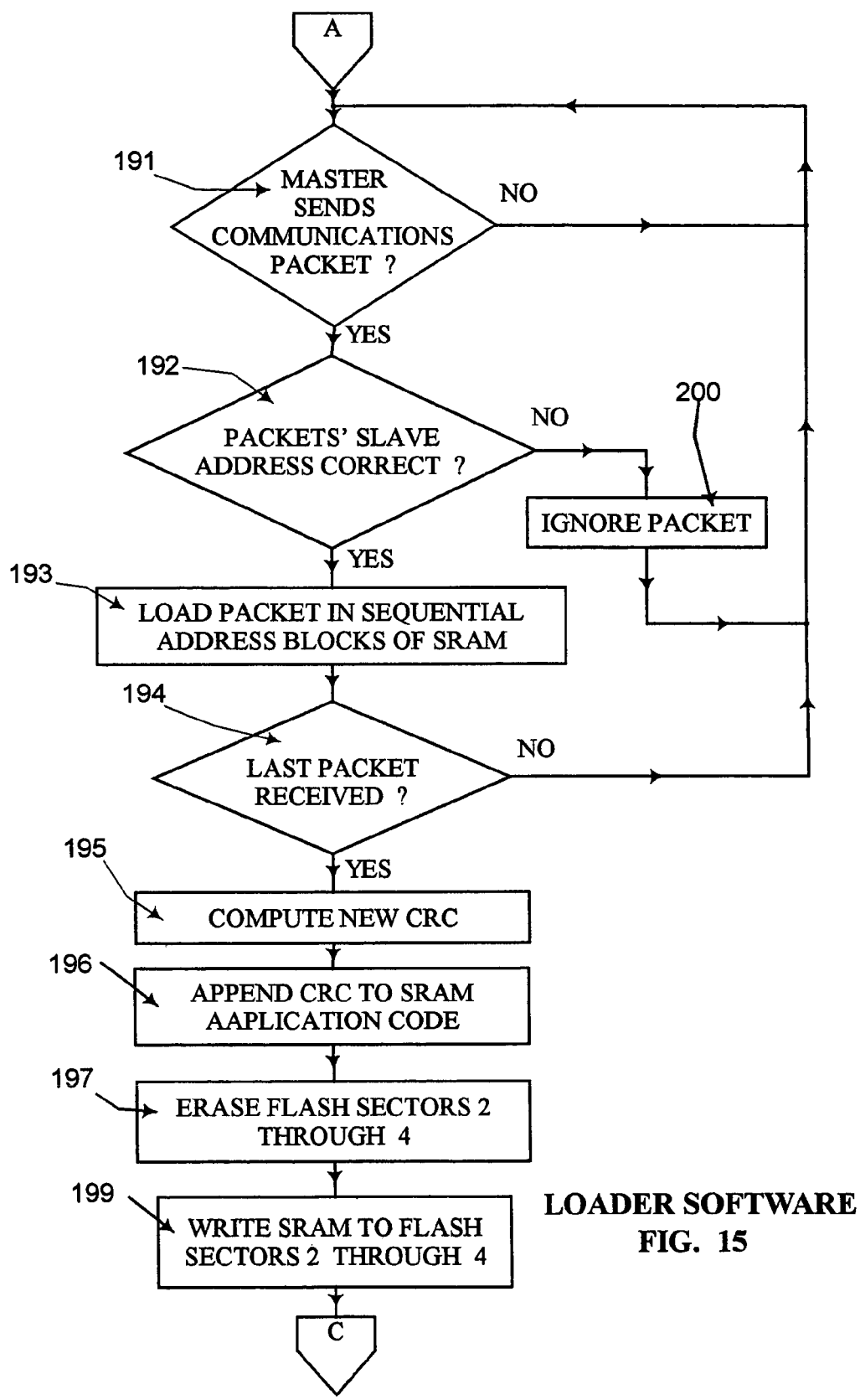

FIGS. 14 and 15 are flowcharts that trace the initializing process of the loader software of a digital programmable motor overload relay, in accordance with the present invention. The loader software is that code which runs immediately after a system wide reset. The reset source can be from powering on a "cold" unit, where power to this unit hasn't been applied in some time, or from a system level reset. A system level can be initiated by the software of the overload relay or by failure to satisfy the system watchdog timer. Regardless of the source the result is the same as a typical power on reset (178).

The loader software starts out by configuring the arrangement of the volatile memory resources of the system. The creation of a stack area (179) allows for the tracking and manipulation of system and task level variables. Next, to assure the operation of the software itself, the watchdog timer (180) is set up and initialized. The watchdog timer essentially expects the operational software to periodically reset the watchdog timer. It is assumed that if the watchdog timer is not reset within a prescribed amount of time, the software has lost control over the flow of operations and is no longer reliable, in which case the system is reset to a known state.

The SRAM (Static Ram Access Memory) comprises the largest single segment of the volatile memory resources of the overload relay. The loader software tests the SRAM (181) since its proper functioning is essential for proper execution of all software. If the SRAM is not functioning properly (190) a software generated system reset (182) is forced to allow the test software to be re-loaded and run again.

If the SRAM tests fine, the sectors of FLASH memory that contain the applications software is tested (189) against the CRC in the header of FLASH sector 2. If the FLASH memory contents agrees with the CRC (183), the real-time operating system starts to run the initialization part of the Timer Services Task (184).

Should the FLASH test fail, an attempt to re-program the FLASH memory is made (188). Since the source of the new firmware is retrieved from the communications port on the overload relay, a search for a valid communications address is conducted by testing the normal location for this information: the serial eeprom (185). If a valid address is located in the serial eeprom, it will be used for the communications download (186) of the new applications code. If a valid code has not been found, the communications port will be configured to respond to address 247 (187). With the slave communications address established the software enters a loop awaiting a communications packet (191) from a bus master.

When a communications packet arrives it will be analyzed to see if the packet was addressed to this slave unit (192). If the address is incorrect the slave will ignore the packet (200) and continue waiting for a valid packet from the bus master. Once valid packets start to arrive they are sequentially loaded into the SRAM (193) of the unit until the last packet arrives (194). With the acquisition of the last packet the loader software will use the binary image in the SRAM to calculate a CRC value (195), which will be appended as a header file onto the beginning of the SRAM load area (196).

Having secured a new applications code binary image from the communications master, the loader software will erase FLASH memory sectors 2 through 4 (197). The contents of the SRAM will then be programmed into the FLASHs' newly erased areas (198). This arrangement buffers the FLASH re-write insuring an complete and accurate download of new applications software to the overload relay. The loader software will then execute a system level reset which will initiate the loader software at its start (199). With the new applications code and CRC validated (184) (of FIG. 14) the loader software will pass control over to the real time operating system in the applications code.

Figure 16:
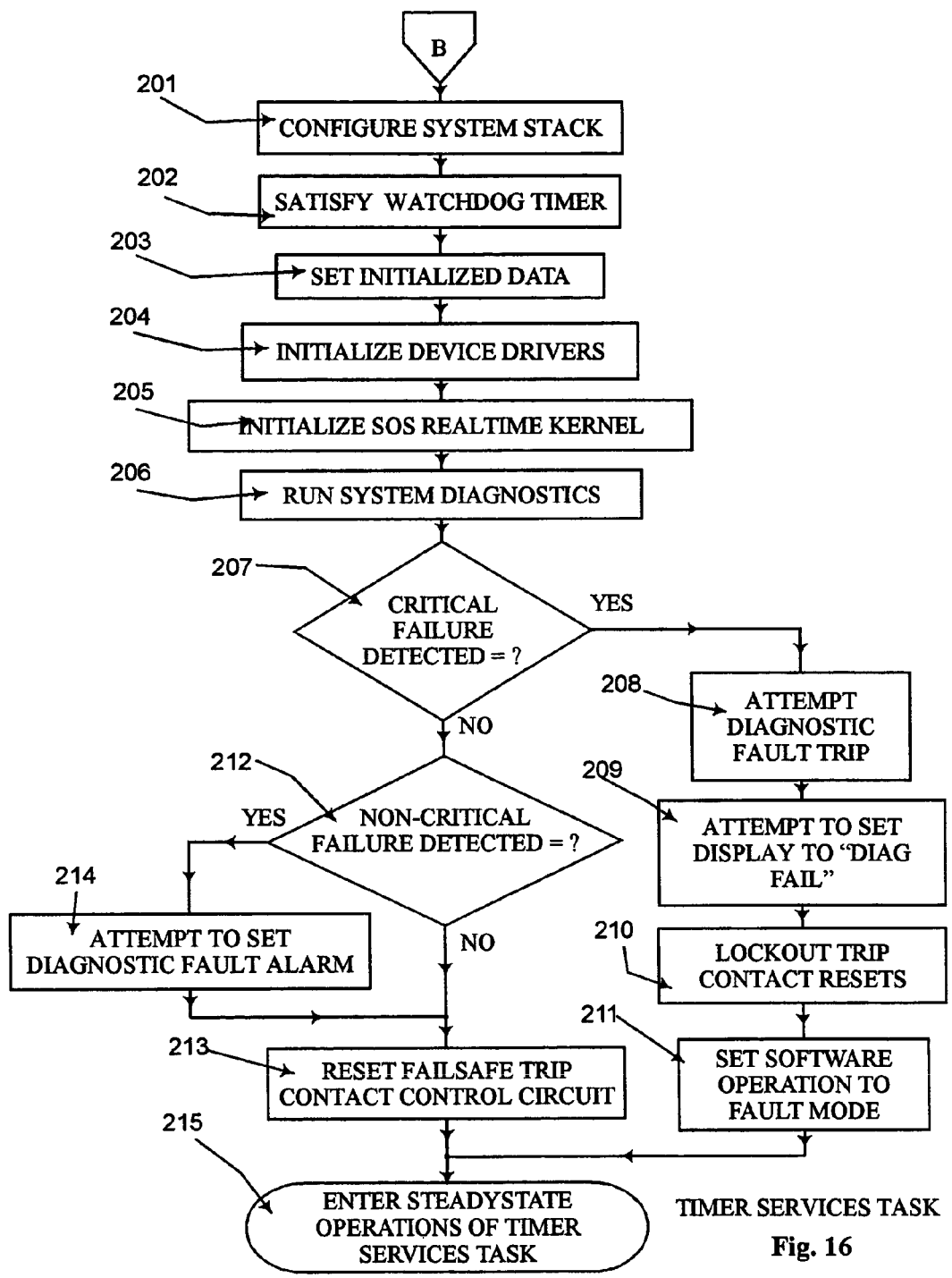
FIG. 16 is a software flowchart of the software initialization processes performed by the timer services task of the real time operating system in accordance with the present invention.

FIG. 16 is the flowchart that details the initialization process of the applications software by the Timer Services Task of the real-time operating system of a digital programmable motor overload relay, in accordance with the present invention. Similar to the loader software the usual housekeeping events are run; the configuration of the system stack in SRAM (201), resetting of the watchdog timer (202). The data elements required by the software are then initialized (203), software drivers (204) for the embedded peripheral devices are started along with the SOS realtime operating system(205).

Once all the system attributes are readied, a series of diagnostics are run to determine if everything is working (206). If a non critical failure is detected (212), one that does not impact the protection of the motor, the Timer Services task will attempt to set a diagnostics fault (214). The task will then reset the failsafe trip contact control circuit (213) and proceed to the steadystate operations of the task (215). The steadystate operations allow full access to all protection features and benefits.

Should a critical failure be detected (207), the Timer Services Task will attempt to cause a diagnostic fault trip of the trip contacts (208). Next, an attempt will be made to force the removable user interface to display the notice "DIAG FAIL" (209). Software will then lockout the trip contacts from being reset (210). Last, operational software will be alerted to the fact that the overload relay is now operating in fault mode (211). With all protection features restricted, the tasks will be limited to communications over the network and with the local user interface wherein the overload relay's status will be communicated.

Figure 17:
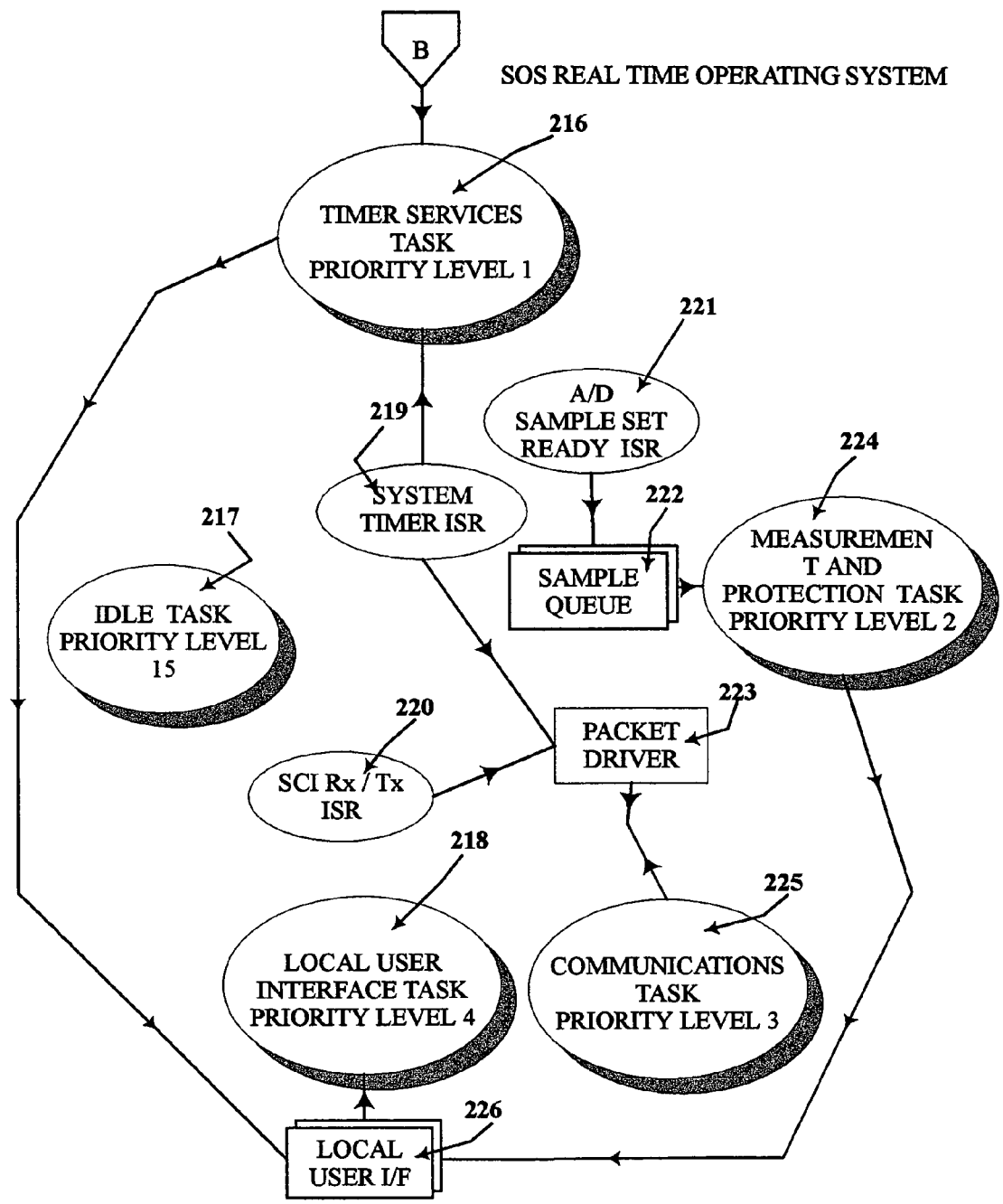
FIG. 17 is a quasi state machine diagram of the SOS real-time operating system and it's tasks in accordance with the present invention.

FIG. 17 is a quasi state machine diagram that illustrates the organization and operations of the real-time operating system of a digital programmable motor overload relay, in accordance with the present invention. The Stealth Operating System, so called for its extremely small footprint inside the overload relays code space, is a powerful embedded real-time kernel. The SOS supports up to 15 user application tasks of which the overload relay uses only five.

The tasks each have a unique priority level and are scheduled in a priority based pre-emptive method. This forces the highest priority task, that is ready to run, to run until it blocks. Once blocked the next higher priority task is scheduled to run. A task may be blocked by the operating system scheduling a higher priority task (pre-emptive) or whenever the task itself must wait for conditions or inputs to satisfy its requirements to complete. Whenever no application tasks are scheduled to run, an idle task runs a continuous loop, waiting to be pre-empted by the scheduling of any other system task.

Other inherent elements of the SOS, at the disposal of application tasks, are semaphores and signals. Semaphores are binary controls that allow a task to take control over systems resources in a mutually exclusive fashion or to synchronize task execution to asynchronous events such as interrupts. Signals communicate the arrival of an event to a task that it is registered to receive. Tasks may be blocked awaiting the arrival of one or a multitude of signals. Whenever the signals satisfy the conditions of a blocked task that task becomes ready to execute and will do so relative to its priority.

The Timer Services Task (216) has the highest priority in the overload relay application software. Beyond the initialization services it provides at start up (as described relative to FIG. 16), this task has steadystate duties that supply critical timing based functions for the other tasks in the system. The Timer Services steadystate functions execute every 10 msec by blocking on a semaphore that is issued by counting ten of the system timer ISR (219) (interrupt service routine) periodic timer interrupts.

When activated, the Timer Services Task updates active objects in use by the overload relay application. These timer objects are used to facilitate programmable delays for motor protection functions. Timer objects can have independent resolutions of 10 msec, 100 msec, 1 sec, and 1 minute all derived from the 10 msec base tick rate.

The Timer Services Task also schedules the periodic refresh and keypad polling of the local user interface. This is accomplished by posting periodic refresh and poll messages to the event queue (226) of the Local User Interface Task (218). Further, this task performs periodic run-time health checks on the system and can allow a system level reset to occur by allowing the watchdog timer to lapse. This will cause the initialization portion of the task to execute, where a thorough diagnostic procedure will determine if the overload relays' operation has been critically impaired.

The Measurement and Protection Task is next in the priority list. This task has two modes of operation; a normal, or steadystate, mode and a calibration mode. The later mode has no protection features, but allows sampling of inputs to the A/D converter where only raw counts are computed. These raw counts are used to create system level constants that adjust any inaccuracies out of the sampled signals. These unique constants are stored in the overload relay EEprom and are retrieved during the system initialization process.

In steadystate operations, the Measurement and Protection task receives measurement samples of motor currents in the three phase circuits and one from the ground fault circuit. These samples are placed into the sample queue (222) by the A/D interrupt service routine (221). The embedded A/D converter of the Digital Signal Processor samples both the high and low gain circuits of the four motor currents every 500 usec. When the samples are completed, an interrupt from the A/D converter is sent. The ISR (interrupt service routine) for this interrupt reads the samples, arranges them in a set and places them in the sample queue (222). Once these samples are in the queue, the same ISR signals the Measurement and Protection Task.

The Measurement and Protection Task removes the sample set from the queue whenever it finds the queue is not empty. If the task finds the queue empty, the task will be blocked until another signal from the A/D ISR is raised. Once enough samples are collected, the task performs a 100 msec RMS computation for each A/D channel.

As new 100 msec RMS values are available, the Measurement and Protection Task updates the thermal model of the motor, computes derived metered values, and evaluates the motor protection functions. These protection functions include the logic for tracking the motor state, generating trips, alarms, and inhibits, as well as logging the events to the event recorder.

The task having the next highest priority is the Communications task (225). The principle function of this task is to service requests for data made through the inventions' communications link. The Communications Task implements a Modbus (tm) slave in single master, multiple-slave, multi-drop network topology.

The Communications Task blocks while waiting for a semaphore indicating the receipt of a complete request packet from a network master by the packet driver (223). The packet driver uses the SCI (Serial Communications Interface) receive data ready ISR (interrupt service routine) (220) to collect the incoming bytes from the communications link and place them into a packet buffer. Further, timing signals from the system timer ISR (219) allow the packet driver to delineate one packet from another per the Modbus (tm) specification. When the packet driver has determined that a complete packet is in the buffer it raises the semaphore to the Communications task which changes it from a blocked status to a ready status. If no other higher priority task is running or able to run (not blocked) the Communications Task will proceed to process the packet.

When the Communications Task unblocks, it first checks the packet contents and CRC of the packet. If the packet is invalid or corrupted, it will be discarded and the task will block again awaiting the next packet. If the packet contents are good, the slave address will be checked to see if the packet was intended for this overload relay. If the packet request is for this slave the packet will be accepted for processing. If the packet is not for this overload relay, it will be discarded and the Communications Task will block.

Processing the packet involves parsing the request message embedded therein. Further checks relative to the Modbus (tm) protocol are performed including testing for a valid function word, format and parameter values. If the request is free of errors it is carried out in the context of the Communications Task and a positive response packet is constructed. If the request has errors an exception response packet is constructed. The completed response packet, whether positive or exception, is passed to the packet driver for transmission to the master. The Communications Task will the block on a semaphore indicating the packet is ready to be sent. The packet driver then uses the RS-485 transmitter to send out the packet. When the last byte of the packet has been sent, the SCI Rx/Tx ISR will signal the Communications Task to unblock in anticipation of the next packet.

The next priority task is the Local User Interface Task (218) which is responsible for processing inputs and outputs for the removable user interface. This task retrieves keypad entries, provides user message content to the LCD, and directs the display of system status using the LED indicators on the removable user interface. Further this task runs the LCD menu engine code that allows for the navigation of the system menu.

The Local User Interface Task blocks awaiting a semaphore from the local user I/F event queue (226). When a message arrives in the event queue the semaphore raises unblocking the Local User Interface Task which, if allowed to run due to priority constraints, will remove the first message at the head of queue. Typical messages processed in this fashion are: refresh messages which update both the LCD and LED displays, poll messages which determine the rate at which keypad data is retrieved from the removable user interface, and trip message which forces the LCD to the trip page of the system menu and changes the states of the LED indicators to reflect the tripped status.

Refresh and poll messages originate from the Timer Services Task while trip messages come from the Measurement and Protection Task. Since the keypad on the removable user interface allows system settings to be changed similar to the Communications Task a mutually exclusive semaphore is shared between these two tasks so that parameters cannot be changed by one task while the other is updating them. Any change to these parameters causes the change to be recorded within the system EEPROM.

The Idle Task (217) runs at the lowest priority and is never blocked. As a result, when all other tasks are blocked, the Idle Task will always run waiting to surrender control over to any other task as it becomes unblocked.

Figure 18:
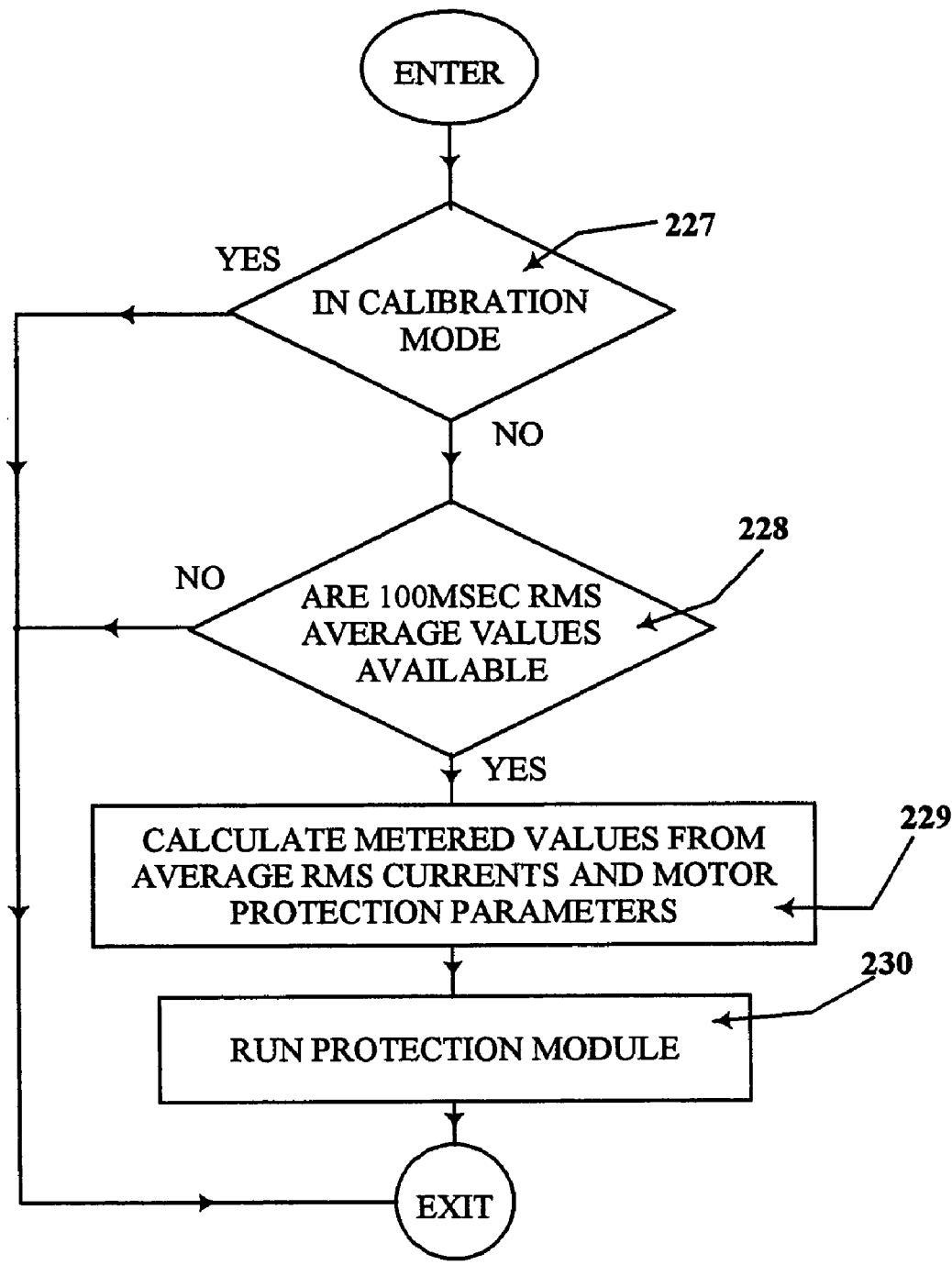
FIG. 18 is a measurement and protection flowchart that details the functionality of the overload protector in accordance with the present invention.

Referring particularly to FIG. 18, Overview of Measurement and Protection, when in calibration mode (227) or if the 100 msec RMS average values (228) are not available, all normal measurement and protection functions are suspended. Otherwise, when the 100 msec RMS average values are available (228), the metered values from the RMS currents and motor protection parameters (229) are calculated, then the protection module is run (230).

Figure 19:
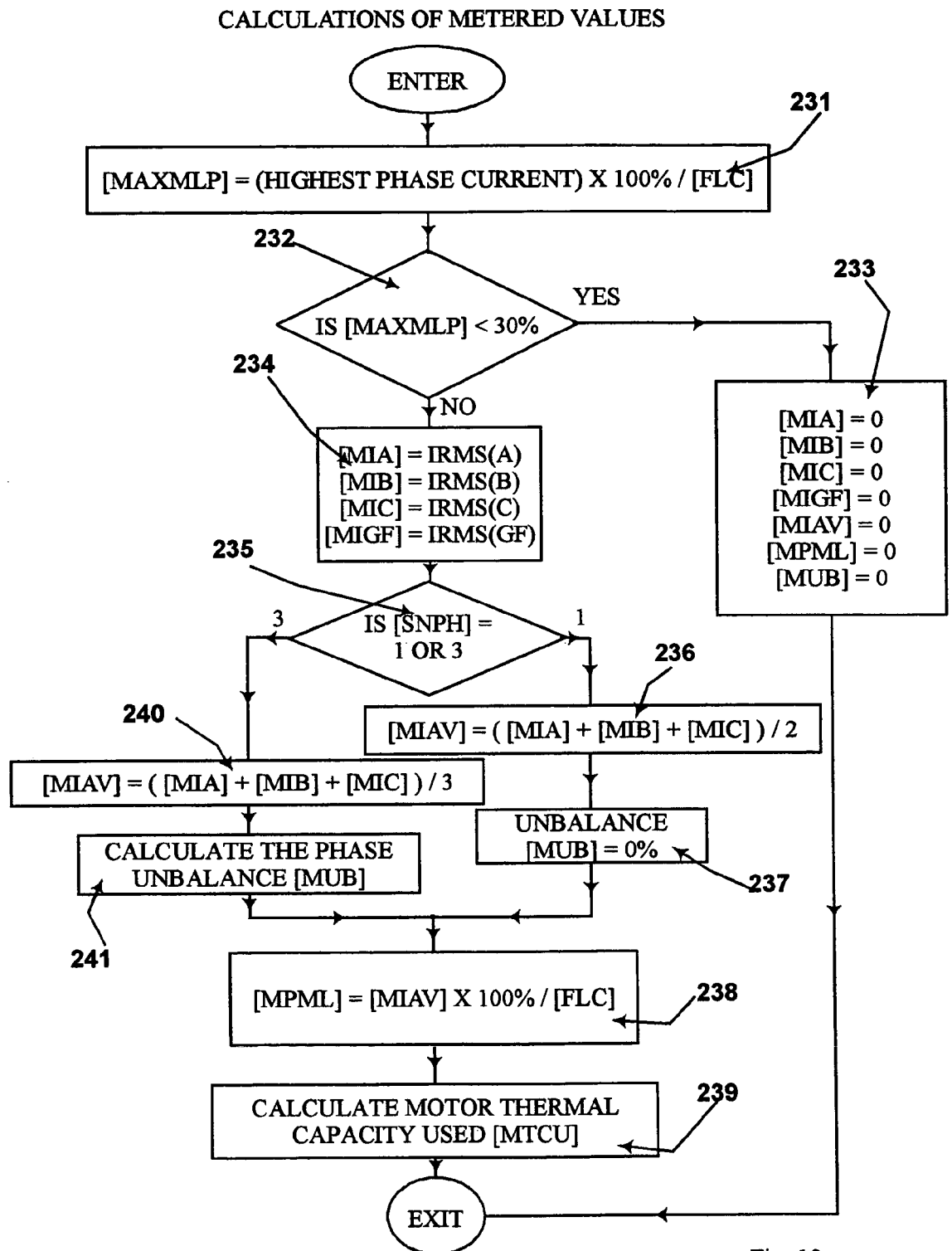
FIG. 19 is a flowchart detailing the calculations of metered values functionality of the overload protector in accordance with the present invention.

Referring particularly to FIG. 19, Calculation of Metered Values, the highest phase load [MaxMLP] equals the highest individual phase current multiplied by 100%, then divided by the full load current setting [FLC] (231). If [MaxMLP] is less than 30% (232), all of the metered values are forced to zero (233), the motor is considered to be stopped and no current values or their products will be displayed. However, if [MaxMLP] is equal to or greater than 30% (232), the averaged measured values are transferred to the displayed variables (234). If the set number of phases [SNPH] equals "1" (235), indicating a single phase application, the average phase current [MIAV] is calculated by summing the three phases ([MIA], [MIB], [MIC]) then dividing by two (236). The phase unbalance [MUB] is then forced to zero (237). This approach is used because, in a single phase application, only two phases are ever used and the protection software has no need to know which phase is missing. The unbalance is forced to zero to effectively block the unbalance and single phase trip and alarm from operating. However, if [SNPH] equals "3" (235), indicating three phase operation, the average phase current [MIAV] is calculated by summing the three phases ([MIA], [MIB], [MIC]) then dividing by three (240). The percent phase unbalance [MUB] is then calculated (241) by finding the greatest mean difference from average current, multiplying by 100%, then dividing by the average phase current [MIAV] (240). The average percent motor load [MPML] is equal to the average phase current [MIAV] multiplied by 100% then divided by the motor full load current setting [FLC] (238). The motor thermal capacity used [MTCU] is then calculated (239).

Figure 20:
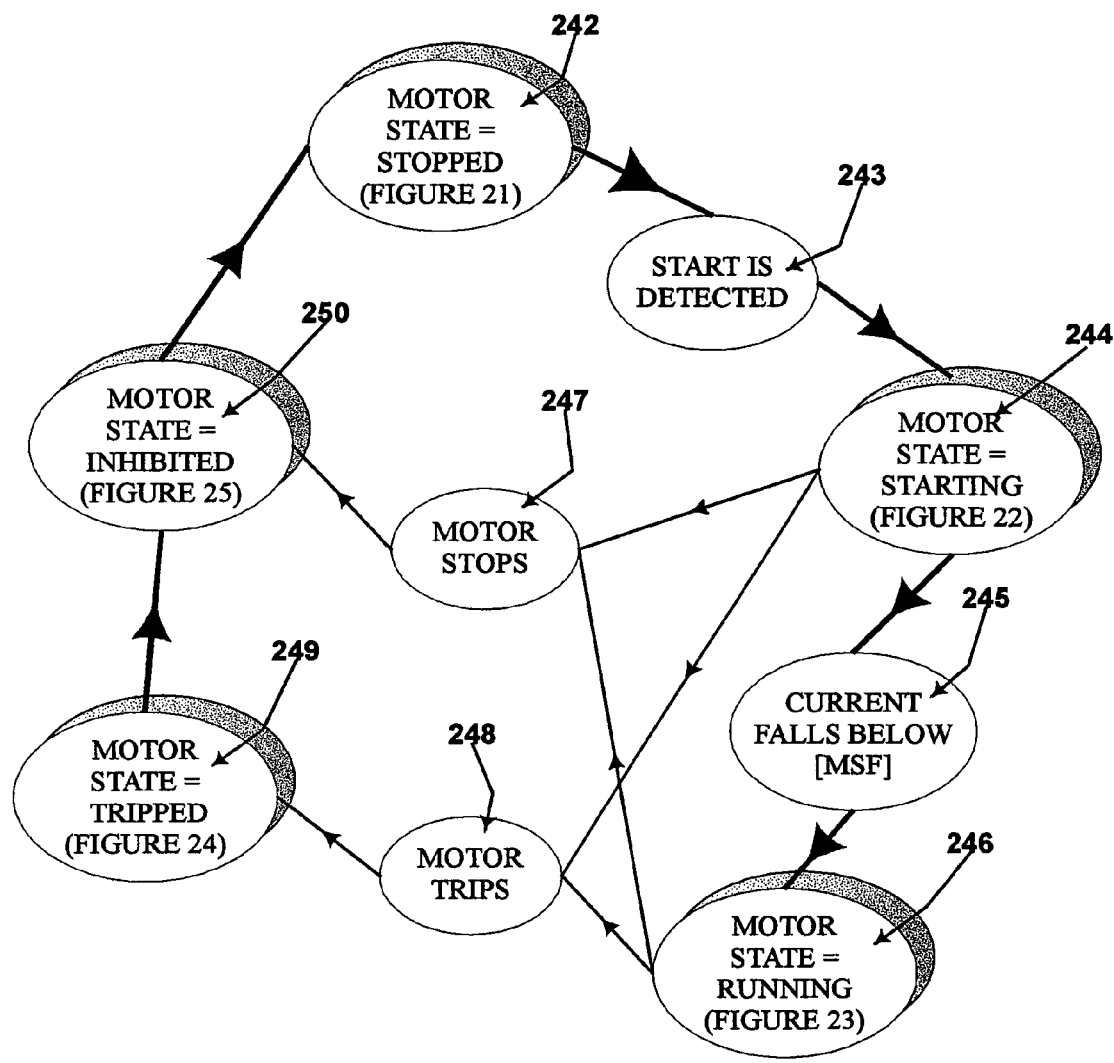
FIG. 20 is a state diagram of the possible motor states protected for the overload protector in accordance with the present invention.

Referring particularly to FIG. 20, Protection Module—Overview of Motor States, on power up the motor state is stopped (242). When a start is detected (243), the motor state is starting (244). When the current falls below the service factor setting [MSF] (245), the motor state is running (246). If while in either starting or running states, a trip occurs (248), the motor state is tripped (249). If while in either starting or running states, the motor stops (247), the motor state is inhibited (250). When the trip is reset the motor state is inhibited (250). When all inhibits within the inhibit module are satisfied, the motor state returns to stopped (242).

Figure 21:
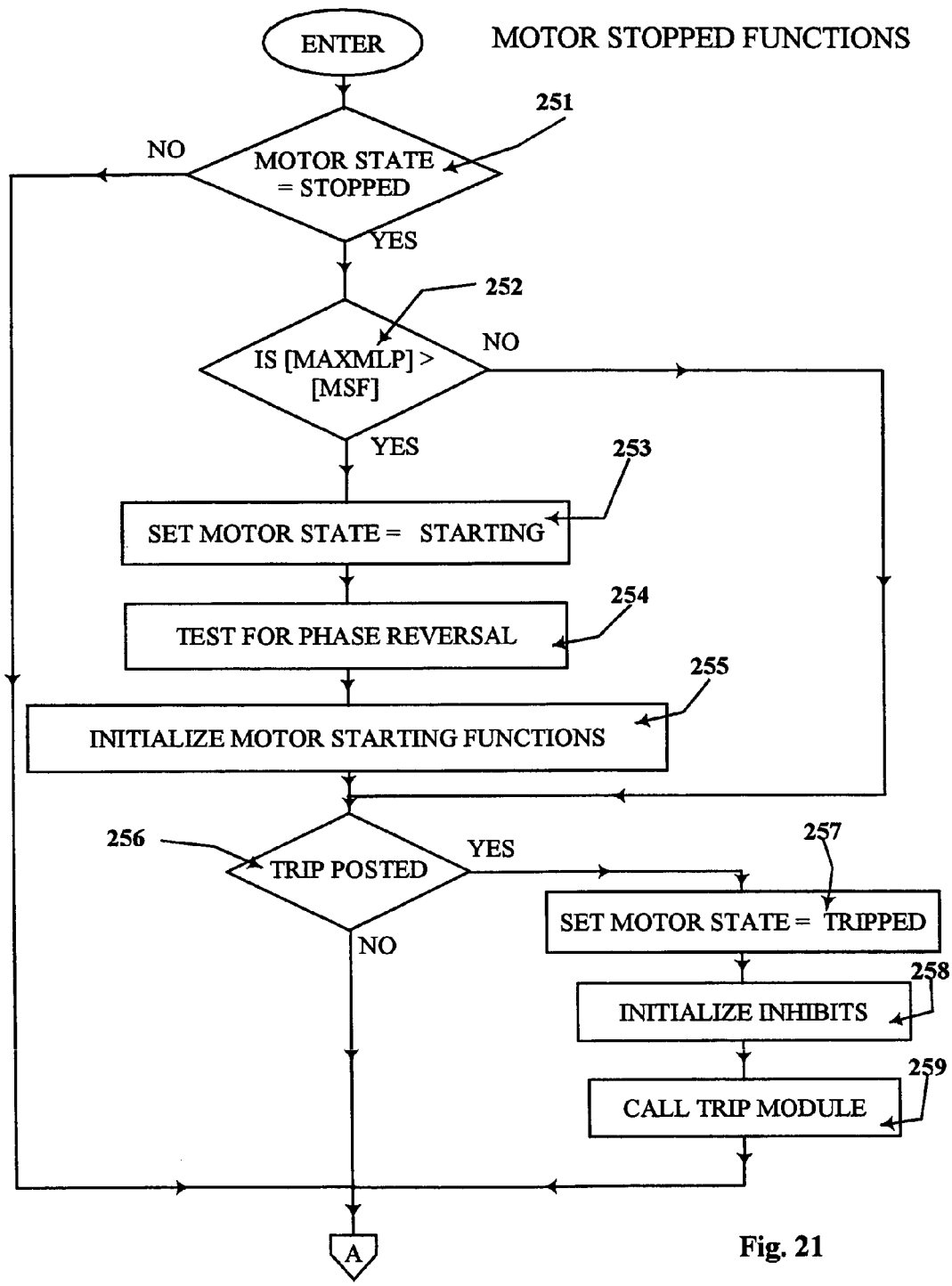
FIG. 21 is a flowchart of the functionality of motor stopped functions provided by the overload protector in accordance with the present invention.

Referring particularly to FIG. 21, Motor Stopped Functions, test to see if motor state equals stopped (251). If motor state does not equal stopped, then exit. However, if motor state equals stopped and the highest phase load [MaxMLP] is less than the motor service factor setting [MSF] (252) then test for a trip posted (256). If no trip is posted (256), then exit. If a trip is posted, set motor state to tripped (257), initialize inhibits (258), and call trip module (259). However, if [MAXMLP] is greater than [MSF] (252), set motor state equal starting (253), test for a phase reversal (254), and initialize motor starting functions (255) then test for a trip being posted (256). If no trip is posted, then exit. If a trip is posted, set motor state to tripped (257), initialize inhibits (258), and call trip module (259).

Figure 22:
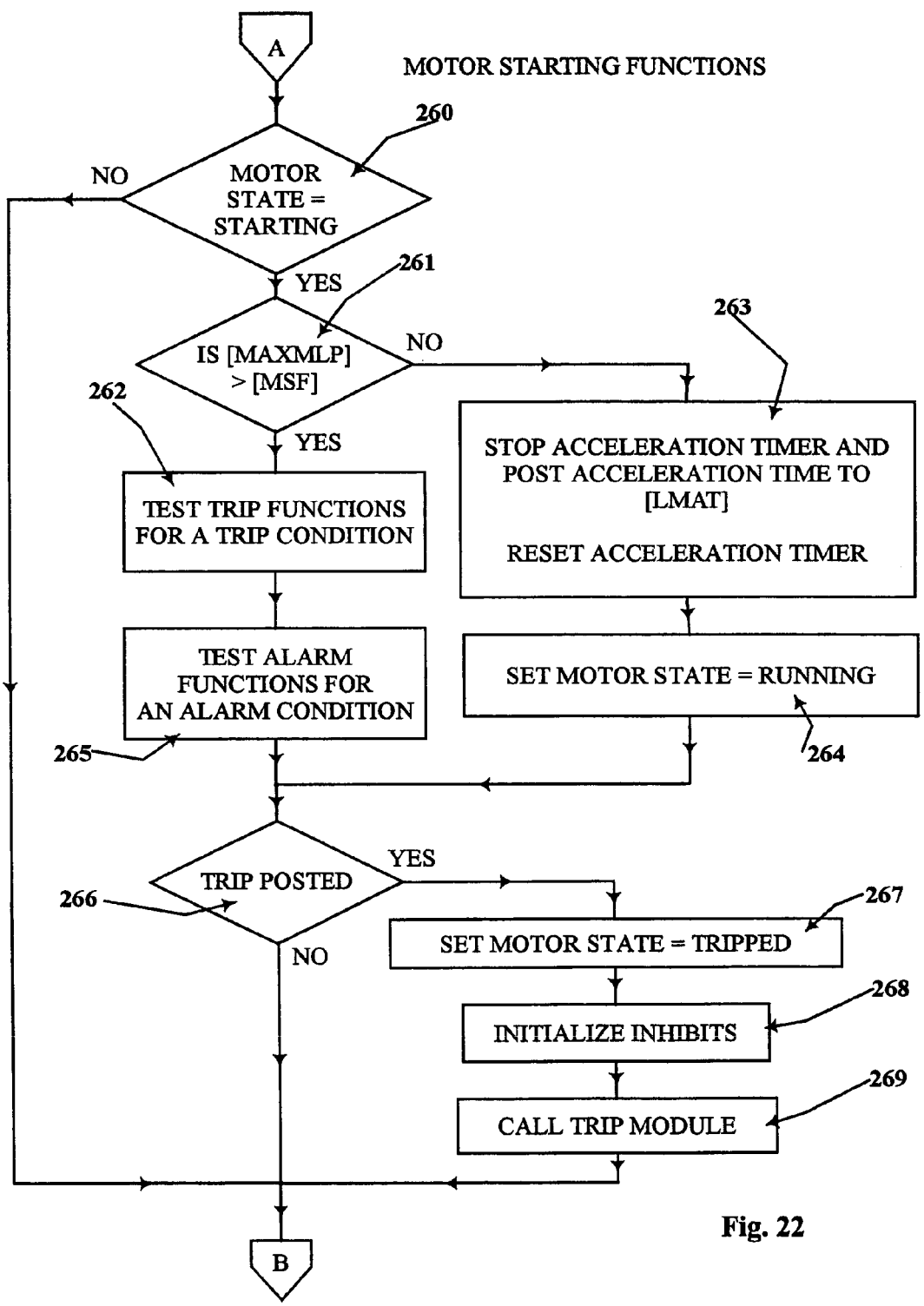
FIG. 22 is a flowchart of the functionality of motor starting functions provided by the overload protector in accordance with the present invention.

Referring particularly to FIG. 22, Motor Starting Functions, test to see if motor state equals starting (260). If motor state does not equal starting, then exit. If motor state equals starting and the highest phase load [MaxMLP] is greater than the motor service factor setting [MSF] (261), test trip functions for a trip condition (262) and test alarm function for an alarm condition (265) then test for a trip being posted (266). If no trip is posted, then exit. If a trip is posted, set motor state to tripped (267), initialize inhibits (268), and call trip module (269). However, if the highest phase load [MaxMLP] is less than the motor service factor setting [MSF] (261), stop acceleration timer and post acceleration time to last motor start time [LMAT], and reset acceleration timer (263), set motor state equals running (264) then test for a trip being posted (266). If no trip is posted, then exit. If a trip is posted, set motor state to tripped (267), initialize inhibits (268), and call trip module (269).

Figure 23:
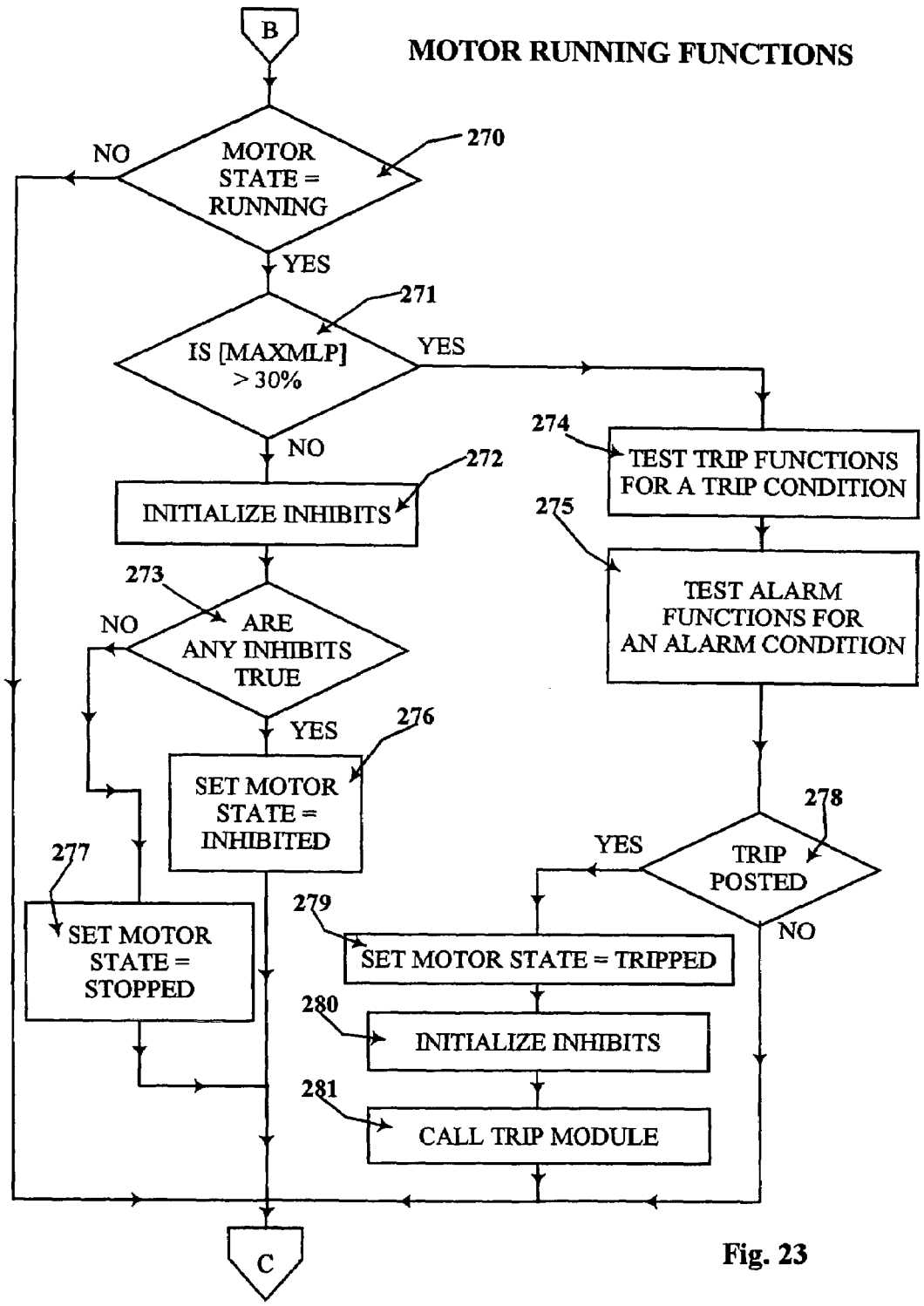
FIG. 23 is a flowchart of the functionality of motor running functions provided by the overload protector in accordance with the present invention.

Referring particularly to FIG. 23, Motor Running Functions, test to see if motor state equals running (270). If motor state does not equal running, then exit. If motor state equals running and the highest phase load [MaxMLP] is equal to or greater than 30% (271), test trip functions for a trip condition (274), test alarm function for an alarm condition (275), then test for a trip being posted (278). If no trip is posted, then exit. If a trip is posted, set motor state to tripped (279), initialize inhibits (280), and call trip module (281). However, if, the highest phase load [MaxMLP] is less than 30% (271), initialize inhibits (272). Test to see if any inhibits are true (273) and, if true, then set motor state equals inhibited (276). If not true, set motor state equals stopped (277).

Figure 24:
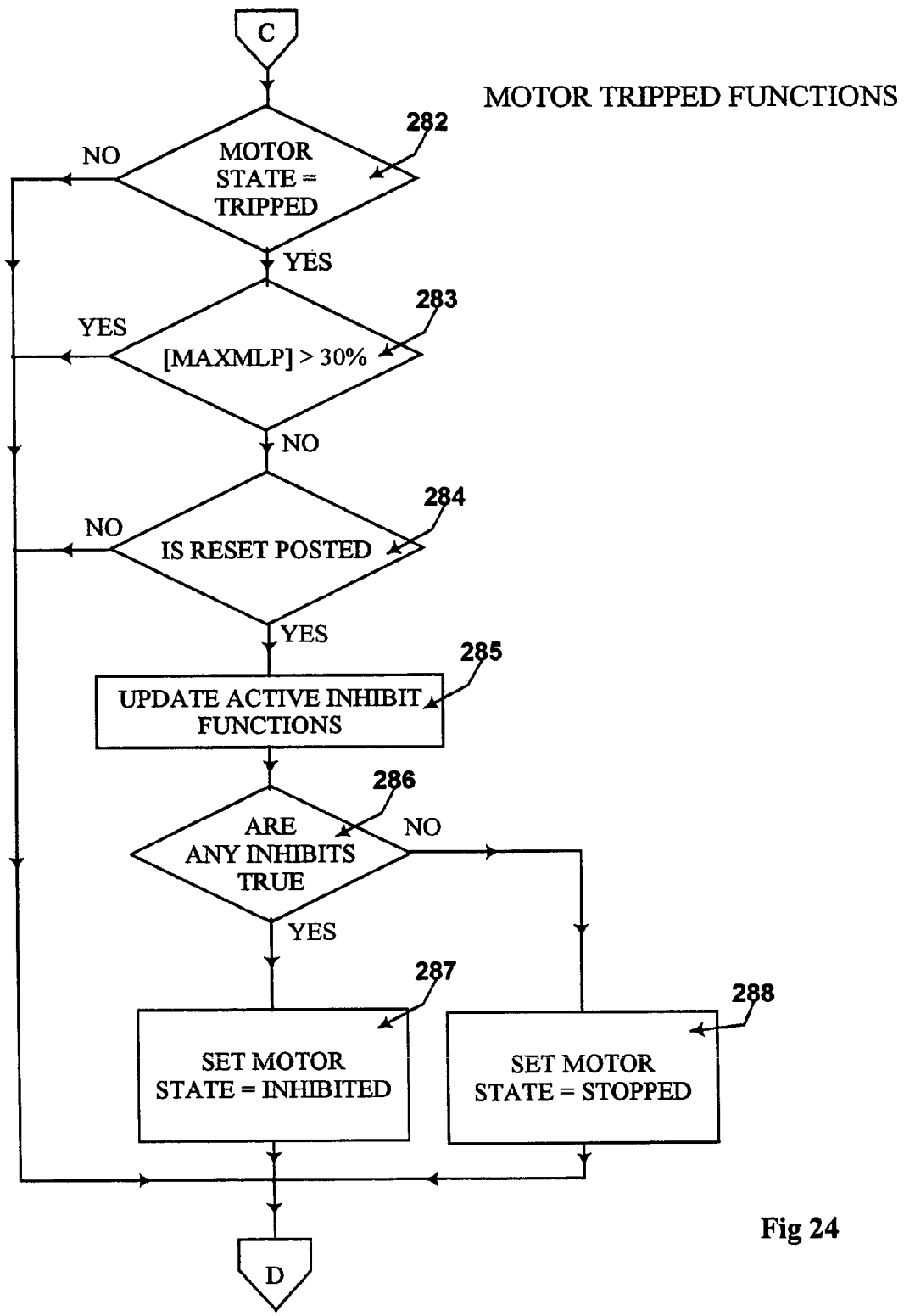
FIG. 24 is a flowchart of the functionality of motor tripped functions provided by the overload protector in accordance with the present invention.

Referring particularly to FIG. 24, Motor Tripped Functions, test to see if motor state is tripped (282). If motor state does not equal tripped, then exit. If motor state is tripped and the highest phase load [MaxMLP] is greater than 30%, then exit. However, if [MaxMLP] is less than 30%, then test to see if a reset is posted (284). If a reset is not posted, then exit. If a reset is posted, update active inhibit functions (285), then test to see if any inhibits are true (286). If inhibits are true, then set motor state equals inhibited (287). If not true, set motor state equals stopped (288).

Figure 25:
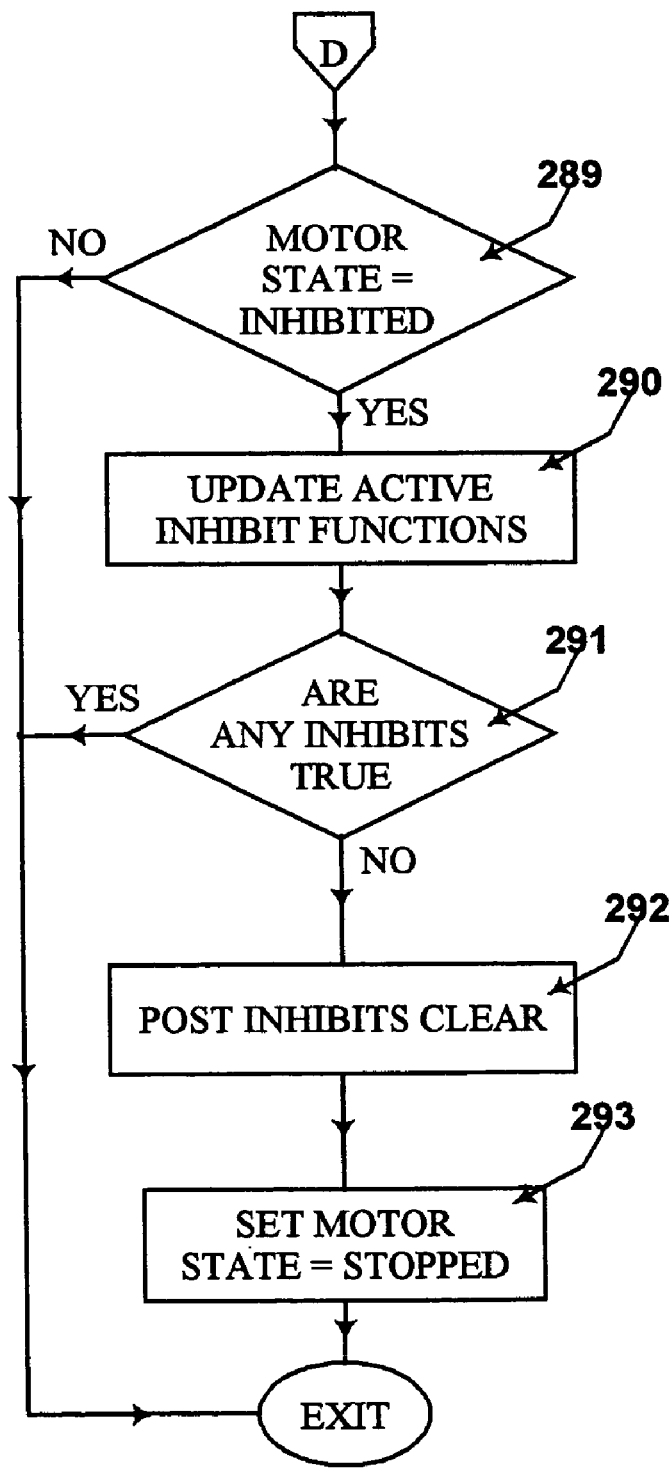
FIG. 25 is a flowchart of the functionality of motor inhibited functions provided by the overload protector in accordance with the present invention.

Referring particularly to FIG. 25, Motor Inhibited Functions, test to see if is motor state equals inhibited (289). If motor state does not equal inhibited, then exit. If motor state equals inhibited, update active inhibit functions (290) then test to see if any inhibits are true (291). If inhibits equal true, then exit. If inhibits are not true, post inhibits clear (292) and set motor state equals stopped (293).

Figure 26:
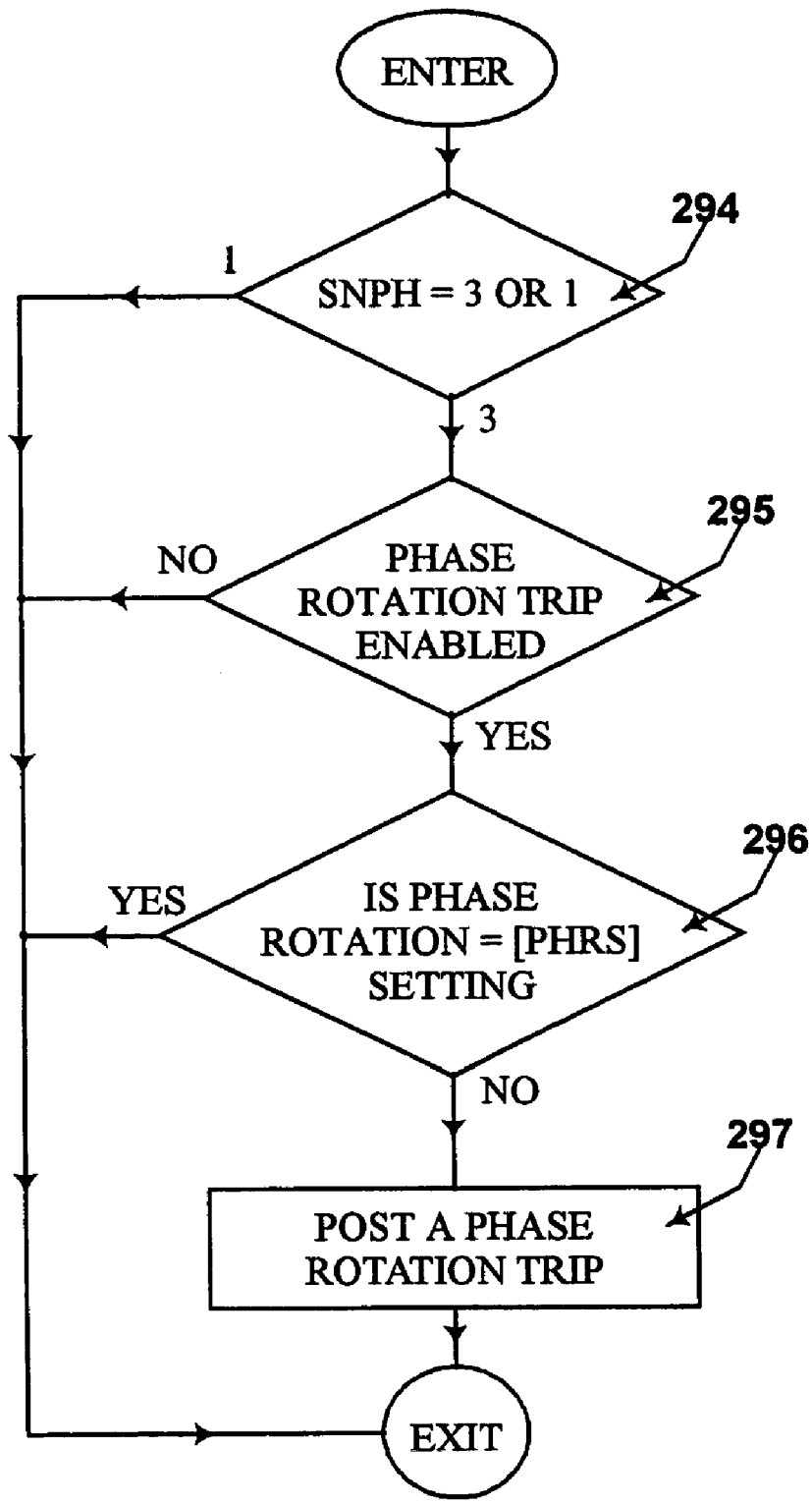
FIG. 26 is a flowchart detailing the phase reversal trip functions provided by the overload protector in accordance with the present invention.

Referring particularly to FIG. 26, Phase Reversal Trip, test to see if the setting for single or three phase [SNPH] is equal to "3" or "1" (294). If [SNPH] is equal to "1", then exit. If [SNPH] is equal to "3", then check to see if phase rotation trip is enabled (295). If phase rotation trip (295) is not enabled then exit. If phase rotation trip (295) is enabled, check to see if phase rotation (either 1-2-3 or 1-3-2) is equal to the phase rotation setting [PHRS] (296). If phase rotation equals [PHRS] setting (295), then exit. If phase rotation does not equal [PHRS] setting (295), post a phase rotation trip (297).

Figure 27:
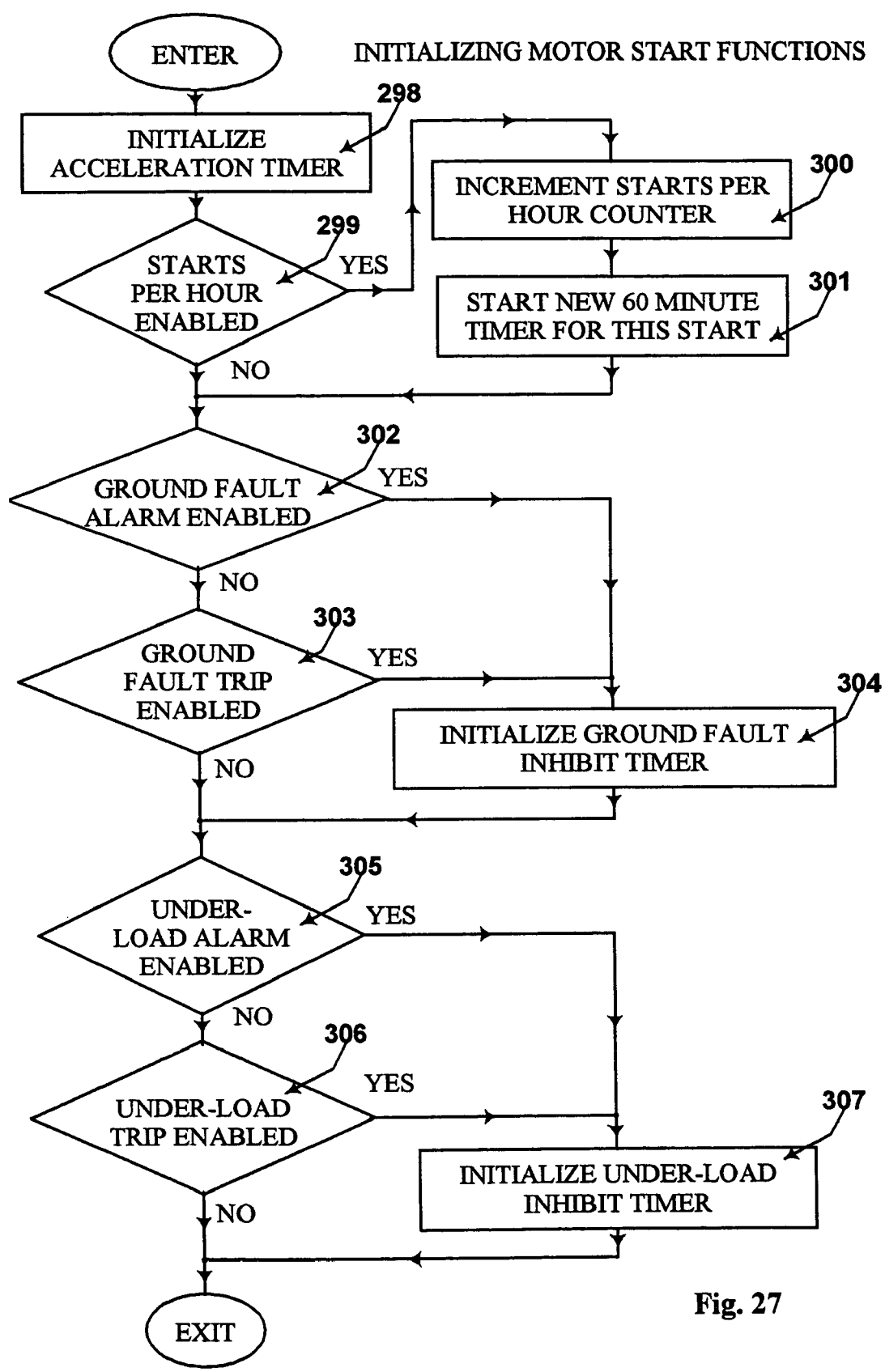
FIG. 27 is a flowchart detailing the initializing motor start functions provided by the overload protector in accordance with the present invention.

Referring particularly to FIG. 27, Initializing Motor Start Functions, the motor acceleration timer is initialized (298). If the starts per hour inhibit is enabled (299), increment the starts per hour counter (300), then start a new 60 minute timer for this start (301). If the starts per hour inhibit is not enabled (299), test to see if ground fault alarm is enabled (302). If ground fault alarm (302) is not enabled, test to see if ground fault trip is enabled (303). If either the ground fault alarm (302) or the ground fault trip (303) is enabled, initialize ground fault inhibit timer. If ground fault trip is not enabled (303), or after ground fault timer is initialized (304), test to see if under-load alarm is enabled (305). If under-load alarm is not enabled (305), test to see if under-load trip is enabled (306). If either the under-load alarm (305) or the under-load trip (306) is enabled, initialize under-load inhibit timer. If the under-load trip is not enabled (306), then exit.

Figure 28:
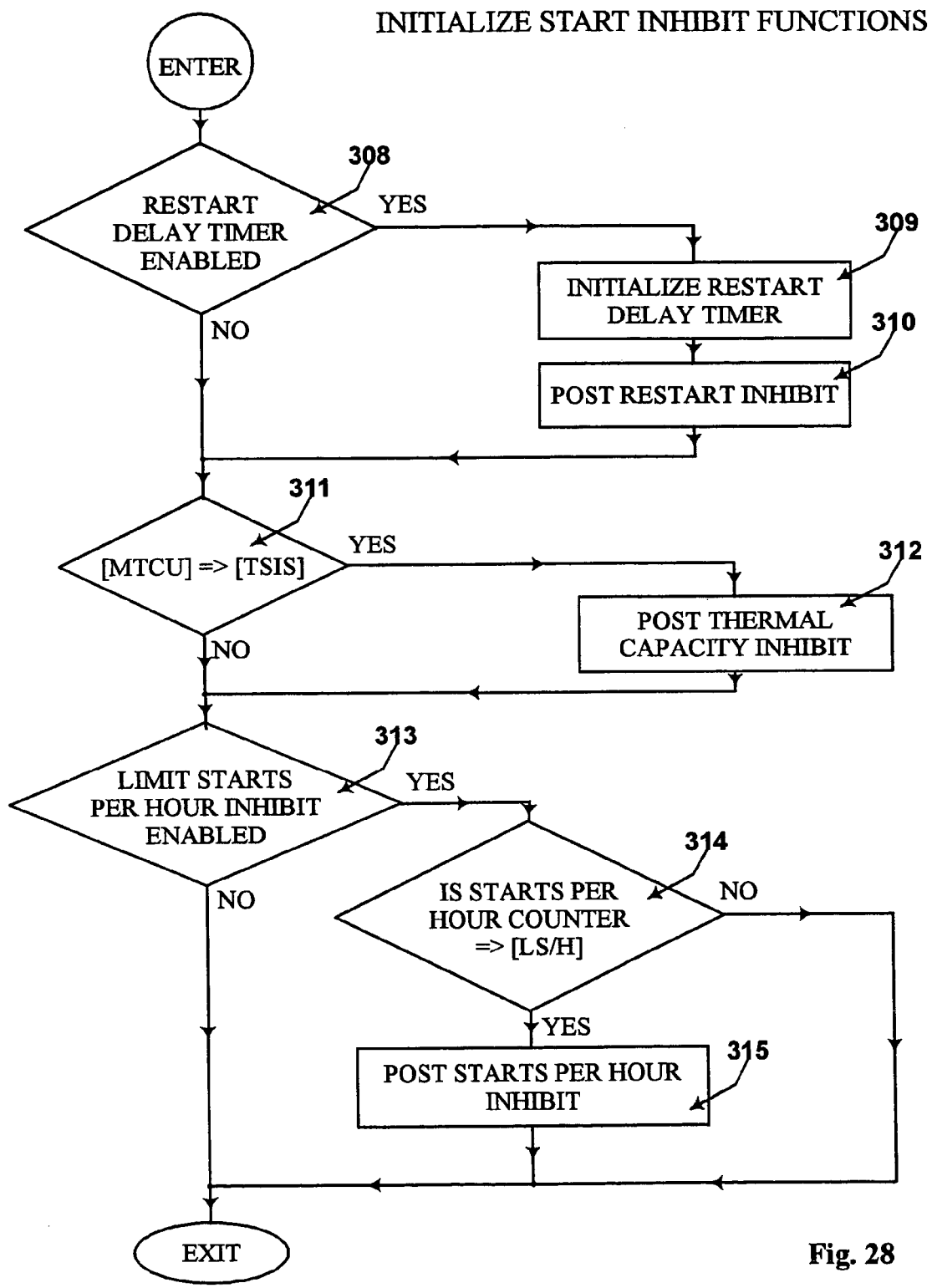
FIG. 28 is a flowchart detailing the initialize start inhibit functions provided by the overload protector in accordance with the present invention.

Referring particularly to FIG. 28, Initialize Start Inhibit Functions, if the restart delay timer is enabled (308), initialize restart delay timer (309) and post restart inhibit (310). However, if the restart delay timer is not enabled (308), or after the restart inhibit is posted (310), test to see if motor thermal capacity used [MTCU] is equal to or greater than the thermal start inhibit setting [TSIS] (311). If motor thermal capacity used [MTCU] is equal to or greater than the thermal start inhibit setting [TSIS] (311), post thermal capacity inhibit (312). If motor thermal capacity used [MTCU] is less than the thermal start inhibit setting [TSIS] (311), or after thermal capacity inhibit is posted, test to see if limit starts per hour inhibit is enabled (313). If limit starts per hour inhibit is not enabled (313), then exit. However, if limit starts per hour inhibit is enabled, test to see if starts per hour counter is equal to or greater than the limit starts per hour setting [LS/H] (314). If starts per hour counter is not equal to or greater than the limit starts per hour setting [LS/H] (314), then exit. If starts per hour counter is equal to or greater than the limit starts per hour setting [LS/H] (314), post starts per hour inhibit (315).

Figure 29:
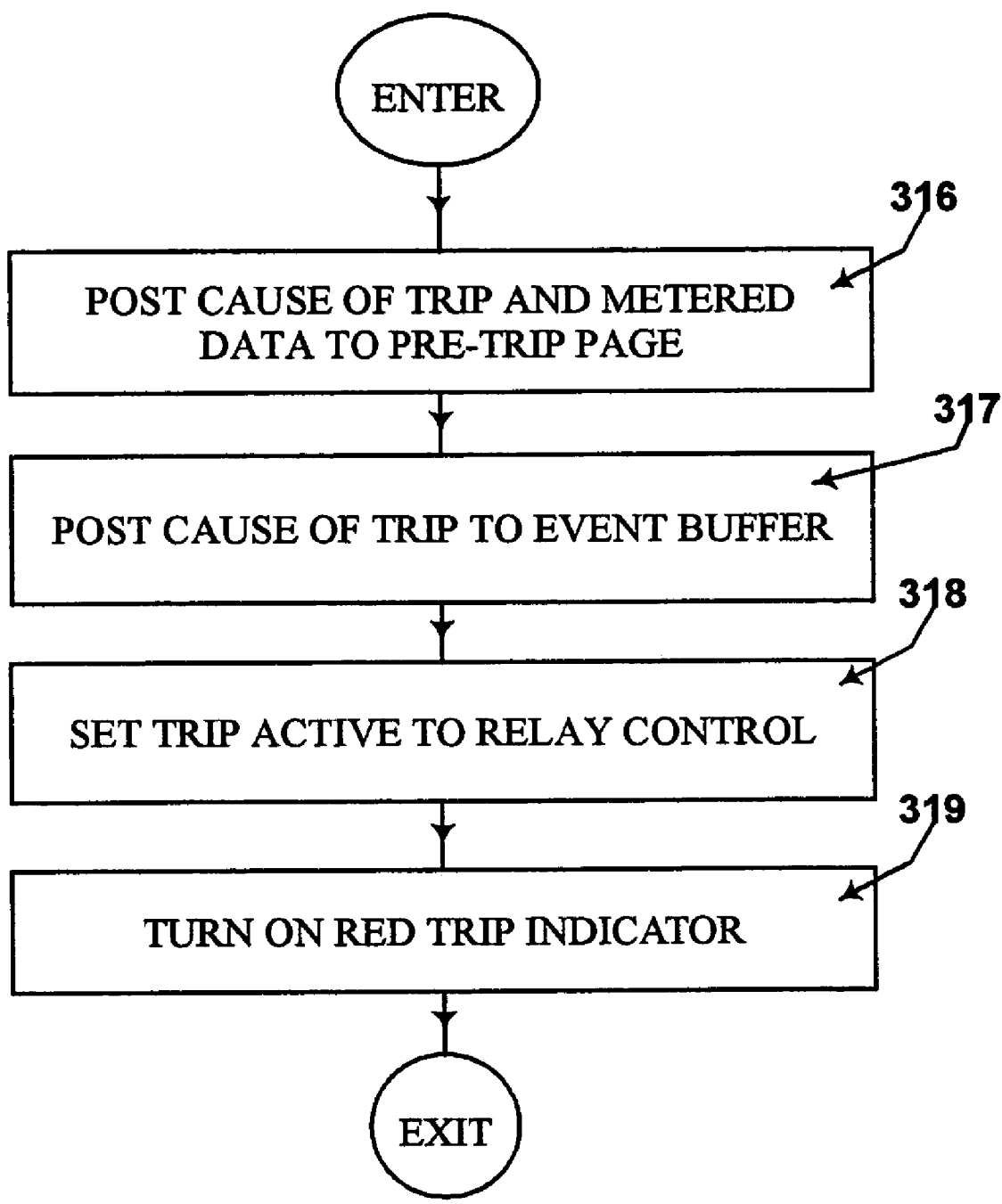
FIG. 29 is a flowchart detailing the operations of the trip module as provided by the overload protector in accordance with the present invention.

Referring particularly to FIG. 29, Trip Module, post the cause of trip and metered data to the pre-trip page (316), post the cause of trip to the event buffer (317), set the trip active to the relay control module (318), and turn on the red trip indicator (319).

Figure 30:
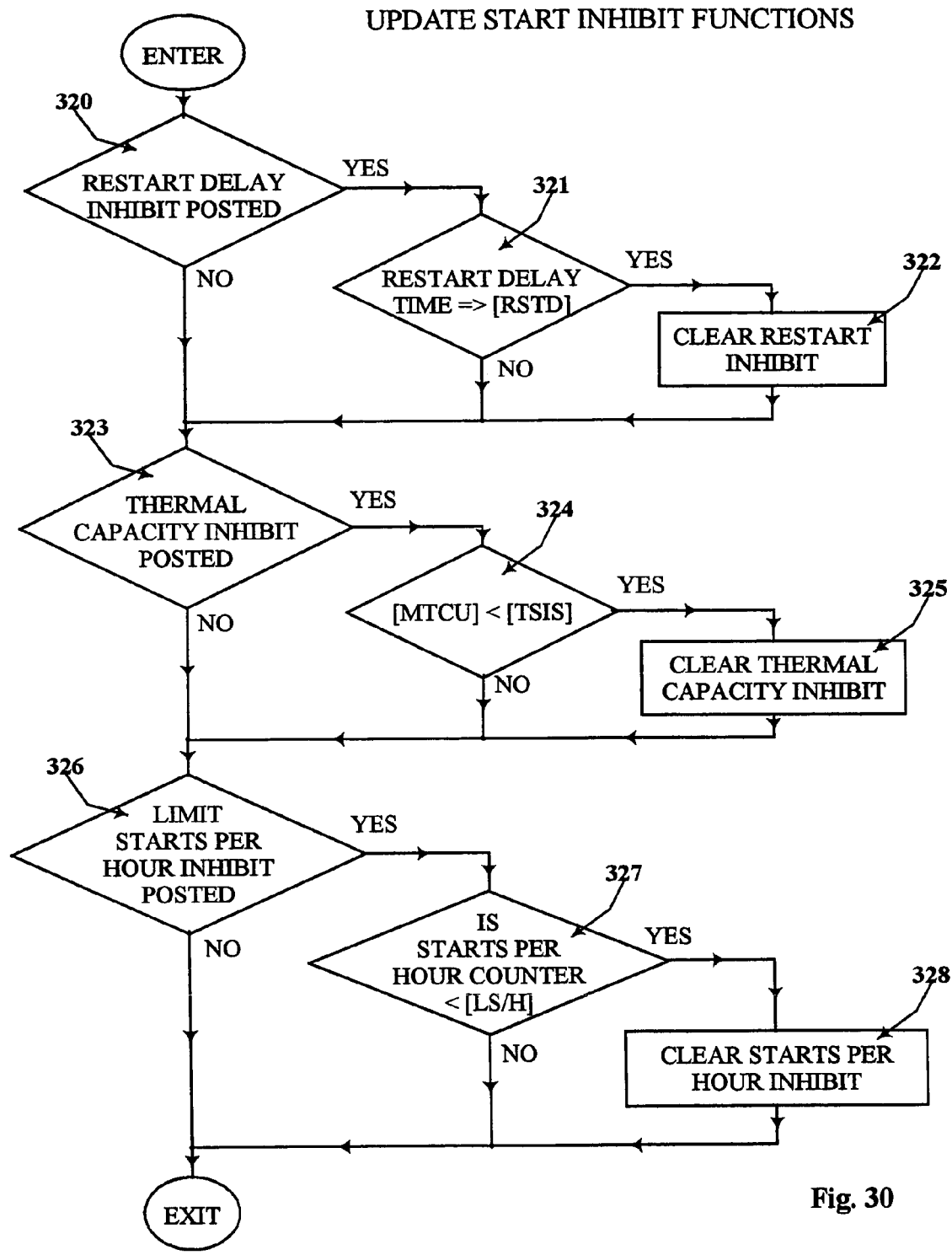
FIG. 30 is a flowchart detailing the update start inhibit functions provided by the overload protector in accordance with the present invention.

Referring particularly to FIG. 30, Update Start Inhibit Functions, if the restart delay inhibit is posted (320) and the restart delay timer is equal to or greater than the restart delay time setting [RSTD] (321), clear the restart inhibit (322). If the restart delay inhibit is not posted (320) or if restart delay time is less than [RSTD] (321) or after restart inhibit (322) is clear, test to see if the thermal capacity inhibit is posted (323). If the thermal capacity inhibit is posted (323) and if the thermal capacity used [MTCU] is less than the thermal start inhibit setting [TSIS] (324), clear the thermal capacity inhibit (325). If the thermal capacity inhibit is not posted (323), or if the [MTCU] is equal to or greater than [TSIS] (324) or after the thermal capacity inhibit is cleared (325), test to see if limit starts per hour inhibit is posted (326). If the limit starts per hour inhibit is posted (326) and the starts per our counter is less than the limit starts per hour setting [LS/H] (327), clear the starts per hour inhibit (328).

Figure 31:
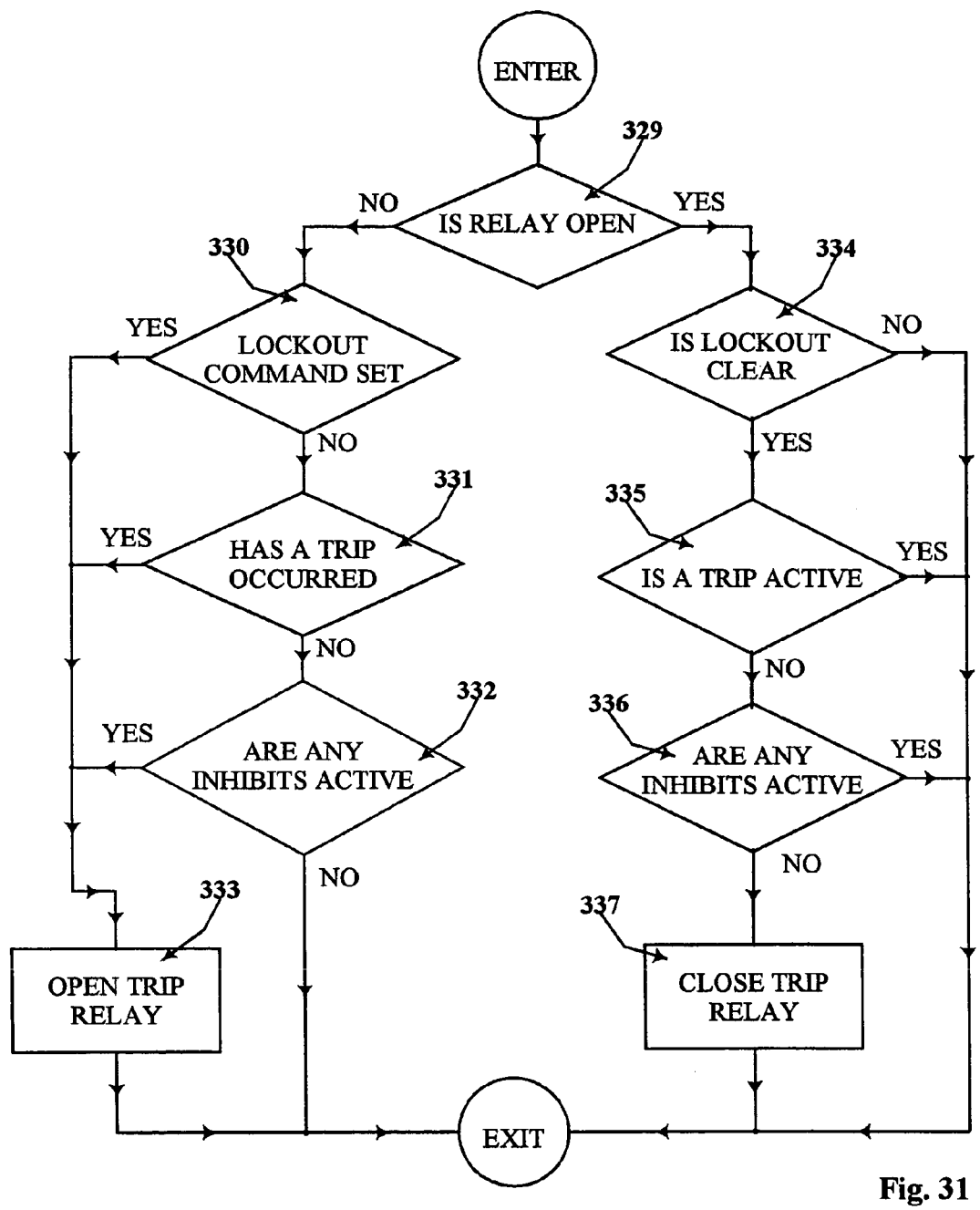
FIG. 31 is a flowchart detailing the trip protector control module functions provided by the overload protector in accordance with the present invention.

Referring particularly to FIG. 31, Trip Relay Control Module, tests to see if the relay is open (329). If the relay is open and the lockout is not clear (334), then exit. If the lockout is clear (334), the trip is active (335), or the inhibits are active (336), then exit. However, if the lockout is clear and a trip is not active (335), and no inhibits are active (336), close the trip relay (337). If the relay is not open (329), test to see if the lockout command is set (330). If the lockout command is set (330), then open the trip relay (333) and exit. If the lockout command is not set (330), a trip has not occurred (331), and the inhibits are not active (332), then exit. However, if a trip has occurred (331), or any inhibits are active (332), then open trip relay (333) and then exit.

Figure 32:
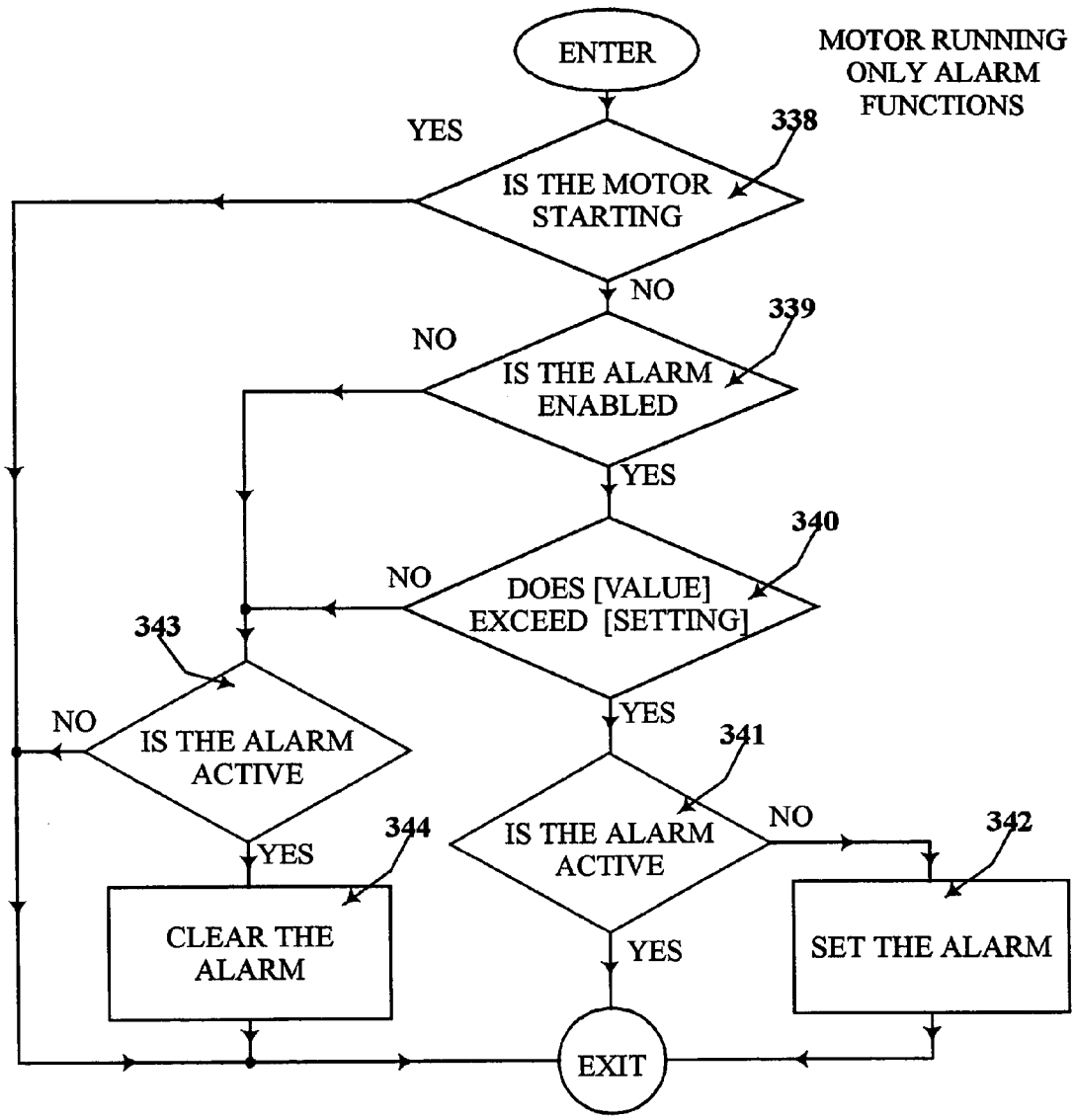
FIG. 32 is a flowchart detailing the motor running only alarm functions provided by the overload protector in accordance with the present invention.

Referring particularly to FIG. 32, Motor Running Only Alarm Functions, overload warning, overload alarm, and jam alarm are alarm functions that are only active when the motor is running. The table referenced as (345) lists the alarms, values tested for each alarm, and the alarm pickup settings. Test to see if the motor is starting (338). If the motor is starting (338), test to see if the alarm is enabled (339). If the alarm is enabled (339), test to see if the [VALUE] exceeds the [SETTING] (340). If the [VALUE] exceeds the [SETTING] (340), test to see if the alarm is active (341). If the alarm is not active (342), set the alarm (342). If the alarm is not active (341), then exit.

If the motor is starting (338), then exit. If the motor is starting (338) and the alarm is not enabled (339) or if alarm is enabled and the [VALUE] does not exceeds the pickup [SETTING] (340), test to see if the if the alarm is active (343). If the alarm is active (343), then clear the alarm (344) and exit. If the alarm is not active (343), then exit.

Figure 33:
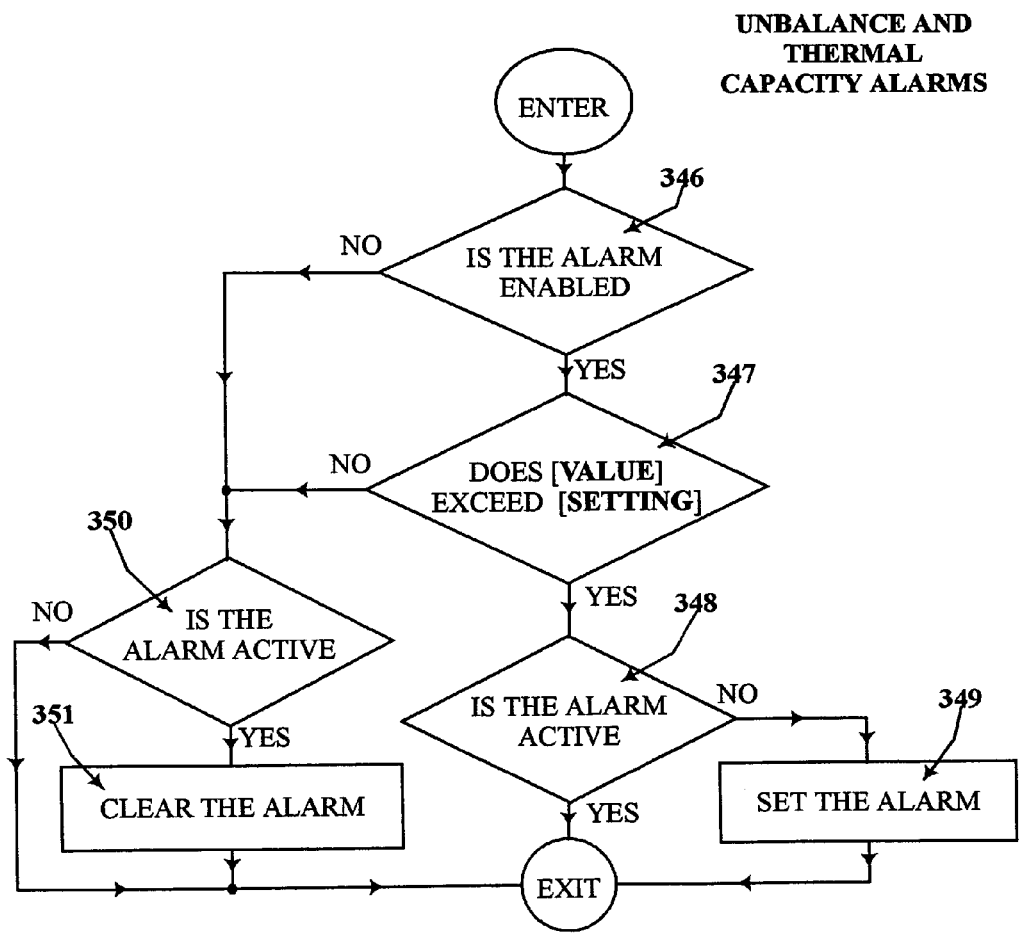
FIG. 33 is a flowchart detailing the unbalance and thermal capacity alarms provided by the overload protector in accordance with the present invention.

Referring particularly to FIG. 33, Unbalance and Thermal Capacity Alarms, the alarms are tested when motor is starting (265) (as shown in FIG. 22) or running (275) (as shown in FIG. 23). The table referred to as (352) lists the alarms, values tested for each alarm, and the alarm pickup settings. If the alarm is not enabled (346), then test to see if the alarm is active (350). If the alarm is not active (350), then exit. If the alarm is active (350), then clear the alarm (351). If the alarm is enabled (346), test to see if the [VALUE] exceeds the pickup [SETTING] (347). If the [VALUE] does not exceed the pickup [SETTING] (347), then test to see if the alarm is active (350). If the alarm is not active (350), then exit. If the alarm is active (350), then clear the alarm (351). However, if the [VALUE] does exceed the pickup [SETTING] (347), then test to see if the alarm is active (348). If the alarm is active (348), then exit. If the alarm is not active, then set the alarm (349).

Figure 34:
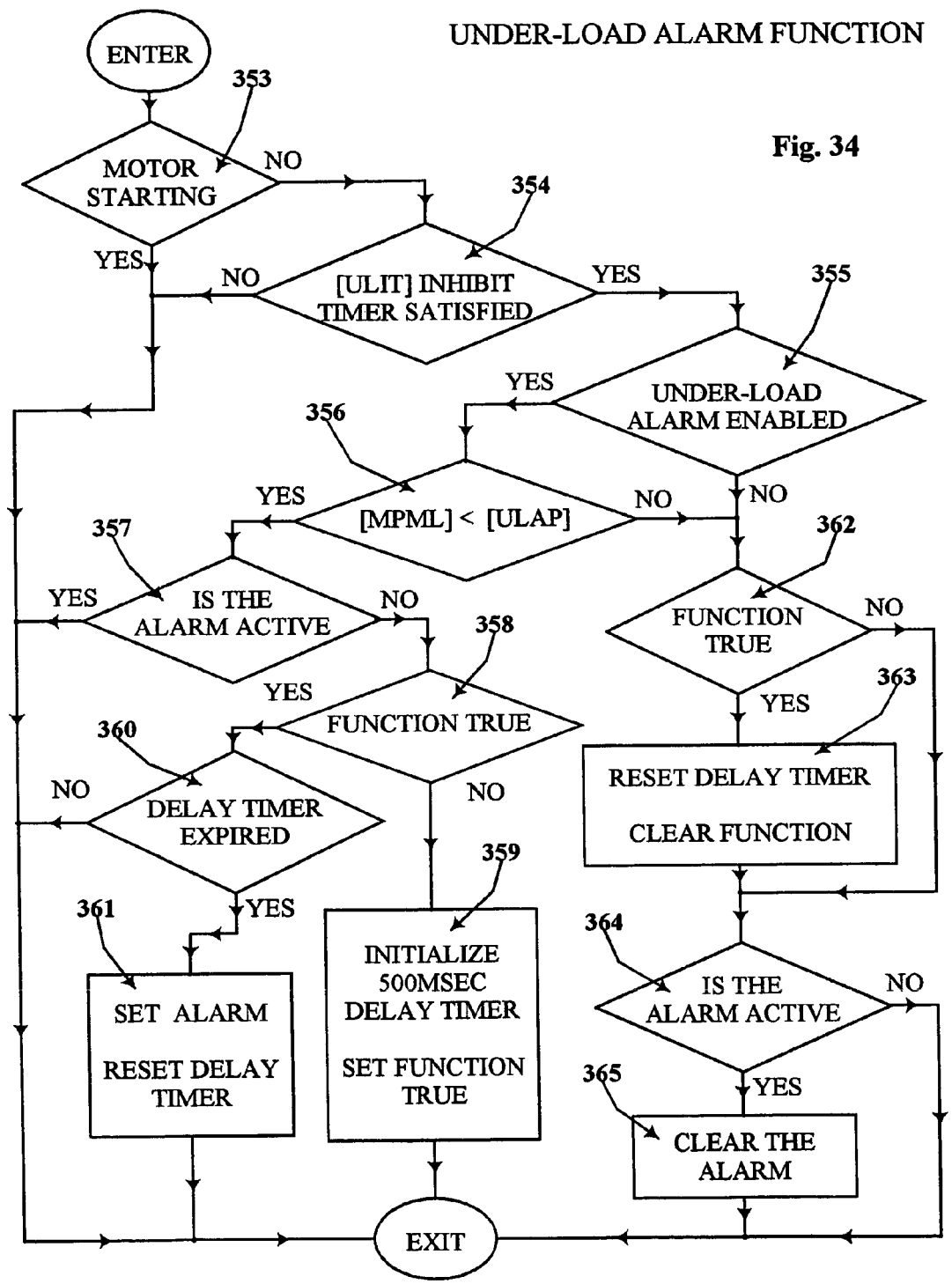
FIG. 34 is a flowchart detailing the under-load alarm function provided by the overload protector in accordance with the present invention.

Referring particularly to FIG. 34, Under-Load Alarm Function, check to see if the motor is starting (353). If the motor is not starting (353), test to see if the under-load [ULIT] inhibit timer is satisfied (354). If the inhibit timer is satisfied (354), test to see if the under-load alarm enabled (355). If the under-load alarm is enabled (355), test to see if the percent motor load [MPML] is less than the under-load alarm setting [ULAP] (356). If [MPML] is less than [ULAP] (356), test to see if the alarm is active (357). If the alarm (357) is active, then exit. If the alarm is not active (357), then test to see if the function is true (358). If the function is not true (358), then initialize the 500 millisecond delay timer and set the function true (359). If the function is true (358), test to see if the delay timer has expired (360). If the timer has not expired (360), then exit. If the timer has expired (360), set the alarm and reset the delay timer (361).

If the motor is starting (353), or if the motor is not starting (353) and the inhibit timer is not satisfied (354), then exit. However, if the motor is not starting (353) and the inhibit timer is satisfied (354), then if the under-load alarm is not enabled (355), or the under-load alarm is enabled (355) and [MPML] is not less than [ULAP] (356), then test to see if the function is true (362). If the function is true (362), then reset the delay timer and clear the function (363). If the function is not true (362), or after the delay timer is reset and the function is cleared (363), then test to see if the alarm is active (364), if active clear the alarm (365). If the alarm is not active (364), then exit.

Figure 35:
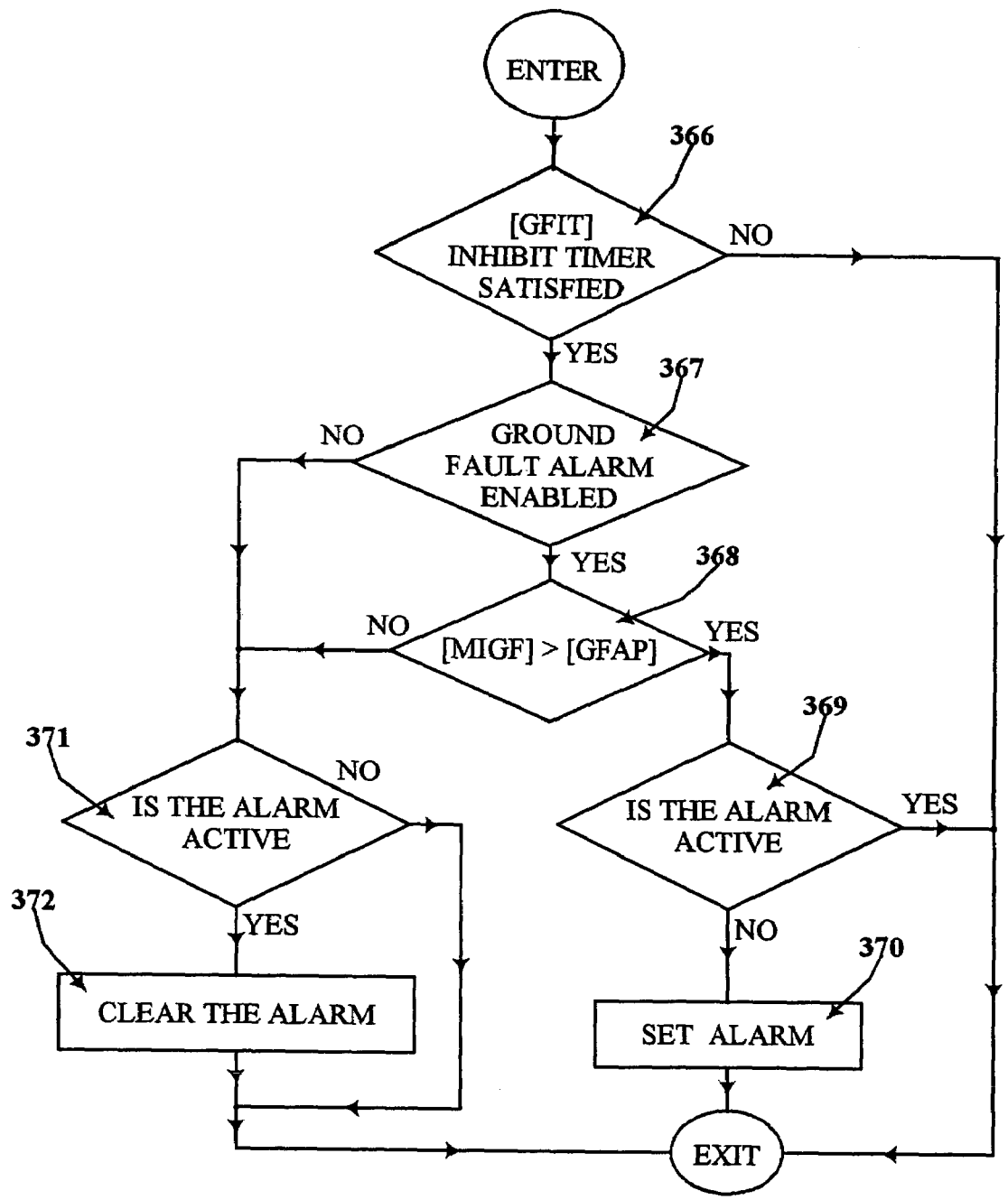
FIG. 35 is a flowchart detailing the ground fault alarm function provided by the overload protector in accordance with the present invention.

Referring particularly to FIG. 35, Ground Fault Alarm Operation, if the ground fault inhibit timer [GFIT] is satisfied (366), then test to see if the ground fault alarm is enabled (367). If the ground fault alarm is enabled (367), then test to see if [MIGF] is equal to or greater than the ground fault alarm pickup setting [GFAP] (368). If the ground fault current [MIGF] is greater than the ground fault alarm pickup setting [GFAP] (368), test to see if the alarm is active (369). If the alarm is active (369), then exit. If the alarm is not active (369), then set the alarm (370).

If the ground fault inhibit timer [GFIT] is not satisfied (366), then exit. However, if the ground fault inhibit timer [GFIT] is satisfied (366), and if the ground fault alarm is not enabled (367), or if the ground fault alarm is enabled (367) and then if [MIGF] is less than the ground fault alarm pickup setting [GFAP] (368), then test to see if the alarm is active (371), if active clear the alarm (372). If the alarm is not active (371), then exit.

Referring particularly to FIGS. 36 to 42, only one trip function can return a trip. If any trip function returns a trip, that trip posting will block the rest of the trip functions from operating.

Figure 36:
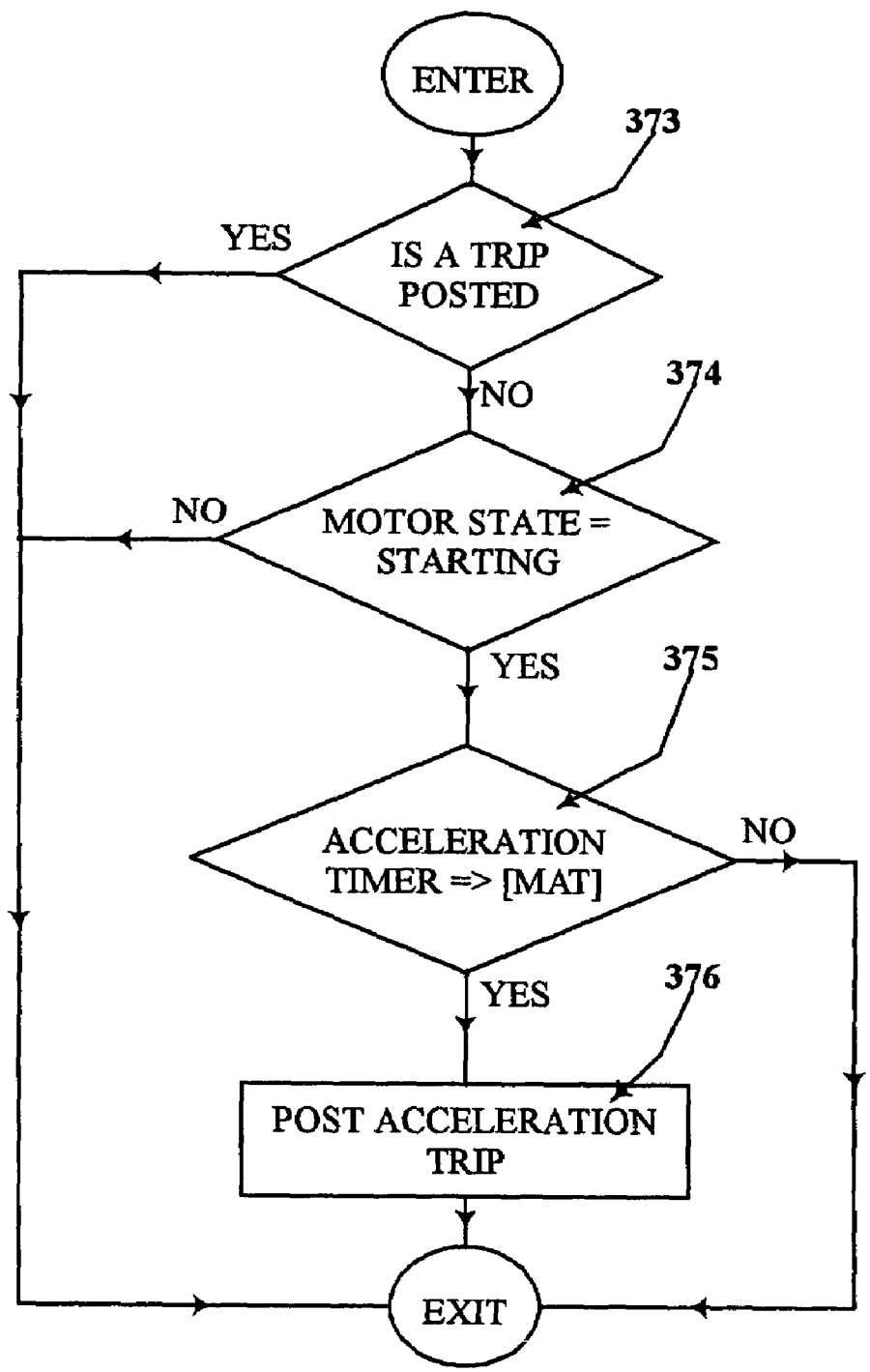
FIG. 36 is a flowchart detailing the acceleration failure trip functions provided by the overload protector in accordance with the present invention.

Referring particularly to FIG. 36, Acceleration Failure Trip, test to see if a trip is posted (373). If a trip is posted (373), then exit. If a trip is not posted (373), then test to see if the motor state equals starting (374). If the motor state does not equal starting (374), then exit. If the motor state equals starting (374), then test to see if the acceleration timer is equal to or greater than [MAT] (375). If the acceleration timer is less than [MAT] (375), then exit. If the motor acceleration timer is equal to or greater than the motor acceleration time setting [MAT] (375), then post an acceleration trip (376).

Figure 37:
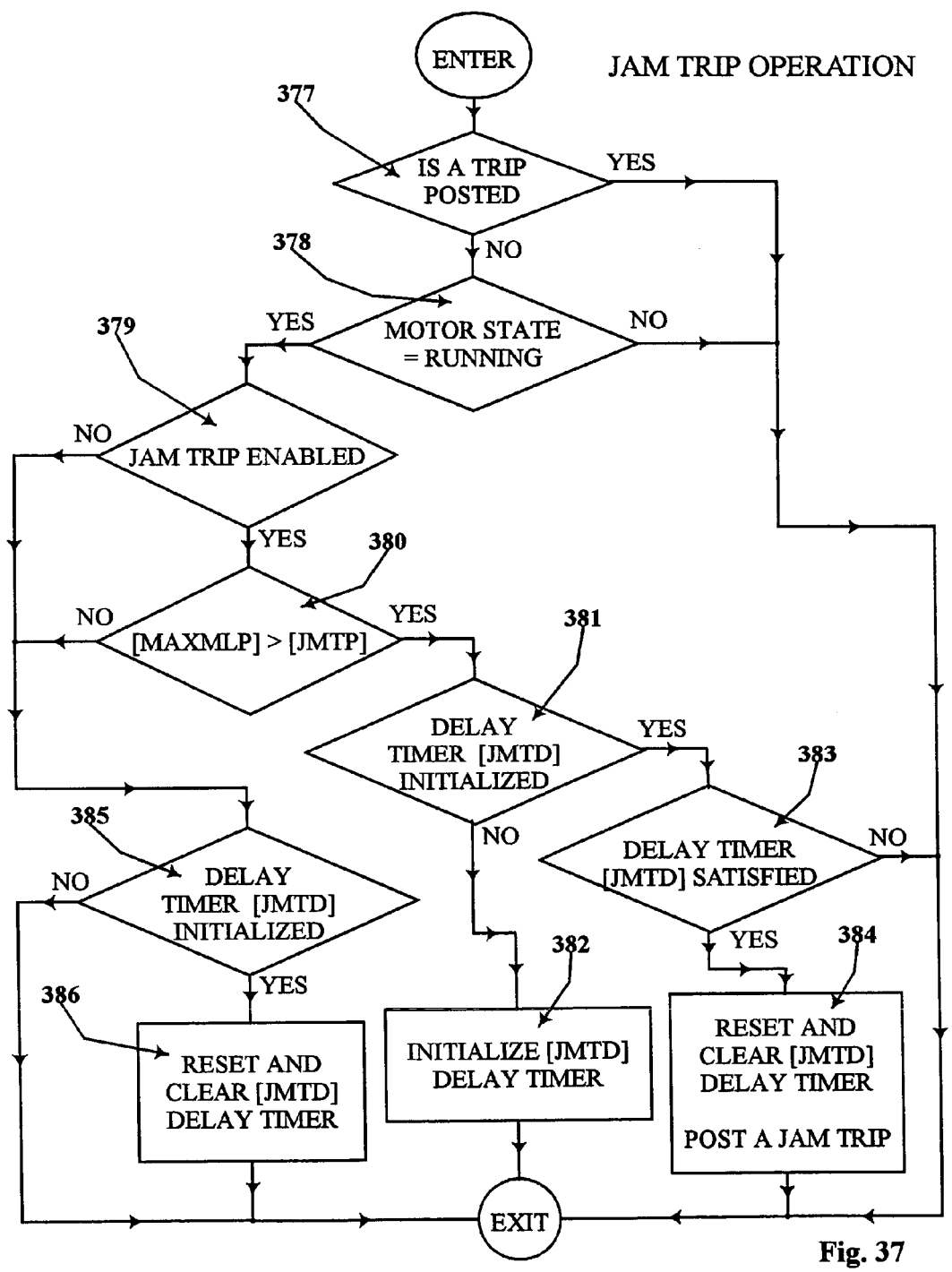
FIG. 37 is a flowchart detailing the jam trip operation functions provided by the overload protector in accordance with the present invention.

Referring particularly to FIG. 37, Jam Trip Operation, if a trip is not posted (377), test to see if the motor state is running (378). If the motor state is running (378), test to see if the jam trip is enabled (379). If the jam trip is enabled (379), test to see if the highest phase load [MaxMLP] is greater than the jam trip pickup setting [JMTP] (380). If the highest phase load [MaxMLP] is equal to or greater than the jam trip pickup setting [JMTP] (380), then test to see if the delay timer [JMTD] is initialized (381). If the delay timer [JMTD] is not initialized (381), then initialize the delay timer (382) and exit. If the delay timer [JMTD] is initialized (381), then test to see if the delay timer [JMTD] is satisfied (383). If the delay timer [JMTD] is not satisfied (383), then exit. If the delay timer [JMTD] is satisfied (383), then reset and clear [JMTD] delay timer and post a jam trip (384).

If a trip is posted (377), or if a trip is not posted (377) and the motor state does not equal running (378), then exit. However, if a trip is not posted (377) and the motor state is running (378), then if the jam trip is not enabled (379), or if jam trip is enabled (379), and the highest phase load [MaxMLP] is less than or equal to the jam trip pickup setting [JMTP] (380), then test to see if the delay timer [JMTD] is initialized (385). If the delay timer [JMTD] is initialized (385), then reset and clear [JMTD] delay timer (386), if not initialized then exit.

Figure 38:
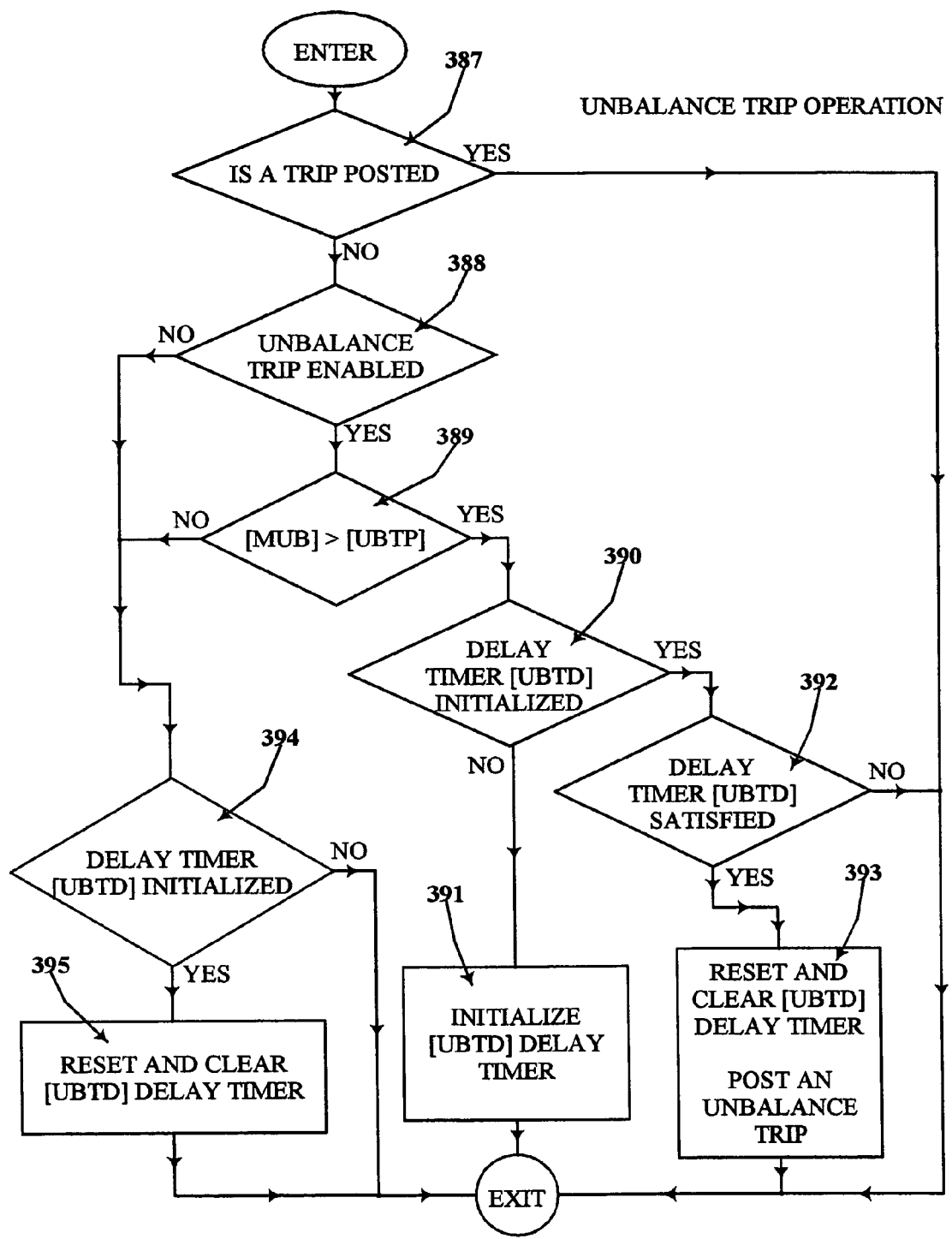
FIG. 38 is a flowchart detailing the unbalance trip operation functions provided by the overload protector in accordance with the present invention.

Referring particularly to FIG. 38, Unbalance Trip Operation, test to see if a trip is posted (387). If a trip is not posted (387), then test to see if the unbalance trip is enabled (388). If the unbalance trip is enabled (388), test to see if the percent phase unbalance [MUB] is greater than the unbalance trip pickup setting [UBTP] (389). If the percent phase unbalance [MUB] is greater than the unbalance trip pickup setting [UBTP] (389), then test to see if the [UBTD] delay timer initialized (390). If the [UBTD] delay timer is not initialized (390), then initialize the [UBTD] timer (391) and exit. If the [UBTD] delay timer is initialized (390), then test to see if the [UBTD] delay timer is satisfied (392). If the [UBTD] delay timer is not satisfied (392), then exit. If the [UBTD] delay timer is satisfied (392), then reset and clear the [UBTD] delay timer and post an unbalance trip (393).

If a trip is posted (387), then exit. However, if a trip is not posted (387), and if the unbalance trip is not enabled (388), or if the unbalance trip is enabled (388) and the percent phase unbalance [MUB] less than the unbalance trip pickup setting [UBTP] (389), then test to see if the [UBTD] delay timer is initialized (394). If the [UBTD] delay timer is initialized (394), then reset and clear the [UBTD] delay timer (395), if not initialized then exit.

Figure 39:
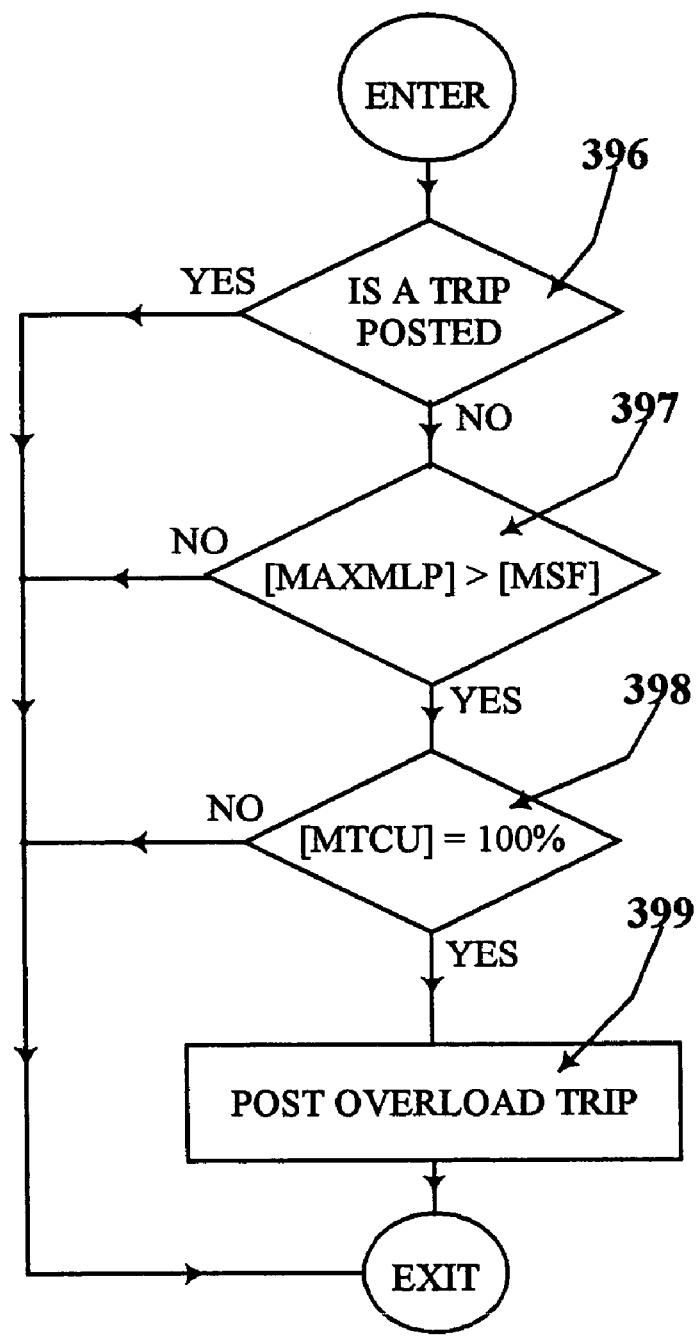
FIG. 39 is a flowchart detailing the thermal overload trip functions provided by the overload protector in accordance with the present invention.

Referring particularly to FIG. 39, Thermal Overload Trip, test to see if a trip is posted (396). If a trip is not posted (396), then test to see if the highest phase load [MaxMLP] is greater than the motor service factor setting [MSF] (397). If the highest phase load [MaxMLP] is greater than the motor service factor setting [MSF] (397), then test to see if the motor thermal capacity used [MTCU] equals 100% (398). If the motor thermal capacity used [MTCU] equals 100% (398), then post an overload trip (399).

If a trip is posted (396), or if a trip is not posted (396) and the highest phase load [MaxMLP] is less than the motor service factor setting [MSF] (397), then exit. If a trip is not posted (396) and the highest phase load [MaxMLP] is greater than the motor service factor setting [MSF] (397), and if the motor thermal capacity used [MTCU] does not equal 100% (398), exit.

Figure 40:
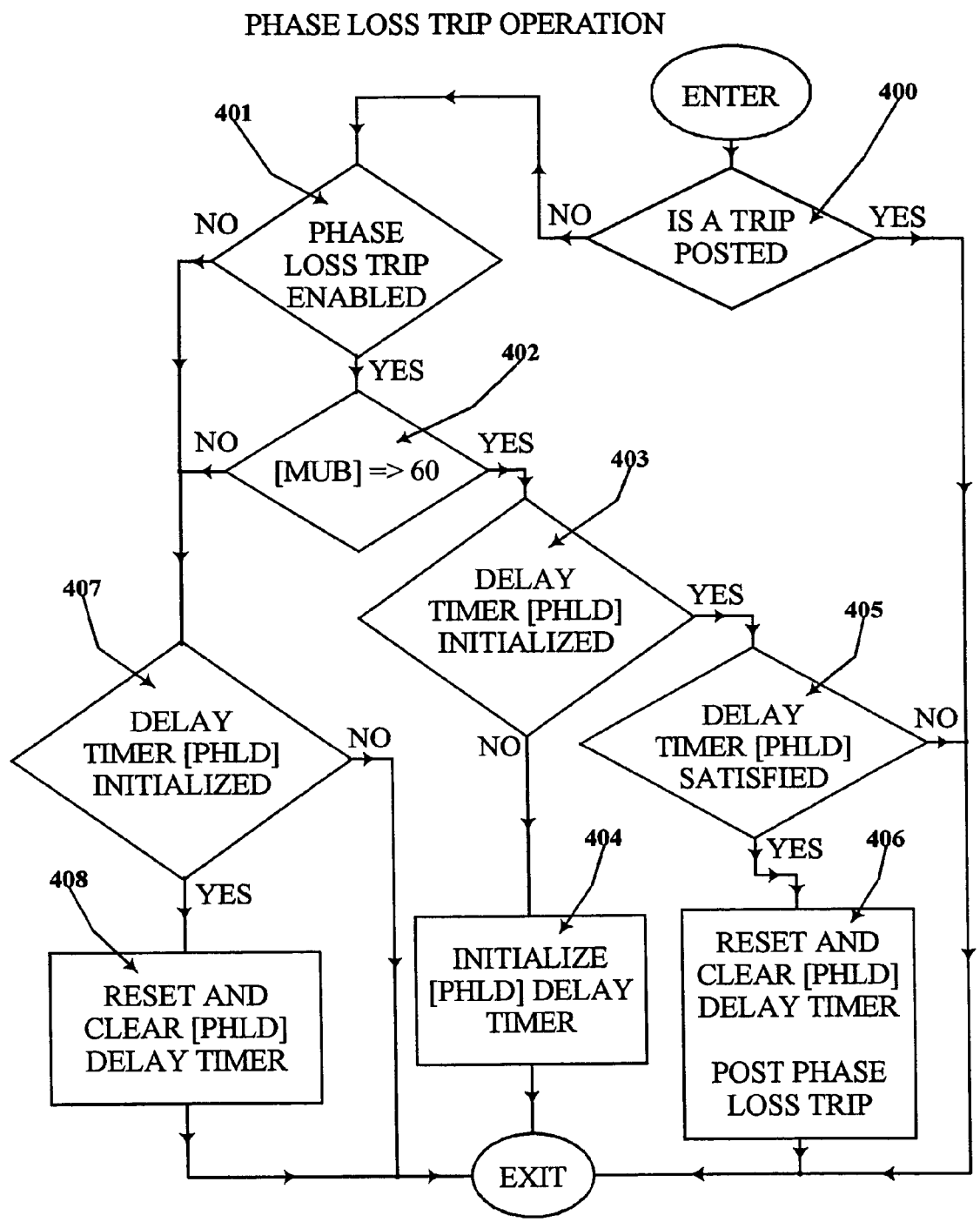
FIG. 40 is a flowchart detailing the phase loss trip operation functions provided by the overload protector in accordance with the present invention.

Referring particularly to FIG. 40, Phase Loss Trip Operation, test to see if a trip is posted (400). If a trip is not posted (400), then test to see if phase loss trip is enabled (401). If phase loss trip is enabled (401), then test to see if the percent phase unbalance [MUB] is greater than or equal to 60% (402). If the percent phase unbalance [MUB] is equal to or greater than 60% (402), then test to see if the delay timer [PHLD] is initialized (403). If the delay timer [PHLD] is not initialized (403), then initialize the [PHLD] delay timer (404) and exit. If the delay timer [PHLD] is initialized (403), then test to see if the [PHLD] delay timer is satisfied (405). If the [PHLD] delay timer is not satisfied (405), then exit. If the [PHLD] delay timer is satisfied (405), then reset and clear the [PHLD] delay timer and post a phase loss trip (406).

If a trip is posted (400), then exit. However, if a trip is not posted (400), and the phase loss trip is not enabled (401), or if phase loss trip is enabled (401) and the percent phase unbalance [MUB] is less than 60% (402), then test to see if the delay timer [PHLD] is initialized (407). If the delay timer [PHLD] is initialized (407) then reset and clear the [PHLD] delay timer (408), if not initialized then exit.

Figure 41:
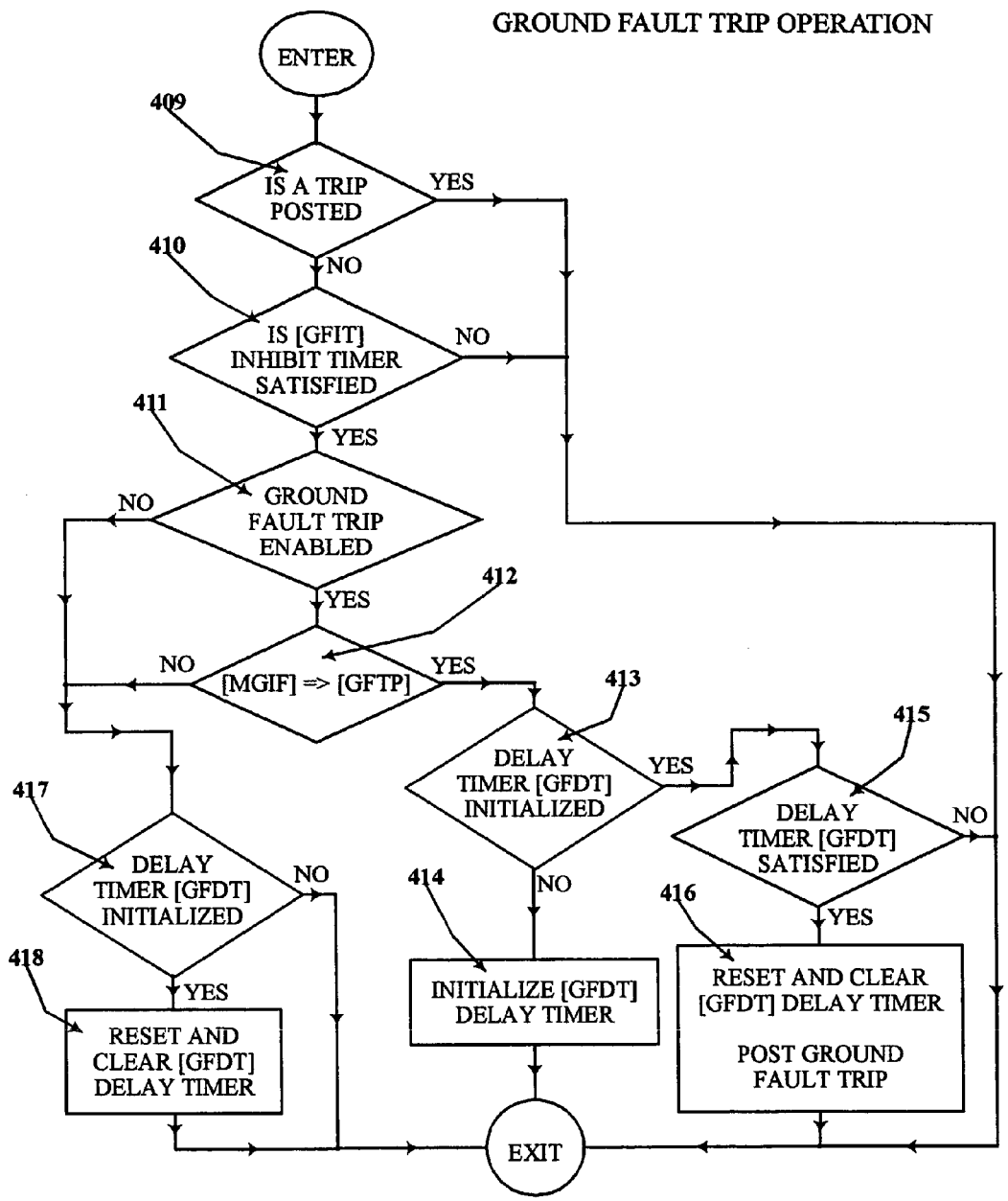
FIG. 41 is a flowchart detailing the ground fault trip operation functions provided by the overload protector in accordance with the present invention.

Referring particularly to FIG. 41, Ground Fault Trip Operation, test to see if a trip is posted (409). If a trip is not posted (409), then test to see if the ground fault inhibit timer satisfied (410). If the ground fault inhibit timer is satisfied (410), then test to see if the ground fault trip is enabled (411). If the ground fault trip is enabled (411), then test to see if the ground fault current [MIGF] is equal to or greater than the ground fault trip pickup setting [GFTP] (412). If the ground fault current [MIGF] is equal to or greater than the ground fault trip pickup setting [GFTP] (412), then test to see if the delay timer [GFDT] is initialized (413). If the delay timer [GFDT] is not initialized (413), then initialize the [GFDT] delay timer (414). If the delay timer [GFDT] is initialized (413), then test to see if the delay timer [GFDT] is satisfied (415). If the delay timer [GFDT] is not satisfied (415), then exit. If the delay timer [GFDT] is satisfied (415), then reset and clear [GFDT] delay timer and post a ground fault trip (416).

If a trip is posted (409) or if a trip is not posted (409) and the [GFIT] inhibit timer is not satisfied (410), then exit. However, if a trip is not posted (409) and the [GFIT] inhibit timer is satisfied (410), then if the ground fault trip is not enabled (411) or if the ground fault trip is enabled (411) and the ground fault current [MIGF] is less than the ground fault trip pickup setting [GFTP] (412), then test to see if the delay timer [GFDT] is initialized (417). If the delay timer [GFDT] is initialized (417), then reset and clear the [GFDT] delay timer (418), if not initialized then exit.

Figure 42:
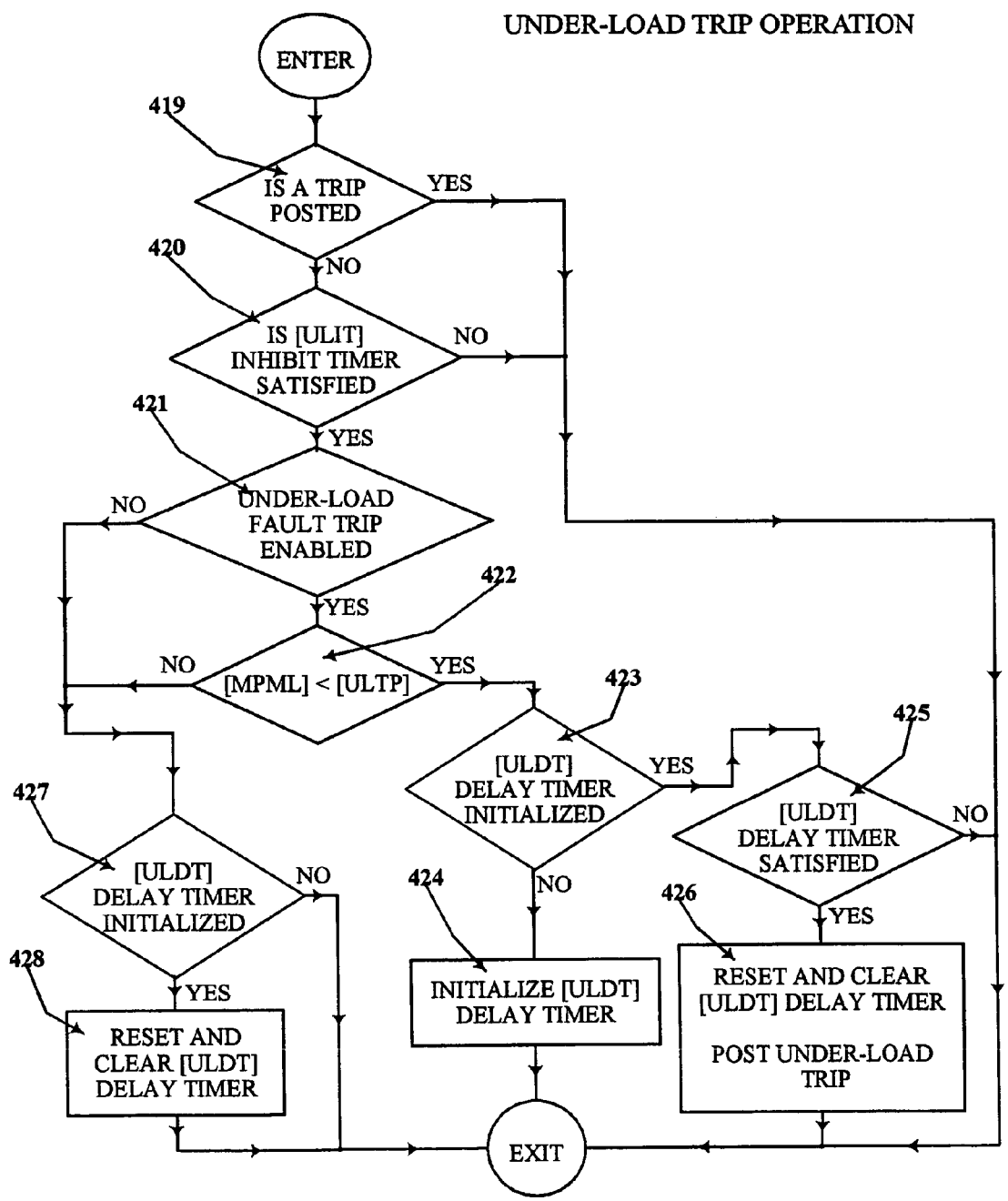
FIG. 42 is a flowchart detailing the under-load trip operation functions provided by the overload protector in accordance with the present invention.

Referring particularly to FIG. 42, Under-Load Trip Operation, test to see if a trip is posted (419). If a trip is posted (419), then test to see if the under-load inhibit timer is satisfied (420). If the under-load inhibit timer is satisfied (420), then test to see if under-load trip is enabled (421). If under-load trip is enabled (421), then test to see if the average motor load [MPML] is less than the under-load trip pickup setting [ULTP] (422). If the average motor load [MPML] less than the under-load trip pickup setting [ULTP] (422), then test to see the delay timer [ULDT] is initialized (423). If the delay timer [ULDT] is not initialized (423), then initialize the [ULDT] delay timer (424). If the delay timer [ULDT] is initialized (423), then test to see if the delay timer [ULDT] is satisfied (425). If the delay timer [ULDT] is not satisfied (425), then exit. If the delay timer [ULDT] is satisfied (425), then post an under-load trip and reset and clear [ULDT] delay timer (426).

If a trip is posted (419), or if a trip is not posted (419) and the under-load inhibit timer is not satisfied (420), exit. However, is a trip is not posted and the [ULIT] inhibit timer is satisfied (420), and the under-load trip is not enabled (421), or if under-load trip is enabled (421) and if the average motor load [MPML] is equal to or greater than the under-load trip pickup setting [ULTP] (422), then test to see if the delay timer [ULDT] is initialized (427). If the delay timer [ULDT] is initialized (427), then reset and clear the [ULDT] delay timer (428), if not initialized then exit.

Figure 43:
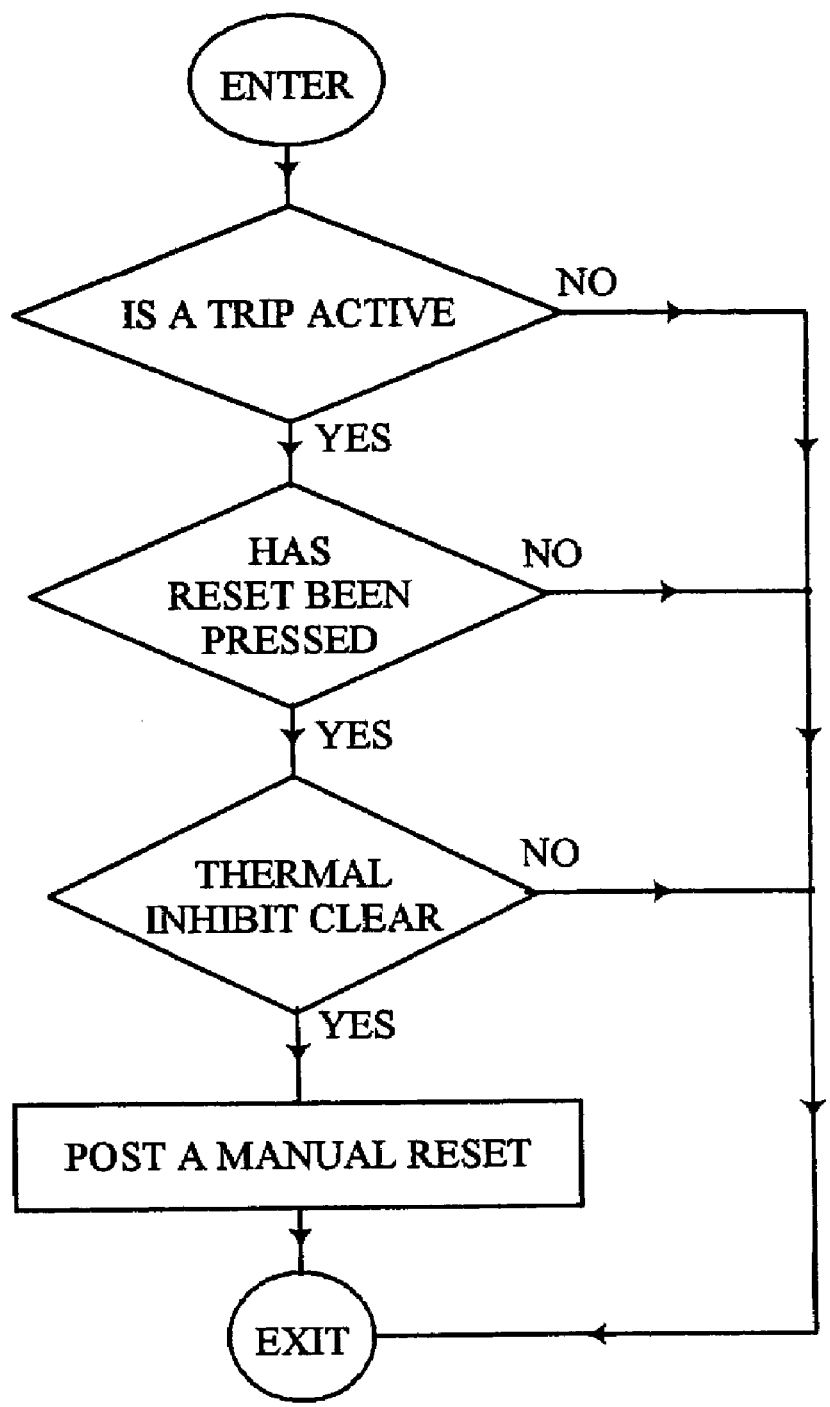
FIG. 43 is a flowchart detailing the manual reset operation functions provided by the overload protector in accordance with the present invention.

Referring particularly to FIG. 43, Manual Reset Operation, test to see if a trip is active (429). If a trip is active (429), then test to see if a reset has been pressed (430). If a reset has been pressed (430), then test to see if thermal inhibit is clear (431). If thermal inhibit is clear (431), then post a manual reset (432).

If a trip is not active (429), or if a trip is active (429) and the reset has not been pressed (430), then exit. If a trip is active (429) and the reset has been pressed (430), and then if the thermal inhibit is not clear (431), then exit.

Figure 44:
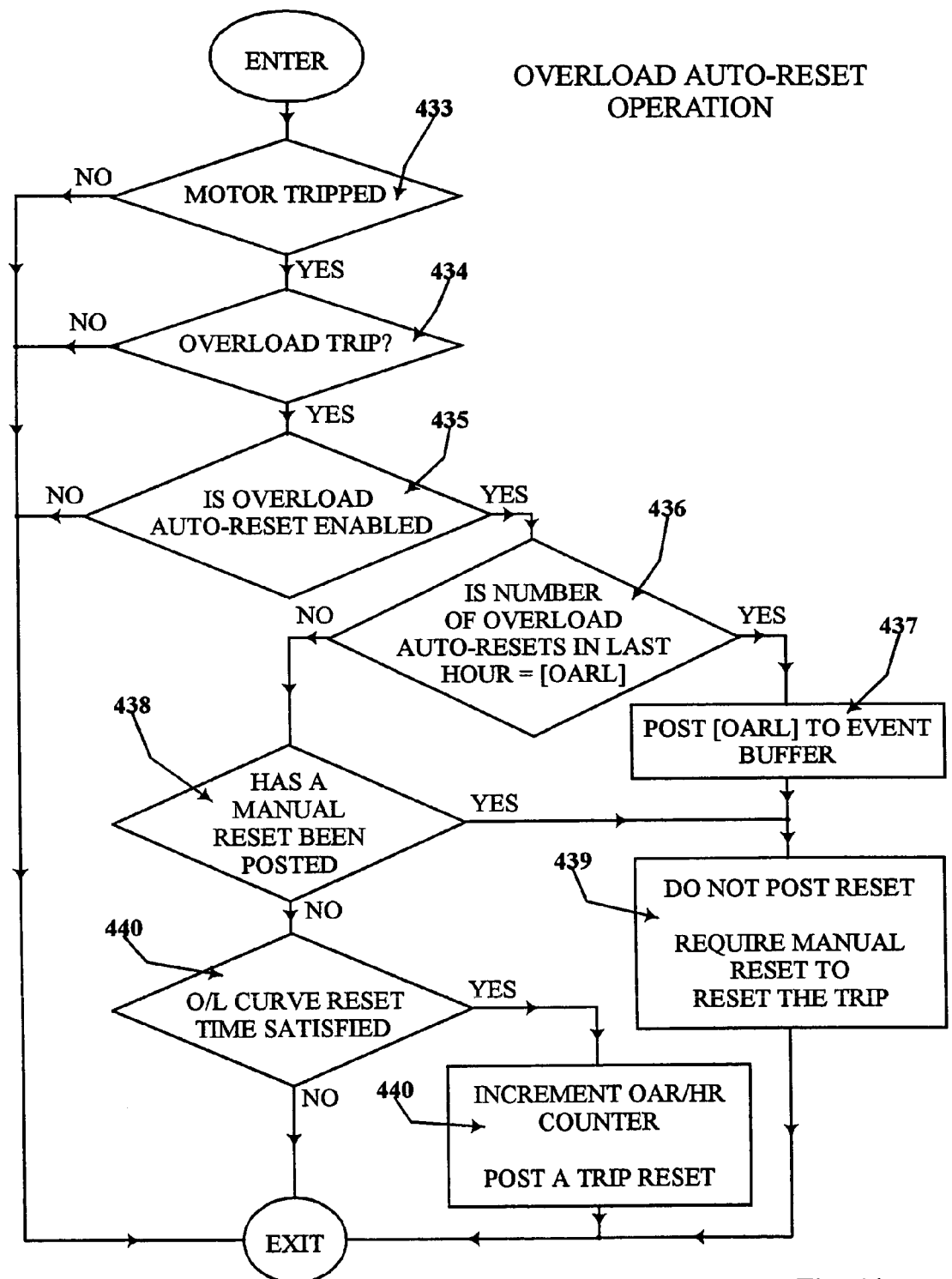
FIG. 44 is a flowchart detailing the overload auto-reset operation functions provided by the overload protector in accordance with the present invention.

Referring particularly to FIG. 44, Overload Auto-Reset Operation, test to see if the motor is tripped (433). If the motor is tripped (433), then test to see if there is an overload trip (434). If there is an overload trip (434), then test to see if the overload auto-reset is enabled (435). If the overload auto-reset is enabled (435), the test to see if the number of overload auto-resets in the last hour is equal to than the overload auto-reset limit setting [OARL] (436). If the number of overload auto-resets in the last hour does not equal the overload auto-reset limit setting [OARL] (436), then test to see if a manual reset has been posted (438). If a manual reset has not been posted (438), then test to see if the overload (O/L) curve reset time has been satisfied (440). If the overload (O/L) curve reset time has not been satisfied (440), then exit. If the number of overload auto-resets in the last hour does equal the overload auto-reset limit setting [OARL] (436), then post [OARL] to the event buffer (437), do not post a reset, and require a manual reset to reset the trip (439). If a manual reset has been posted (438), then do not post a reset, and require a manual reset to reset the trip (439). If the overload (O/L) curve reset time has been satisfied (440), then increment the overload auto-reset counter [OAR/HR] and post a trip reset (441).

If the motor is not tripped (433), or if the motor is tripped (433) and the trip is not an overload trip (434), then exit. However, if the motor is tripped (433), the trip is an overload trip (434), and then if the overload auto-reset is not enabled (435), then exit.

Figure 45:
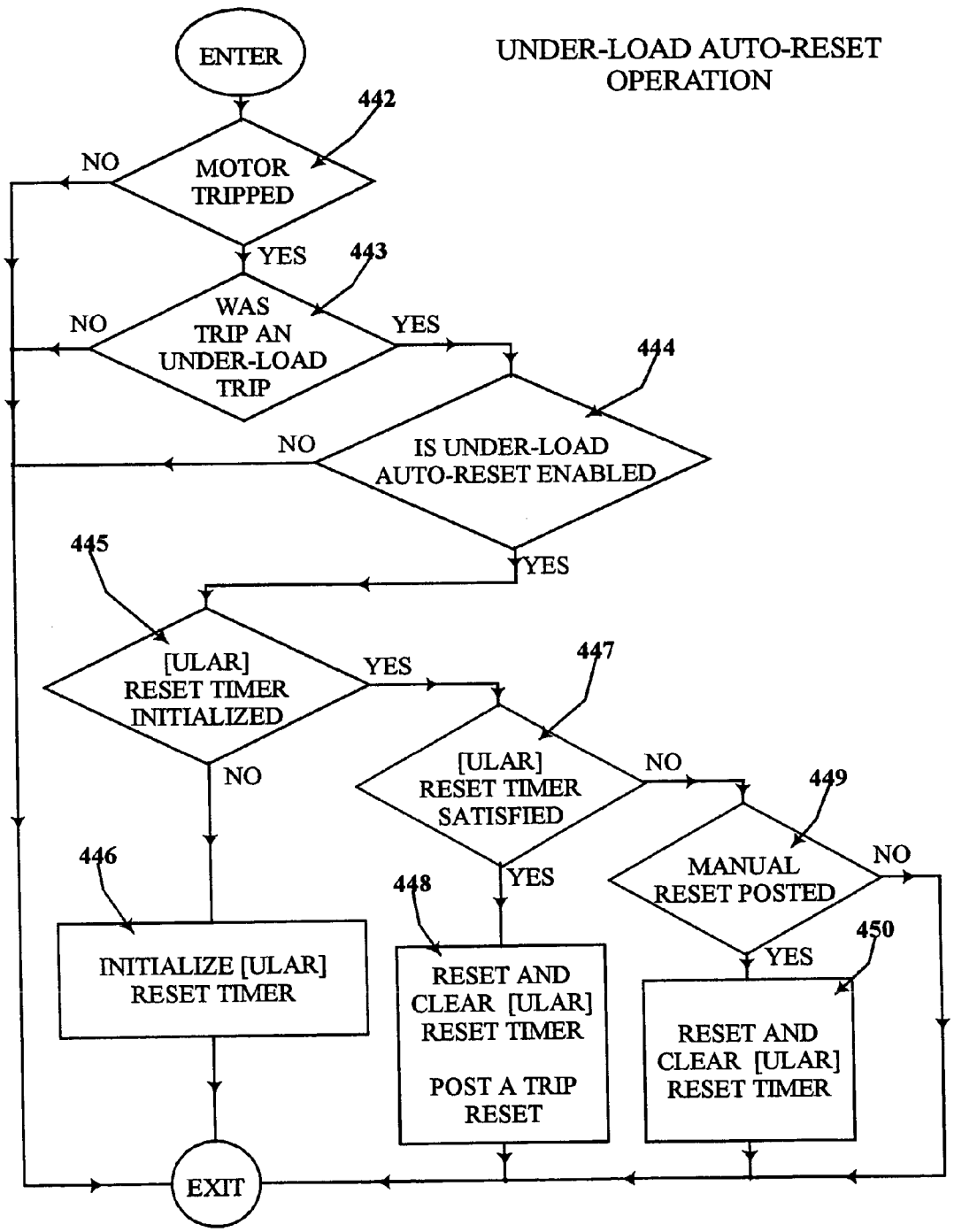
FIG. 45 is a flowchart detailing the under-load auto-reset operation functions provided by the overload protector in accordance with the present invention.

Referring particularly to FIG. 45, Under-Load Auto-Reset Operation, test to see if the motor is tripped (442). If the motor is tripped (442), test to see if was an under-load trip (443). If it was an under-load trip (443),then test to see if the under load auto-reset function is enabled (444). If the under load auto-reset function is enabled (444), then test to see if the [ULAR] reset timer is initialized (445). If the [ULAR] reset timer is not initialized, then initialize the [ULAR] reset timer (446). If the [ULAR] reset timer is initialized (445), then test to see if the [ULAR] reset timer is satisfied (447). If the [ULAR] reset timer is satisfied (447), then reset and clear the [ULAR] reset timer and post a trip reset (448). If the [ULAR] reset timer is not satisfied (447), then test to see if a manual reset is posted (449). If manual reset is not posted, then exit. If a manual reset is posted (449), then reset and clear the [ULAR] reset timer (450).

If the motor is not tripped (442), or if motor was tripped (442) and the trip was not an under-load trip (443), then exit. If the motor was tripped (442), and the trip was an under-load trip (443), then if the under load auto-reset function is not enabled (444), then exit.

Figure 46:
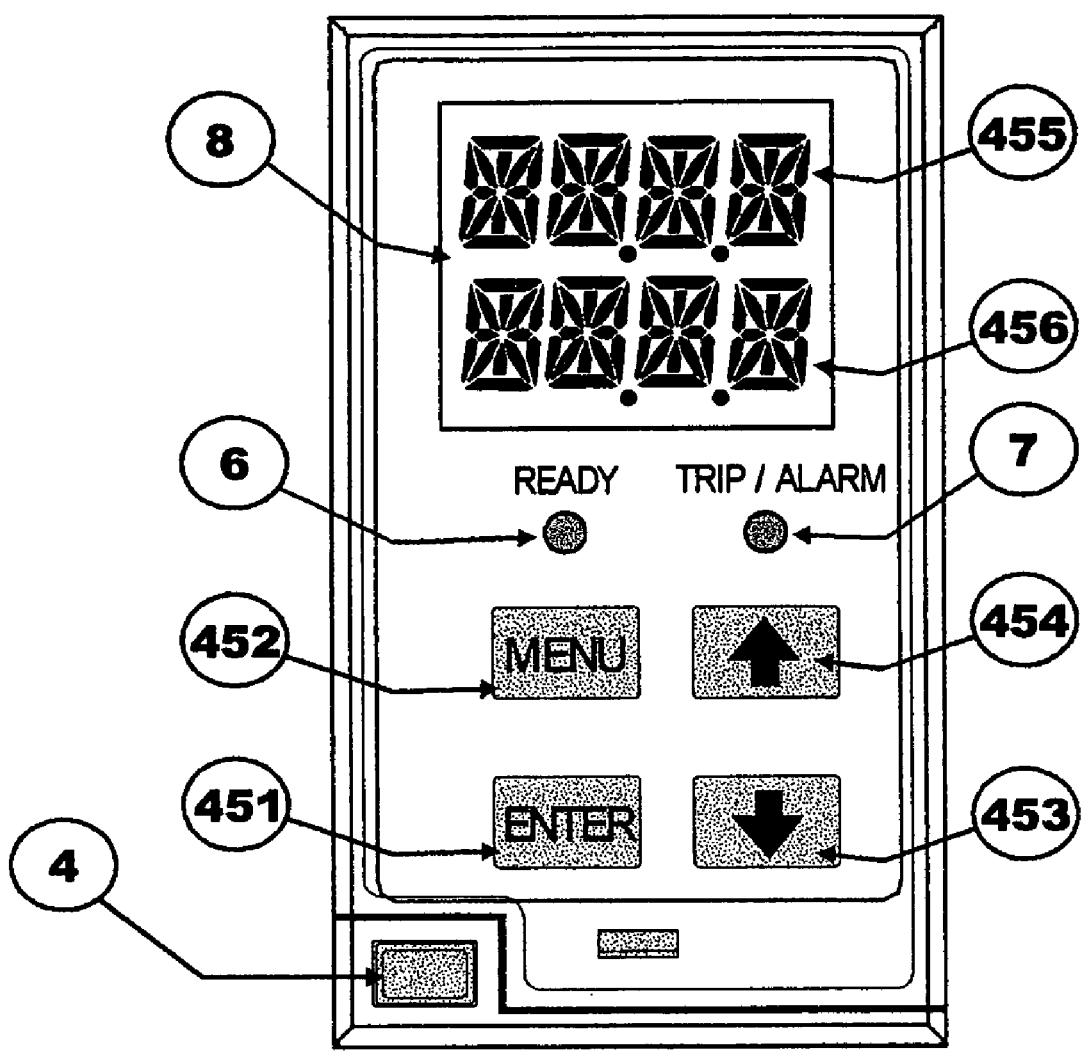
FIG. 46 is a diagram showing the removable user interface panel on the overload protector in accordance with the present invention.

Referring particularly to FIG. 46, Remote Mountable User Interface, the MOR has an eight character LCD Display (8), consisting of two lines of four alphanumeric characters, which is used to display the parameters and their settings, and four buttons, which are used to navigate through the menu and settings screens. The menu button (452), is used to navigate through the menu groups (458) (as shown in FIG. 47). The up arrow (454) and down arrow (453) are used to enter the menu groups or change settings. The enter button (451), is used to initiate a setting change and save those changes. The reset button (4) is used for manually resetting a trip.

Figure 47A:
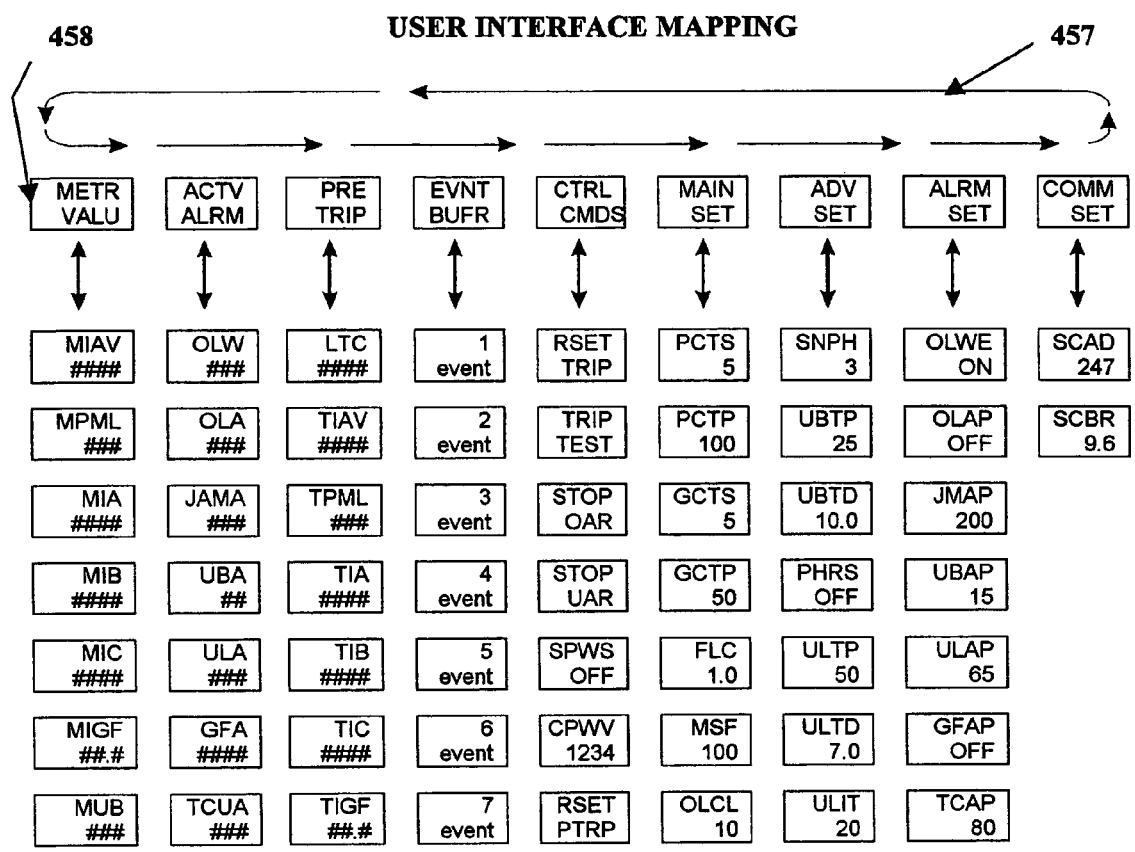
FIGS. 47A and B are a diagram detailing the user interface mapping process and functionality on the overload protector in accordance with the present invention.
Figure 48:
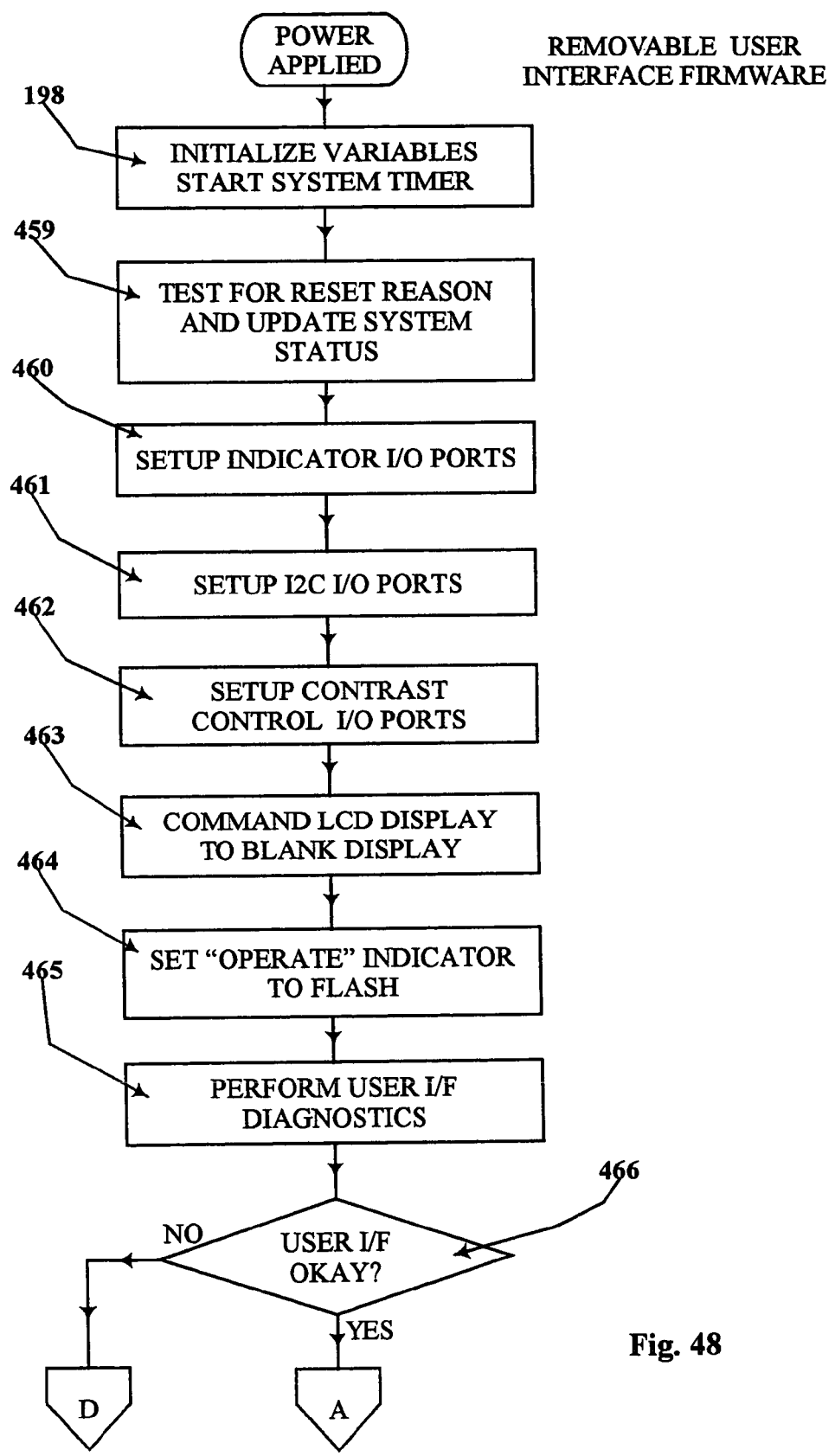
FIGS. 48 through 51 are flowcharts detailing the operation and functions of the removable user interface software of the overload protector in accordance with the present invention.
Figure 49:
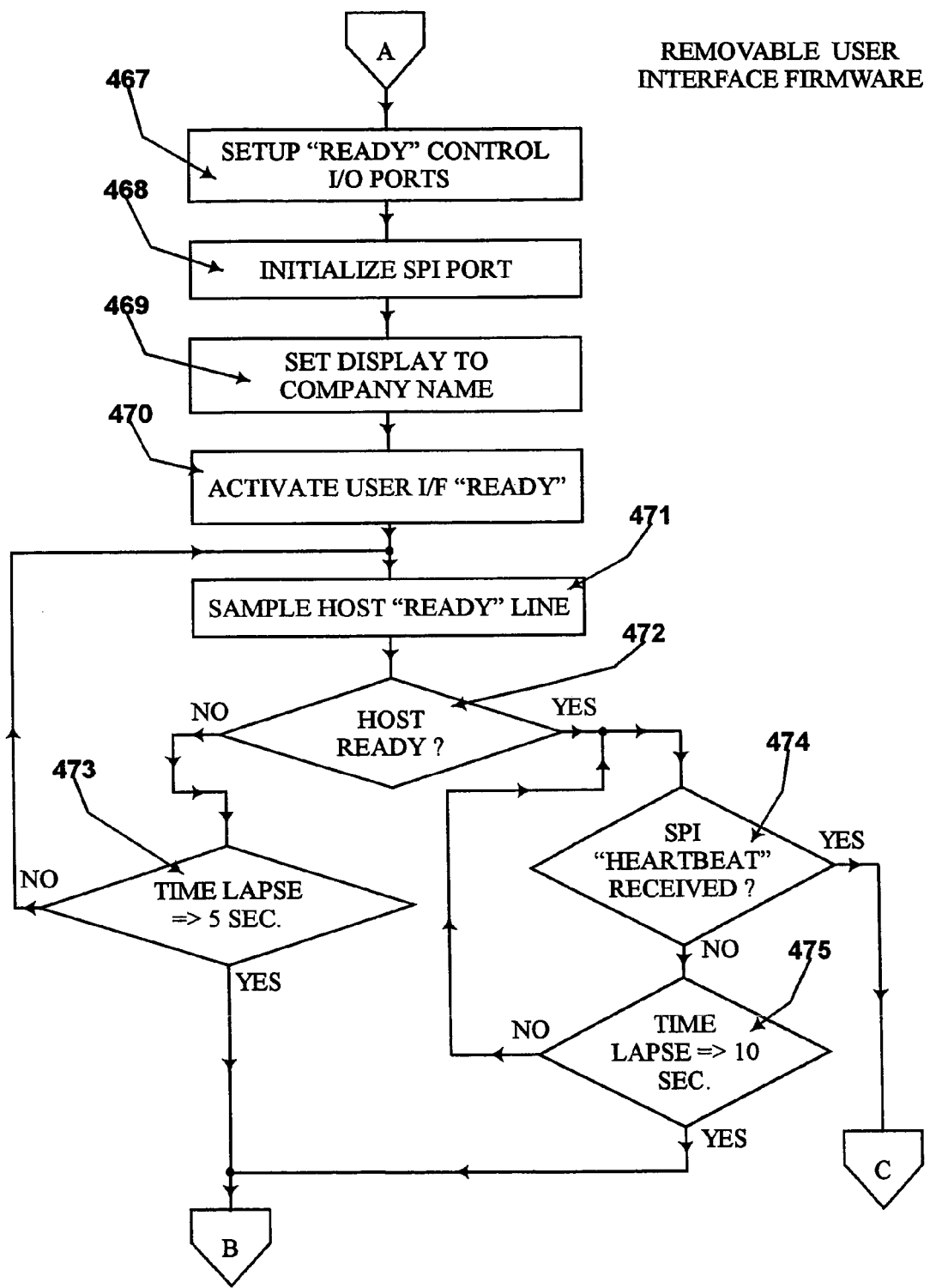
Figure 50:
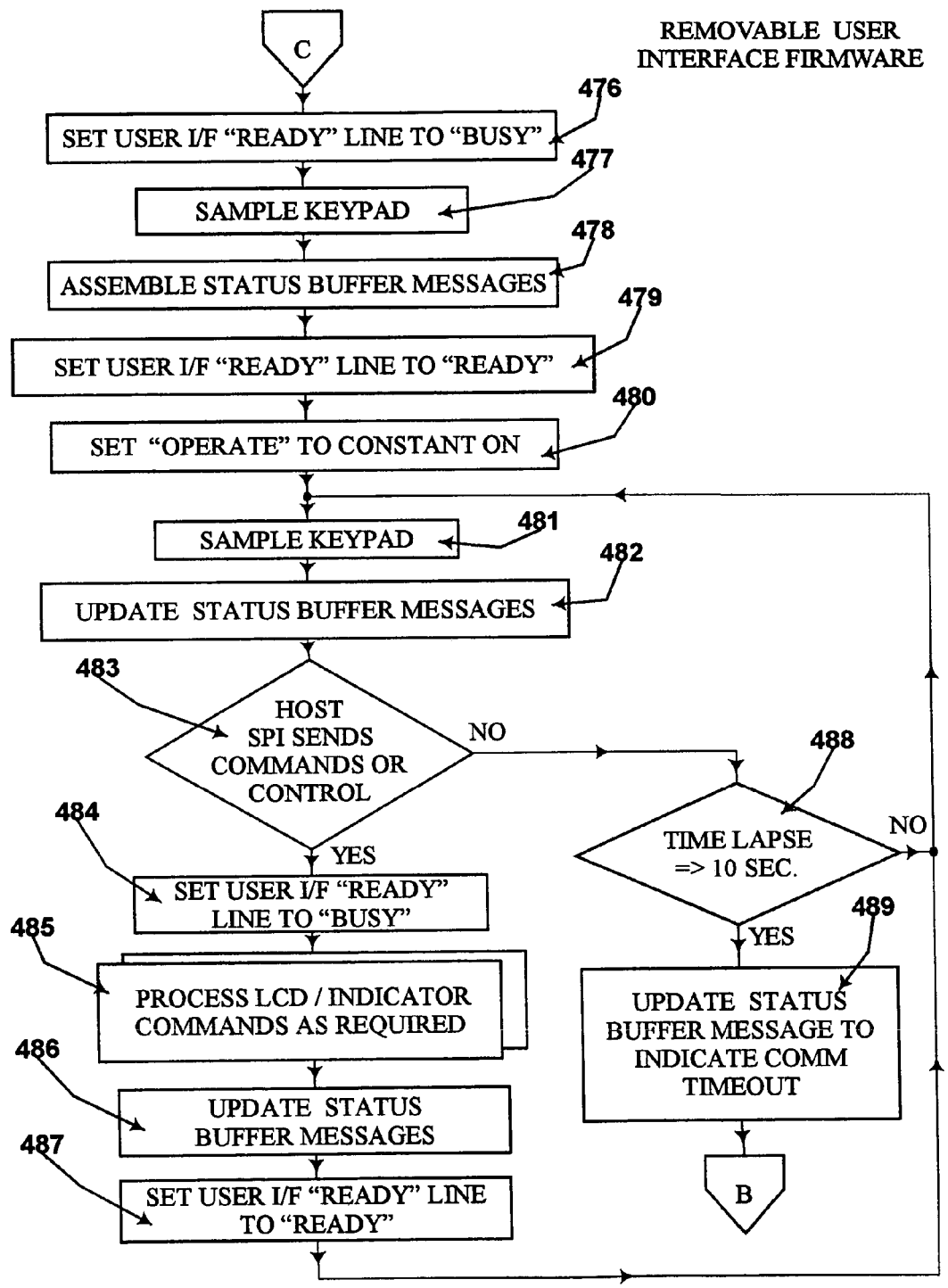
Figure 51:
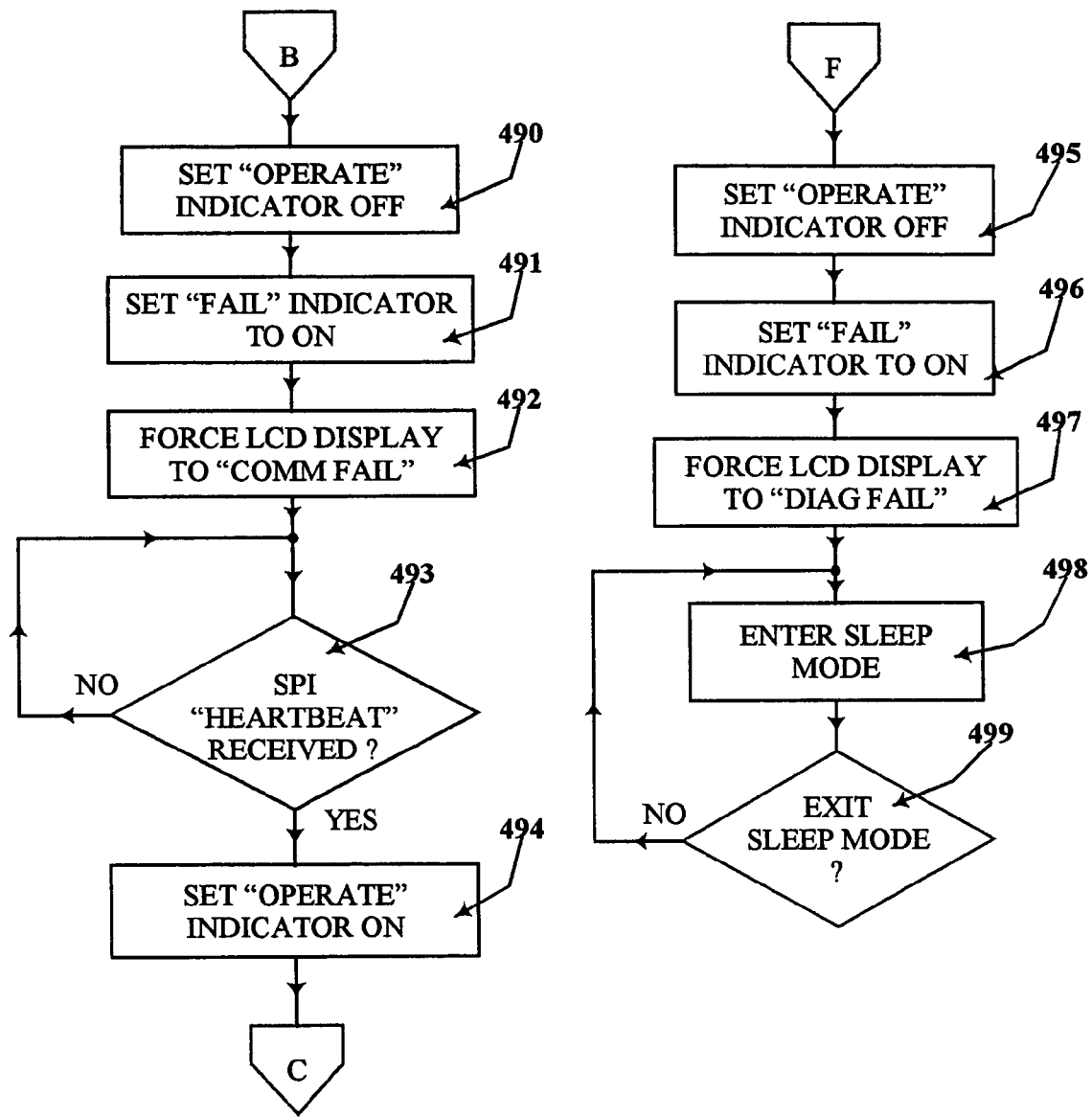

Referring particularly to FIG. 47A and 47B, User Interface Mapping, the menu button (452)(as shown in FIG. 46) is used to scroll through the menu groups (458). The menu groups is a continuous loop (457), therefore, once "COMM SET" is displayed, the next push of the menu button (452) will result in "METR VALU" being displayed. Once the proper menu group (458) is displayed on the LCD (8)(as shown in FIG. 46), press the down arrow (453)(as shown in FIG. 46) to display the settings and their values for that group. Once the last setting in the list is reached, the up arrow (454)(as shown in FIG. 46) can be used to scroll back to the menu groups (458), or press the menu button (452)(as shown in FIG. 46) to jump to "METR VALU" in the menu group (458).

Referring particularly to Tables U-1 through U-10, these tables provide the acronyms used in the menu and settings screens and an explanation for each. Table U-1, Menu Screens, defines the menu group (458)(as shown in FIGS. 47A and 47B) acronyms. Table U-2, Metering Screens, lists the acronym and the definition of each metered value and special function timers for the "METR VALU" group. This value for this group is updated on the display, once per second. Table U-3, Potential Active Alarms, contains the list of all possible alarms for the "ACTV ALRM" group. When there are no alarms active, "NO ALRM" will be displayed for this menu group. Table U-4, Pre-Trip Data, lists the data available after a trip has occurred for the "PRE TRIP" group. If a trip has not occurred, "NO TRIP" will be displayed for this menu group. The event buffer is in the "EVNT BUFR" group and is a FIFO buffer of the last 12 events. Table U-5, Trip, Alarm, and Event Acronyms, lists the acronyms used in both the event buffer and the cause of trip contained in the pre-trip data. Table U-6, Control Commands, allow the operator to perform special functions that are usually reserved for communications only. These functions can be performed in the "CTRL CMDS" group. Table U-7, Main Settings, define the settings that can be found in the "MAIN SET" group. Likewise, Table U-8, ADV Settings, define the settings that can be found in the "ADV SET" group. Table U-9, Alarm Settings, defines the settings that can be set in the "ALRM SET" group. These settings allow the MOR to provide an early warning before a trip occurs. Table U-10, Communications Settings, allow the RS-485 half duplex communication port to be configured in the "COMM SET" group.

To edit a setting, use the Menu button (452)(as shown in FIG. 46) and the arrows (454 and 453)(as shown in FIG. 46) to scroll to the desired setting. Press the enter button (451)(as shown in FIG. 46) to place the MOR in edit mode. The value will flash to indicate that the setting is being edited. While in edit mode, the up arrow (454)(as shown in FIG. 46) will increment the value and the down arrow (453)(as shown in FIG. 46) will decrement the value. Once the desired value is obtained, press the enter button (451)(as shown in FIG. 46) to store the new setting. The displayed value will then stop flashing. If the user decides to abort his change while in edit mode, pressing the menu button (452) (as shown in FIG. 46) will revert the unit back to the original setting and the value will stop flashing. A user cannot edit an Alarm, Event, Pre-trip or Monitored setting.

TABLE U-1

Menu Screens

| Menu Screens | Menu Selection | Contents Under Menu Heading |
|---|---|---|
| METR VALU | Metered Values | Measured and Calculated Values, see Table U2 |
| ACTV ALRM | Active Alarms | Contains all currently active alarms, see table U-3 |
| PRE TRIP | Pre-Trip Data | Metered data at time of trip, see table U-4 |
| EVNT BUFR | Event Buffer | The event buffer contains the last twelve most recent events in FIFO buffer. |
| CTRL CMDS | Control Commands | Command and control functions see table U-6 |
| MAIN SET | Main Settings | Main protection settings, see table U-7 |
| ADV SET | Advanced Settings | Advanced Protection Settings, see table U-8 |
| ALRM SET | Alarm Settings | Alarm settings, se table U-9 |
| COMM SET | Communications Settings | Communications settings, see table U-10 |

TABLE U2

Metering Screens

| Parameter Acronym | Description | Units | Range |
|---|---|---|---|
| MIAV | Average Phase Current (Default Screen) | Amps | 0–9999* |
| MMLP | Motor Load in percent of full load amps | % | 0–999 |
| MIA | Phase A Current | Amps | 0–9999* |
| MIB | Phase B Current | Amps | 0–9999* |
| MIC | Phase C Current | Amps | 0–9999* |
| MIGF | Ground Fault Current | Amps | 0–2500* |
| MUB | Percent of Unbalance (U/B) | % | 0–100 |
| MTCU | Thermal Capacity Used | % | 0–100 |
| MLAT | Motor's Last Acceleration Time | Seconds | 0.0–999.9 |
| TOLT | Over load Time to Trip | Seconds | 0–9999 |
| TOLR | Over load Time to Reset | Seconds | 0–9999 |
| TTSI | Time Left in Thermal Start Inhibit | Seconds | 0–9999 |
| TS/H | Remaining Starts/hour inhibit time | Minutes | 0–60 |
| TRSD | Remaining Re-start Delay Time (anti-cycle timer) | Seconds | 0–9999 |
| TUAR | Time Left to Under Current Auto-reset | Minutes | 0–999 |

TABLE U3

Potential Active Alarms

| Alarm Code | Value Displayed | Description |
|---|---|---|
| OLW | MaxMLP | Overload warning alarm to indicate that the MOR is in overload. Note: Overload warning is never posted to the event buffer. |
| OLA | MaxMLP | Overload alarm indicates when the average load has exceeded the (OLAP) overload alarm pickup setting. |
| JAMA | MaxMLP | The Jam alarm indicates that the highest phase load has exceeded the jam alarm pickup setting (JMAP). |
| UBA | MUB | The Unbalance alarm indicates that the phase unbalance has exceeded the unbalance alarm pickup setting [UBAP]. |
| ULA | MPML | The Under-load alarm indicates that the average motor load [MPML] has dropped below the under-load alarm pickup setting. |

TABLE U3-continued

Potential Active Alarms

| Alarm Code | Value Displayed | Description |
|---|---|---|
| GFA | MIGF | The Ground Fault alarm indicates that the ground current has exceeded the ground fault alarm pickup setting [GFAP]. |
| TCUA | MTCU | The Thermal Capacity Used alarm indicates that the Thermal capacity used has exceeded the thermal capacity alarm pickup setting [TCAP]. |
| OLAR LOCK | | Indicates that the Overload Auto-reset Limit has been reached and the motor is locked out requiring a manual reset to clear. |
| HDWR FAIL | | Hardware Failure is set by the Pick on the Keypad when the DSP shuts down |
| COMM FAIL | | Communications Failure |
| DIAG FAIL | | Internal DSP Diagnostic Failure |
| LOCK OUT | | The motor has been locked out by SCADA |
| NO ALRM | | No Active Alarms |

TABLE U-4

Pre-trip Data

| Parameter Acronym | Description | Units | Range |
|---|---|---|---|
| LTC | Last Trip Code acronym | — | Table U-5 |
| TIAV | Average Phase Current at last Trip | Amps | 0–9999 |
| TPML | The value displayed here is either MPML or MaxMLP depending on the type of trip. | % FLA | 0–9999 |
| TIA | Phase A Current at last Fault | Amps | 0–9999 |
| TIB | Phase B Current at last Fault | Amps | 0–9999 |
| TIC | Phase C Current at last Fault | Amps | 0–9999 |
| TIGF | Ground Fault Current at last Trip | Amps | 0–9999 |
| TUB | Percent of Unbalance | % U/B | 0–100% |
| TMAT | Start Acceleration Time | Secs | 0.0–999.9 |

TABLE U-5

Trip, Alarm, and Event Acronyms

| Parameter Acronym | Description |
|---|---|
| ULA | Under-load Alarm - The Current dropped below the Under-load Pickup Setting for the specified Delay Time |
| ULT | Under-load Trip - The Current dropped below the Under-load Pickup Setting for the specified Delay Time |
| ULTR | Under-load trip reset - indicates that a under-load auto-reset has occurred |
| OVLA | Overload Alarm - The Current exceeded a preset overload level |
| OVLT | Overload Trip - The Inverse Time Over Current Curve dictated a Trip |
| OLTR | Overload trip reset - indicates that a overload auto-reset has occurred |
| UBA | Unbalance Alarm - The Unbalance Alarm Pickup Setting was exceeded. |
| UBT | Unbalance Trip - The Unbalance Trip Pickup Setting was exceeded for the specified Delay Time. |
| PHLT | Phase Loss Trip - A Phase unbalance > 60% was present for the specified Delay Time |
| PHRT | Phase Reversal Trip - Phase Current Sequence violated expected Sequence when motor was started |
| JAMA | Jam - The Mechanical Jam Alarm Pickup Setting was exceeded |

TABLE U-5-continued

Trip, Alarm, and Event Acronyms

| Parameter Acronym | Description |
|---|---|
| JAMT | Jam - The Mechanical Jam Pickup Setting was exceeded for the specified Time Delay |
| MATT | Motor Acceleration Time Trip - Start acceleration time exceeded set limit |
| GFA | Ground Fault Alarm - The Ground Fault Current exceeded the Pickup Setting. |
| GFT | Ground Fault Trip - The Ground Fault Current exceeded the Pickup Setting for the programmed delay time. |
| CMDT | Commanded Trip - A Command via remote communications ordered the device to Trip. |
| TEST | Test Trip - User selected TEST function from keypad |
| LOCK | SCADA Lockout - Forces output relay open until lockout is released. |
| DIAG | Critical Internal diagnostic fault |

TABLE U-6

Control Commands

| Parameter Acronym | Password Required | Description |
|---|---|---|
| RSET TRIP | No | Provides the ability to reset a trip from the front keypad independent of the reset button. |
| TRIP TEST | No | When this button is pressed the MOR will immediately trip and post the trip test message to the pre-trip and event buffer. |
| STOP OAR | No | Stop Overload Auto-Reset in Process - This will stop the overload auto-reset function already in process. When this command is given either via the keypad or via communications the MOR will go onto standard trip and require a manual reset to clear the trip. |
| STOP UAR | No | Stop Under-load Auto-Reset in Process - This will stop the under-load auto-reset function already in process. When this command is given either via the keypad or via communications the MOR will go onto standard trip and require a manual reset to clear the trip. |
| SPWS OFF | Yes | Set Password Access - This enables and disables the password lock to allow settings to be changed. |
| CPWV 9999 | Yes | Change Password Value - The normal value displayed in the second line is the encrypted password. |
| RSET PTRP | Yes | Reset Pre-trip data - This will clear the pre-trip data. |
| RSET ELOG | Yes | Reset Event Log - This will clear the Event Log. |
| RSET TCU | Yes | Reset Thermal Capacity Used - This will clear the thermal capacity register to 0%. |
| CONTRAST | No | Is used to adjust the display contrast. |

TABLE U7

Main Settings

| Parameter Acronym | Description | Units | Range |
|---|---|---|---|
| PCTS | Phase Current Transformer Secondary Current | Amps | 1 or 5 |
| PCTP | Phase Current Transformer Primary Current | Amps | 1–1000 |
| GCTS | Ground Fault Current Transformer Secondary Current | Amps | 1 or 5 |

TABLE U7-continued

Main Settings

| Parameter Acronym | Description | Units | Range |
|---|---|---|---|
| GCTP | Ground Fault Current Transformer Primary Current | Amps | 1–500 |
| FLC | Full Load Current - (motors nameplate current) | % | 1.0–1200 |
| MSF | Motor Service Factor | % | 100–175% |
| OLCL | Overload Class - or motor stall time in seconds | sec | 5–30 |
| MAT | Motor Acceleration Time | sec | 4–240 |
| PHLD | Phase Loss Delay Time or OFF - (Phase Loss Trip) | sec | Off, 1–25 |
| JMTP | Jam Trip Pickup Setting | % | 90–600% or OFF |
| JMTD | Jam Trip Time Delay Setting | sec | 1.0–25.0 |
| GFTP | Ground Fault Trip pickup setting | Amps | 0.5–400.0 or Off |
| GFTD | Ground Fault Trip Delay Time | sec | 0.1–25.0 |
| GFIT | Ground Fault Inhibit Time | sec | 0–600 |
| LS/H | Limit Starts per Hour - limits the motor to "x" number of starts per hour. | — | Off, 1–12 |

TABLE U8

Advanced Settings

| Parameter Acronym | Description | Units | Range |
|---|---|---|---|
| SNPH | Single Phase or Three Phase | — | 3 or 1 |
| UBTP | Unbalance Trip Pickup Setting | % | 1–40 or Off |
| UBTD | Unbalance Trip Time Delay | sec | 1–60 |
| PHRS | Phase Reversal Setting - sets the direction of phase rotation. | — | Off, 123 or 132 |
| ULTP | Under-load Trip Point - sets the under-load drop out point | % | Off, 40–90 |
| ULTD | Under-load Trip Time Delay Setting | sec | 1–60 |
| ULIT | Under-load Inhibit Trip | sec | 1–240 |
| ULAR | Under-load Auto-reset Time | Min | Off, 1–999 |
| OARE | Over-load Auto-reset Enable | — | Off, On |
| OARL | Over-load Auto-reset Limit - limits the number of times that an auto-reset can occur before locking out the motor | — | Off, 1–4 |
| RSTD | Restart Time Delay - (anti-cycle timer) Start Inhibit | sec | Off, 1–9999 |
| TSIS | Thermal Start Inhibit Setting | % | 10–90 |
| STI | Stall Current - Lock Rotor current | % | 450–900 |
| TDOP | Thermal Design Operating Point | % | 25–75 |
| SCT | Stopped Cool Time | min | 10–250 |

TABLE U9

Alarm Settings

| Parameter Acronym | Description | Units | Range |
|---|---|---|---|
| OLWE | Overload Warning Enable - indicates when the motor is in overload | — | Off or On |
| OLAP | Overload Alarm Pickup Setting | % | 0–450 or Off |
| JMAP | Jam Alarm Pickup Setting | sec | 150–450 or Off |
| UBAP | Unbalance Alarm Pickup Setting | sec | 1–40 or Off |
| ULAP | Under-load Alarm Pickup Setting | sec | 35–90 or Off |
| GFAP | Ground Fault Alarm Pickup Setting | sec | 0.5–400 or Off |
| TCAP | Thermal Capacity Alarm Pickup Setting | sec | 30–99 or Off |

TABLE U10

Communications Settings

| Parameter Acronym | Description | Range |
|---|---|---|
| SCAD | SCADA Address - Modbus ™ Device Address | 1–247 |
| SCBR | Communications Baud Rate | 2400, 4800, 9600, 19,200, 38,400 |

FIGS. 48 through 51 illustrate the functional flow of the firmware for the removable user interface of a digital programmable motor overload relay, in accordance with the present invention. The removable user interface provides local user interaction with the protection software of the digital programmable motor overload relay located in the base module. The firmware in the removable user interface manages the interface attributes; the keypad, liquid crystal display and direct status indicators. Control over the state that these attributes are in is rendered to the base module, of the overload relay and the software therein, whenever the communications between the removable user interface and the base module is active and reliable.

When power is applied to the removable user interface, the micro-controller inside allows a short period of time to allow conditions to stabilize before turning operational control over to the embedded software in the micro-controller. As soon as the micro-controller is allowed to execute its software, it will place all necessary system variables into a known state, and initialize the start of the software system timer (458).

Internal micro-controller circuits store the sequence of events that cause a full software reset. The possible reset causes are a general power on reset, a brown out reset, and a watchdog timeout reset. A normal power on reset implies that the entire relay and all of its components have simultaneously had power applied to them, and each part of the system is at a known and controlled state. Brown out and watchdog timeout resets imply a possible event that has left the removable user interface in a condition that the base module did not experience and therefore cannot know the exact state of the removable user interface. The removable user interface software tests for the reset cause and posts the result of this test to a status word buffer which is available to the base module once communications is established (459).

When power is applied, all general purpose digital input/output lines on the micro-controller are configured as inputs. This keeps circuits connected to these lines from inadvertently activating until needed. Each digital input/output line that is used under software control for a specific purpose must then be configured to its specific use. On the removable user interface, these general purpose digital input output/lines control the drive circuits of the indicators (460), create an industry standard I²C communications port (461), and drive the circuits controlling the contrast of the liquid crystal display (462).

Once the digital input output lines have been configured, the control of the liquid crystal display is established over the I²C communications port. On power-up, the memory in the controller of the liquid crystal display will be in an unknown state and can possibly cause the display of a garbled message. The removable user interface firmware commands the display to a known "clear of characters" state (463).

With the completion of all housekeeping tasks, the digital input output lines drive the "operate" indicator to intermittently flash to indicate the firmware is in diagnostic mode (464). In this mode, tests are conducted on the removable user interface circuits to determine their ability to perform their intended function (465). Should the removable user interface determine it's incapable of full functionality (466), an attempt will be made to turn the "operate" indicator off (495), turn the "fail" indicator on (496), force the liquid crystal display to "DIAG FAIL" (497), and then enter a software "SLEEP" state until the unit is reset by the removal and re-application of power (498) (499).

Once all diagnostics have successfully completed, the firmware configures the digital/input output lines implementing the "READY" lines (467), but leave them in their inactive state. The "READY" lines are discrete lines between the base module and the removable user interface which indicate to the processor, in each unit, the availability or readiness of the other processor.

The firmware then initializes the embedded Serial Peripheral Interface (SPI) to enable the port through which all communications to the base module is accomplished (468). Optionally, at this point, the removable user interface will exercise local control over the liquid crystal display and cause the company's name to be displayed (469).

With all housekeeping functions and diagnostics complete, the firmware forces the removable user interface's "READY" line to the active or "READY" state (470). This will signal to the base module the removable user interfaces' availability to communicate. The firmware then tests for a "READY" condition from the base module (471) (472).

If the base module does not set its "READY" active within a set period of time (473), the removable user interface will attempt to determine if the failure is catastrophic or marginal. The firmware will set the "OPERATE" indicator to off (490) and set the "FAIL" indicator to on (491) and locally direct the display to "COMM FAIL" (492). The firmware will then repeatedly monitor the SPI interface lines for a proper operation. If a communication packet arrives (493), the failure is marginal and the firmware will set the "OPERATE" indicator to on (494). Normal functioning of the removable user interface occurs without the use of the base modules "READY", as long as functional SPI communications are maintained.

Once the removable user interface determines that the base module is "READY", the firmware will monitor for the arrival of a "HEARTBEAT" message over the SPI interface (474). Should the "HEARTBEAT" not occur within a reasonable time (475), the removable user interface will attempt to determine if the failure is catastrophic or marginal as it would if the "READY" signal never arrived (490) (491) (492) (493) (494). If the "HEARTBEAT" never arrives, a catastrophic failure is active and the removable user interface will maintain the SPI interface for a possible recovery while the indicators and display alert of the existing failure condition.

If both the "READY" and the "HEARTBEAT" communication packet are received, the firmware will start to process the "HEARTBEAT" response by setting its "READY" line to the inactive or "BUSY" state (476). In the "BUSY" state, the debounced keypad buffer contents are sampled and loaded to the appropriate byte in the status word buffer(477). The balance of the status elements are assembled into the status word buffer (478) and placed into the SPI out bound buffer. To signal to the base module that the response from the removable user interface is available, its "READY" line will be returned to the active or "READY" state (479). At this point, all operational parameters have been met and the removable user interface updates its pending status (flashing "OPERATE" indicator) to fully operational and lights the operate indicator continuously (480). From this point forward, all attributes of the removable user interface are commanded by the base module, as long as the communications link is active.

The firmware enters into a continuous operating loop that performs the following sequence of events: The debounced keypad buffer contents is sampled and loaded to the appropriate byte in the status word buffer(481). Status word contents is updated relative to detectable events (482). Upon receipt of the necessary SPI timing and control signals from the base module, the status word buffer is sent to the base module while a communications packet is received (483).

Communication packets can be a command sequence for a message to be displayed upon the liquid crystal display, LCD contrast setting, the state of each indicator, or a control sequence to retrieve the status word buffer contents. In any case once the message is received, the removable user interface will drop its "READY" ("BUSY" state) (484) and process the message. This includes CRC checking for message reliability, performing the directed display actions (485), and finally updating the status buffer (486). To signal the base module that the removable user interface is available, its "READY" line is returned to the active or "READY" state (487). From this point, the operation returns to the top of the loop previously mentioned (480).

The time between communication packet arrivals is detected (488). If an unreasonable time has lapsed, the status word in the buffer is updated to include a timeout error notification (489). This communications failure causes the firmware to determine if the error is catastrophic or marginal (490) (491) (492) (493) (494). If a communication packet never arrives, a catastrophic failure is active, and the removable user interface maintains the SPI interface for a possible recovery while the indicators and display alert of the existing failure condition.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A miniaturized modular programmable motor overload protector for low voltage and three phase AC induction motors comprising:
    a combination of coupled modular components including:
        a base housing portion having means for modularly coupling and mounting said base housing portion to a supporting substrate;
        a Switch Mode Power Supply (SMPS) circuit portion integrated in the base portion housing;
        a Control Power (CP) input terminal portion integrated with the SMPS circuit portion;
        a Current Transformer (CT) circuit portion integrated in a CT housing portion in electrical interface with the SMPS circuit portion and the CT housing portion being modularly coupled with base housing portion;
        a phase current feed input terminal portion integrated with the CT circuit portion;
        a Signal Processor (SP) portion integrated in a SP housing portion, which is modularly coupled with the CT housing portion; and
        a removable user interface circuit assembly including a cover and base to house the user interface circuit assembly, the cover and base being modularly coupled to form the housing, and the base being modularly coupled with the SP housing,
    wherein a footprint of the combination of coupled modular components comprising said miniaturized programmable motor overload protector has mechanical dimensions of no greater than about 2.2 inches by 5.2 inches and wherein a total height of said miniaturized programmable motor overload protector is no greater than about 4.8 inches.

2. The miniaturized modular programmable motor overload protector according to the claim 1, wherein the components are modularly coupled with spaced-apart locking tabs in each component snapping into and interlocking with mating corresponding apertures in the mating component.

3. The miniaturized modular programmable motor overload protector according to claim 1, wherein the base housing portion is coupled to its supporting substrate with one of direct fastening and din rail mounting means.

4. The miniaturized modular programmable motor overload protector according to claim 1, further comprising:
    a remote user interface circuit assembly having an interface end to be modularly coupled with the SP housing when the removable user interface assembly is removed, a remote user portion and a user interface circuit umbilical cable of predetermined length connecting said remote user portion and said interface end coupled with the SP housing.

5. The miniaturized modular programmable motor overload protector according to claim 4, further comprising:
    means for aligning and fitting to an electrical interface portion of one of the remote user interface assembly and the removable user interface assembly.

6. The miniaturized modular programmable motor overload protector according to claim 1, wherein the CT circuit portion includes current transformers as sensors for each of the three phases of motor currents and one ground fault current.

7. The miniaturized modular programmable motor overload protector according to claim 1, wherein the Signal Processor circuit portion is a Digital Signal Processor (DSP) circuit portion.

8. A miniaturized programmable motor overload protector comprising, in combination:
    means for sensing electrical power applied to a motor;
    means for filtering noise from inputted signals;
    signal processing means;
    programming means for inputting, monitoring, diagnosing, and recording operating information related to motor configuration data;
    memory means for storing real-time information related to events associated with the motor being protected;
    display means;
    means for interrupting said electrical power applied to a motor;
    power supply means for providing regulated output voltages;
    reset actuator means for resetting the miniaturized programmable motor overload protector after a trip has occurred; and
    means for maintaining operation during electrical power disruptions, wherein the signal processing means includes:
  phase orientation restoration means for restoring phase orientation relative to each other phase to allow for the determination of motor phase loss, phase unbalance and phase reversal,
  wherein an embedded capture circuit is used to restore phase polarity and temporal orientation to the other measured phases to a digital image of the measured signal to allow for the detection of motor phase loss, phase unbalance and phase reversal,
  an absolute value processing means of a bipolar input signal for allowing for double resolution of the bipolar input signal, and
  wherein an embedded monotonic analog to digital converter in conjunction with each absolute value circuit allow for said double resolution of the bipolar input signal.

9. The miniaturized programmable motor overload protector according to claim 8, further comprising:
  phase detect circuit means for capturing real time polarity, positive or negative, of an incoming signal corrected by the absolute value circuit and for providing said real time polarity in a digital form to a DSP to reconstitute the digitized image of the measured signals.

10. The miniaturized programmable motor overload protector according to claim 8, wherein the embedded monotonic analog to digital converter is integral to a DSP circuit portion.

11. The miniaturized programmable motor overload protector according to claim 10, wherein the DSP circuit portion further comprises:
  a Serial Peripheral Interface (SPI) for supporting local circuit communications;
  a Universal Asynchronous Receiver Transmitter (UART) for supporting external communications; and
  means for controlling an amplification setting of Instrumentation Amplifiers and a position of contacts on a Trip Relay.

12. The miniaturized programmable motor overload protector according to claim 11, wherein the means for controlling the amplification setting of the Instrumentation Amplifiers and the position of contacts on the Trip Relay includes discrete data lines of the DSP circuit portion.

13. The miniaturized programmable motor overload protector according to claim 12, wherein the Instrumentation Amplifiers convert signal currents from outputs of current transformers in the Current Transformer (CT) circuit portion into voltages for amplification, the CT circuit portion including four current transformers as sensors for each of the three phases of motor currents and one ground fault current.

14. A miniaturized programmable motor overload protector comprising, in combination:
  means for sensing electrical power applied to a motor;
  means for filtering noise from inputted signals;
  signal processing means;
  programming means for inputting, monitoring, diagnosing, and recording operating information related to motor configuration data;
  memory means for storing real-time information related to events associated with the motor being protected;
  display means;
  means for interrupting said electrical power applied to a motor;
  power supply means for providing regulated output voltages;
  reset actuator means for resetting the miniaturized programmable motor overload protector after a trip has occurred;
  means for maintaining operation during electrical power disruptions; and
  means for modularly interlocking each component housing comprising the motor overload protector using spaced-apart locking tabs,
  wherein the modular component housings comprise:
  a base housing portion;
  a power supply circuit portion integrated in the base housing portion;
  a Control Power (CP) input terminal portion integrated with the power supply circuit portion in the base housing portion;
  a Current Transformer (CT) circuit portion integrated in a CT housing portion modularly coupled with the power supply circuit portion;
  an input/output circuit portion and a communication circuit portion, which are modularly coupled inside a Signal Processor housing portion;
  a Signal Processor circuit portion integrated in the Signal Processor housing portion modularly coupled with the CT housing portion; and
  a removable user interface circuit assembly including a cover and base to house the user interface circuit assembly, the cover and base being modularly coupled to form the housing, and the base being modularly coupled with the Signal Processor housing portion.

15. The miniaturized programmable motor overload protector according to claim 14, wherein the Signal Processor circuit portion is a Digital Signal Processor circuit portion and the Signal Processor housing portion is a Digital Signal Processor (DSP) housing portion.

16. The miniaturized programmable motor overload protector according to claim 14, wherein the modular base housing portion further comprises one of direct fastening and din rail mounting means.

17. The miniaturized programmable motor overload protector according to claim 14, wherein the power supply circuit portion is an offline Switch Mode Power Supply (SMPS) circuit.

18. The miniaturized programmable motor overload protector according to claim 15, further comprising:
  a remote user interface circuit assembly having an interface end to be modularly coupled with the DSP housing when the removable user interface assembly is removed, a remote user portion and a user interface circuit umbilical cable of predetermined length connecting said remote user portion and said interface end coupled with the DSP housing.

19. The miniaturized programmable motor overload protector according to claim 18, further comprising:
  means for aligning and fitting to an electrical interface portion of one of the remote user interface assembly and the removable user interface assembly.

20. The miniaturized programmable motor overload protector according to claim 14, wherein the CT circuit portion includes current transformers as sensors for each of three phases of motor currents and one ground fault current.

* * * * *